United States Patent [19]

Kirii et al.

[11] Patent Number: 5,724,843
[45] Date of Patent: Mar. 10, 1998

[54] METHOD OF DIAGNOSING PRESSING MACHINE BASED ON DETECTED PHYSICAL VALUE AS COMPARED WITH REFERENCE

[75] Inventors: Kazunari Kirii, Aichi-ken; Masahiro Shinabe, Toyota, both of Japan

[73] Assignee: Toyota Jidosha Kabushiki Kaisha, Japan

[21] Appl. No.: 697,256

[22] Filed: Aug. 21, 1996

Related U.S. Application Data

[63] Continuation of Ser. No. 200,399, Feb. 23, 1994, abandoned.

[30] Foreign Application Priority Data

Feb. 25, 1993 [JP] Japan ................................ 5-63406
Feb. 16, 1994 [JP] Japan ................................ 6-19201

[51] Int. Cl.$^6$ .................................................. B21D 22/20
[52] U.S. Cl. ................................ 72/17.2; 72/21.1; 72/31.01
[58] Field of Search ........................ 72/15.1, 31.01, 72/350, 351, 453.13, 17.2, 14.9, 1; 100/99

[56] References Cited

U.S. PATENT DOCUMENTS

| | | |
|---|---|---|
| 3,956,973 | 5/1976 | Pomplas . |
| 4,116,050 | 9/1978 | Tanahashi et al. . |
| 4,283,929 | 8/1981 | Heiberger ........................ 72/15.1 |
| 4,633,720 | 1/1987 | Dybel et al. . |
| 4,698,991 | 10/1987 | Kirii et al. ........................ 72/17.2 |
| 4,750,131 | 6/1988 | Martinez . |
| 4,939,665 | 7/1990 | Gold et al. . |
| 5,009,091 | 4/1991 | Hinterman et al. ............... 72/17.2 |

FOREIGN PATENT DOCUMENTS

| | | |
|---|---|---|
| 2 064 134 | 11/1979 | Germany . |
| 2 127 973 | 10/1982 | Germany . |
| 37 44 177 | 7/1989 | Germany . |
| 0 522 684 | 4/1992 | Germany . |
| 42 29 155 | 3/1994 | Germany . |
| 92/22391 | 12/1992 | Japan ........................ 72/453.13 |

*Primary Examiner*—Lowell A. Larson
*Attorney, Agent, or Firm*—Finnegan, Henderson, Farabow, Garrett, & Dunner, L.L.P.

[57] ABSTRACT

A diagnostic method of diagnosing a press for the presence of any abnormality that deteriorates a quality of a product manufactured by the press, wherein physical value (Fs, Fsi, Ff, Ffi, Fp, Fpi, Xsi, Xei, Xy, Xz, Vx, Gx, Gy, Gz, Temp A, Temp B, Va0, Vf0, Vd0, V, Aa, Ag, Az, Afi, Ps, Pmai, Psa, Paa, Pyai, Peai, Pzai) such as a load generated at a selected portion of the press during operation of the press is detected, and the press is diagnosed for any abnormality, on the basis of the detected physical value, and according to a predetermined reference. For example, the diagnosis is effected based on: a waveform of a load detected in relation to a physical value which changes during a pressing cycle; a distribution of local values of the load detected local portions of the press; a correlation between the load and the physical value; a patter of variation of the load as the number of pressing cycles; a displacement amount, velocity or acceleration, or a temperature of a selected component of the press; or a capacity of a fluid used for a cylinder which produces a load or force.

7 Claims, 63 Drawing Sheets

METHOD OF DIAGNOSING PRESSING MACHINE BASED ON DETECTED PHYSICAL VALUE AS COMPARED WITH REFERENCE

This is a continuation of application Ser. No. 08/200,399, filed Feb. 23, 1994, now abandoned.

BACKGROUND OF THE INVENTION

1. Field of the Invention

The present invention relates in general to a pressing machine, and more particularly to a method of diagnosing a pressing machine for any abnormality on the machine, or to check the machine if it is in order for assuring a product with intended quality.

2. Discussion of the Related Art

There have been widely used pressing machines adapted to perform a pressing operation with relative movements of a pair of opposed dies. FIGS. 1 and 2 show an example of a single-action press equipped with a cushioning device for even distribution of a blank holding force on a pressure ring 30, so that a blank placed on the pressure ring 30 is drawn by a cooperative pressing action of an upper die 18 and a lower die in the form of a punch 12, while the blank is held between the pressure ring 30 and the upper die 18. Commonly, the pressing condition of the machine is adjusted or optimized by a try-and-error procedure, by performing a test run of the press, for each specific die set, so that the product obtained by the pressing operation has a desired level of quality. The pressing condition includes, for example: pneumatic pressure Pa of a cushioning pneumatic cylinder 42, which influences the blank holding force applied to the pressure ring 30; relative distance or die height h (indicated in FIG. 2) between plungers 22 and a slide plate (main slide) 20, which affects a forming force for the pressing action on the blank; and hydraulic pressure Ps of a balancing hydraulic cylinders 32 for even or uniform distribution of the blank holding force on the pressure ring 30. If the intended quality of the product is not obtained on the press whose condition has been adjusted, the die set is adjusted, modified or rectified as needed. Generally, the pressing machine is inspected to check if its components satisfy the appropriate standards, for example, if the parallelism of the slide plate or main slide 20 and a cushion platen or pad 28 is held within a predetermined range of tolerance. Satisfying these standards does not necessarily mean that the machine assures an intended level of quality of the product manufactured by the machine.

However, possible causes for quality deterioration of the product manufactured by the press may include the other factors, for example, leakage of compressed air from the cushioning pneumatic cylinder 42, accumulation of an oil within the cylinder 42, and leakage of a pressurized fluid from the balancing hydraulic cylinders 32. These defects or abnormalities cannot be easily detected by visual inspection or diagnostic observation, and the quality deterioration of the product arising from these abnormalities is therefore dealt with by modifying or adjusting the die set used for the product. In some cases, however, the abnormalities are so serious that the modification or adjustment of the die set per se does not permit an intended pressing operation to obtain a product with desired quality. In such cases, it takes a lot of time to locate those abnormalities or defects or pinpoint the causes for the quality deterioration of the product.

Further, the operating condition of the press such as the blank holding force or pressing force may vary due to deterioration of the machine components or chronological changes in the operating characteristics of the components. Since an excessive or abnormal variation in the blank holding or pressing force cannot be directly detected during successive production runs of the press, the quality of the products may be lowered without recognition of such abnormality during a relatively long period of time. That is, it is impossible to detect such abnormality at an early stage of the successive production runs, or a short time after the occurrence of the abnormality. A similar drawback is also encountered in the event of uneven distribution of the blank holding force due to any defect associated with the cushioning device or balancing hydraulic cylinders 32.

SUMMARY OF THE INVENTION

It is therefore a principal object of the present invention to provide a method of diagnosing a press in a simple manner, to check if the press is in good condition for assuring a product having an intended or desired quality.

The above object may be achieved according to a first aspect of the present invention, which provides a method of diagnosing a press for the presence of any abnormality that deteriorates a quality of a product manufactured by the press, the method comprising the steps of: (a) detecting a load generated at a selected portion of the press when the press is operated; and (b) determining the presence or absence of an abnormality, on the basis of the detected load, and according to a predetermined reference that permits the product to have an intended quality.

The diagnostic method of the invention described above is practiced either upon replacement of the die set or periodic inspection of the press, or alternatively, in an on-line fashion or during a production run of the press, depending upon the specific portion of the press where the load is detected. In the diagnosis, the load generated at the selected portion of the press is detected by suitable means. The selected portion may be a portion where the blank holding force which influences the quality of the product is generated, or where the blank is formed into the product. For instance, the load in question may be detected or measured by installing a suitable load measuring apparatus on the press, in place of the die set, so that the amount of strain or deformation of the load measuring apparatus is measured by suitable strain sensors such as strain gages, dynamic strain gages or load cells. in this instance, the press is operated to effect a test pressing cycle different from an ordinary on-line pressing operation, to detect the load. This test pressing cycle may be performed when the die set is replaced or when the machine is subjected to a periodic inspection. However, the load may be detected by measuring the amount of strain or deformation of the machine frame, or the pressure of the fluid through which the load is transmitted. Thus, various load detecting means may be used to directly or indirectly detect or measure the load in question, during a test operation or an actual pressing operation. The load in question may be the blank holding force or blank forming force when the upper die has reached its lower stroke end, or a selected characteristic of the load such as: a waveform of the load detected in relation to a physical value which changes during a pressing cycle performed on the press; a distribution of local values of the load detected at selected local portions of the press; a correlation between the load and a physical value which changes with the load; or a pattern in which the load varies as a function of the number of pressing cycles repeated on the press.

The detection of the load in question is followed by the step of determining the presence or absence of any abnormality on the press, on the basis of the detected load, and according to a predetermined rule of reference which permits the product to have an intended or desired quality. The reference is determined by simulation or experiment or according to a predetermined formula, on the basis of the dimensions of the various machine components, and the pressure value or values of the working fluid or fluids in the cylinders disposed in the path of transmission of the load or at the location of generation of the load in question. The reference may also be determined based on data obtained by test operations performed on a try press (test press) which is used in the manufacture of the die set installed on the production press to which the present invention is applicable. Further, the reference may be a load condition of the press which has been found normal or satisfactory to assure the intended quality of the product, during a previous diagnostic operation according to the instant diagnostic method.

For determination of the presence or absence of an abnormality, the detected load value, a tendency of change (e.g., rate or gradient of change) of the detected load, or an amount of variation in the detected load values is compared with that of the reference, to thereby check if such parameter relating to the detected load substantially coincides with the reference load value, reference tendency or reference variation amount, or check if the parameter of the detected load is held within a predetermined optimum range defined by upper and lower limits, or alternatively check if the amount of difference or deviation of the parameter of the detected load is held within a predetermined range of tolerance. Where the determination is effected on the basis of the selected characteristic of the load, the determination may be effected based on at least a part of the characteristic of the detected load as compared with the corresponding part of the reference characteristic, such as the reference waveform of the load or reference distribution of the detected local load values. In this case, too, the determination may be effected by checking the detected load or at least a part of the characteristic of the detected load, for substantial coincidence with or similarity to the reference characteristic, or as to whether such parameter of the detected load falls within a predetermined optimum range or a predetermined range of tolerance.

If any abnormality is found in the determining step, it is possible to estimate a potential cause for the abnormality, depending upon a result of determination as to whether the detected load value is larger or smaller than the reference value, or whether the nature or tendency of change of the selected characteristic of the detected load is similar to that of the reference characteristic.

The present diagnostic method according to the first aspect of the present invention permits easy determination of the presence or absence of any abnormality on the press that deteriorates the quality of the product, and eliminates an unnecessary repair or adjustment of the die set, which repair or adjustment is conventionally performed upon finding of deterioration of the product quality due to an abnormality on the side of the press. The estimation of a potential cause for abnormality, which can be made based on the detected load, facilitates repair or adjustment of the press to remove the source of the abnormality found by the diagnosis.

The object indicated above may also be achieved according to a second aspect of the present invention, which provides a diagnostic method of diagnosing a press for the presence of any abnormality that deteriorates a quality of a product manufactured by the press, the method comprising the steps of: (a) detecting an amount of displacement of a selected portion of the press when the press is operated; and (b) determining the presence or absence of an abnormality, on the basis of the detected amount of displacement of the selected portion, and according to a predetermined reference that permits the product to have an intended quality.

According to this diagnostic method, a diagnosis of the press to find an abnormality is effected based on an amount of displacement of a selected portion or component of the press, rather than based on an actual load detected as in the method according to the first aspect of the invention. The selected portion of the press may be a component which is displaced as the press is operated. For instance, such component may be a piston of a cylinder disposed in the path of transmission of a load, or the die set which elastically deforms during a pressing cycle. The amount of displacement of such selected portion or component affects the blank holding force or blank forming force, and thereby influencing the quality of the product manufactured by the press. The amount of displacement of the selected portion or component may be detected by a suitable displacement sensor such as an optical distance sensor. On the basis of the detected amount of displacement, the determination of the presence of an abnormality is made according to a predetermined reference that permits the product to have the intended quality. The reference may be determined as described above with respect to the first aspect of the invention. For example, the determination is made by checking if the detected amount of displacement of the selected portion of the press substantially coincides with the predetermined reference value, or is held within a predetermined optimum range defined by upper and lower limits. The present diagnostic method according to the second aspect of the invention also permits easy finding of an abnormality that deteriorates the quality of the product, and eliminates unnecessary repair or adjustment of the die to deal with the abnormality on the side of the press.

The object indicated above may also be accomplished according to a third aspect of the instant invention, which provides a diagnostic method of diagnosing a press for the presence of any abnormality that deteriorates a quality of a product manufactured by the press, the method comprising the steps of: (a) detecting a velocity at which a selected component of the press is displaced when the press is operated; and (b) determining the presence or absence of an abnormality, on the basis of the detected velocity of displacement of the selected component, and according to a predetermined reference that permits the product to have an intended quality.

According to this diagnostic method, a diagnosis of the press to find an abnormality is effected based on a velocity of displacement of a selected component of the press, rather than based on an actually detected load. The selected component of the press may be a component whose displacement velocity influences the quality of the product. For instance, such component may be an upper die of the press whose velocity of movement during a pressing cycle affects the product quality. The velocity of the component may be detected by integrating the acceleration value of the component detected by an accelerometer, or by differentiating the amount of displacement of the component detected by a displacement sensor. On the basis of the detected velocity, the determination of the presence of an abnormality is made according to a predetermined reference that permits the product to have the intended quality. The reference may be determined as described above with respect to the first and second aspects of the invention. For example, the determination is made by checking if the detected displacement velocity of the selected component of the press substantially coincides with the predetermined reference value, or is held within a predetermined optimum range defined by upper and lower limits. Like the diagnostic methods according to the first and second aspects of the present invention, the diagnostic method according to this third aspect of the invention facilitates finding of an abnormality that deteriorates the quality of the product, and eliminates unnecessary repair or adjustment of the die to deal with the abnormality on the side of the press.

The object may also be accomplished according to a fourth aspect of this invention, which provides a diagnostic method of diagnosing a press for the presence of any abnormality that deteriorates a quality of a product manufactured by the press, the method comprising the steps of: (a) detecting an acceleration value of a selected component of the press when the selected component is displaced during operation of the press; and (b) determining the presence or absence of an abnormality, on the basis of the detected acceleration value of the selected component, and according to a predetermined reference that permits the product to have an intended quality.

According to this diagnostic method, a diagnosis of the press to find an abnormality is effected based on an acceleration value of a selected component of the press, rather than based on an actually detected load. The selected component of the press may be a component whose displacement velocity influences the quality of the product. For instance, such component may be an upper die of the press whose acceleration value during a pressing cycle affects the product quality. The acceleration value of the component may be detected by a suitable accelerometer. On the basis of the detected acceleration value, the determination of the presence of an abnormality is made according to a predetermined reference that permits the product to have the intended quality. The reference may be determined as described above with respect to the above-described aspects of the invention. For example, the determination is made by checking if the detected acceleration value of the selected component of the press substantially coincides with the predetermined reference value, or is held within a predetermined optimum range defined by upper and lower limits. Like the diagnostic method according to the first aspect of the present invention, the diagnostic method according to this fourth aspect of the invention facilitates finding of an abnormality that deteriorates the quality of the product, and eliminates unnecessary repair or adjustment of the die to deal with the abnormality on the side of the press.

The object mentioned above may also be attained according to a fifth aspect of this invention, which provides a diagnostic method of diagnosing a press for the presence of any abnormality that deteriorates a quality of a product manufactured by the press, the method comprising the steps of: (a) detecting a temperature of a selected portion of the press when the press is in operation; and (b) determining the presence or absence of an abnormality, on the basis of the detected temperature of the selected portion, and according to a predetermined reference that permits the product to have an intended quality.

According to this diagnostic method, a diagnosis of the press to find an abnormality is effected based on a temperature of a selected portion of the press, rather than based on an actually detected load. The selected portion of the press may be a component whose thermal expansion causes a variation in the blank forming force acts on the blank being formed, and influences the quality of the product formed from the blank. For instance, such portion may be the die set or a sliding portion of the main slide (die plate) of the press, whose temperature may vary during a pressing cycle. The temperature of the selected portion may be detected by a suitable temperature sensor such as a radiation thermometer. On the basis of the detected temperature, the determination of the presence of an abnormality is made according to a predetermined reference that permits the product to have the intended quality. The reference may be determined as described above with respect to the above-described aspects of the invention. For example, the determination is made by checking if the detected temperature of the selected component of the press substantially coincides with the predetermined reference value, or is held within a predetermined optimum range defined by upper and lower limits. Like the diagnostic method according to the first aspect of the present invention; the diagnostic method according to this fifth aspect of the invention facilitates finding of an abnormality that deteriorates the quality of the product, and eliminates unnecessary repair or adjustment of the die to deal with the abnormality on the side of the press.

The object mentioned above may also be attained according to a sixth aspect of the present invention, which provides a diagnostic method of diagnosing a press for the presence of any abnormality that deteriorates a quality of a product manufactured by the press, the method comprising the steps of: (a) detecting a capacity of a working fluid which is compressed during operation of the press, on the basis of a change of pressure the working fluid due to compression thereof; and (b) determining the presence or absence of an abnormality, on the basis of the detected capacity of the working fluid, and according to a predetermined reference that permits the product to have an intended quality.

According to this diagnostic method, a diagnosis of the press to find an abnormality is effected based on a capacity of a working fluid at a selected portion of the press, rather than based on an actually detected load. The working fluid whose capacity is detected may be a fluid whose capacity may vary during a pressing cycle and may cause a variation in the amount of a load which influences the quality of the product. For instance, the working fluid whose capacity is detected may be an oil in balancing hydraulic cylinders for even distribution of the blank holding force to the cushion pins associated with a pressure ring, or an air in a cushioning pneumatic cylinder for generating the blank holding force. The capacity of the working fluid may be readily detected on the basis of a change of the pressure of the working fluid due to compression of the fluid, without disassembling the press. Based on the detected fluid capacity, the determination of the presence of an abnormality is made according to a predetermined reference that permits the product to have the intended quality. The reference may be determined as described above with respect to the above-described aspects of the invention. For example, the determination is made by checking if the detected capacity of the fluid substantially coincides with the predetermined reference value, or is held within a predetermined optimum range defined by upper and lower limits. Like the diagnostic method according to the first aspect of the present invention, the diagnostic method according to this sixth aspect of the invention facilitates finding of an abnormality that deteriorates the quality of the product, and eliminates unnecessary repair or adjustment of the die to deal with the abnormality on the side of the press.

The object indicated above may also be achieved according to a seventh aspect of the instant invention, which provides a diagnostic method of diagnosing a press for the presence of any abnormality that deteriorates a quality of a product manufactured by the press, the method comprising the steps of: (a) detecting an effective cross sectional area of a cylinder displaced at a selected portion of the press, on the basis of a correlation between a pressure of a working fluid in the cylinder and a load produced by the cylinder; and (b) determining the presence or absence of an abnormality, on the basis of the detected effective cross sectional area of the cylinder, and according to a predetermined reference that permits the product to have an intended quality.

According to this diagnostic method, a diagnosis of the press to find an abnormality is effected based on an effective cross sectional area of a cylinder disposed at a selected portion of the press, rather than based on an actually detected load. The cylinder whose cross sectional area is detected may be a cylinder whose effective cross sectional area may vary during use and may cause a variation in the amount of a load which influences the quality of the product. For instance, the cylinder whose cross sectional area is detected may be a set of balancing hydraulic cylinders for even distribution of the blank holding force to the cushion pins associated with a pressure ring, or a cushioning pneumatic cylinder for generating the blank holding force. The effective cross sectional area of the cylinder may be readily detected on the basis of a correlation between the pressure of the fluid in the cylinder and a load produced by the cylinder, without assembling the press. Based on the detected effective cross sectional area of the cylinder, the determination of the presence of an abnormality is made according to a predetermined reference that permits the product to have the intended quality. The reference may be determined as described above with respect to the above-described aspects of the invention. For example, the determination is made by checking if the detected effective cross sectional area of the cylinder substantially coincides with the predetermined reference value, or is held within a predetermined optimum range defined by upper and lower limits. Like the diagnostic method according to the first aspect of the present invention, the diagnostic method according to this seventh aspect of the invention facilitates finding of an abnormality that deteriorates the quality of the product, and eliminates unnecessary repair or adjustment of the die to deal with the abnormality on the side of the press.

The object indicated above may also be achieved according to an eighth aspect of the invention, which provides a diagnostic method of diagnosing a press for the presence of any abnormality that deteriorates a quality of a product manufactured by the press, the method comprising the steps of: (a) storing a correlation between a load generated at a selected portion of the press and a pressure of a working fluid in a cylinder disposed in a path of transmission of the load; (b) detecting a pressure of the working fluid when the press is in operation; and (c) determining the presence or absence of an abnormality, on the basis of the detected pressure of the working fluid and the correlation, by checking if a load generated during operation of the press substantially coincides with a predetermined reference that permits the product to have an intended quality.

This diagnostic method can be performed on line, namely, during a production run of the press in which a load is transmitted through a hydraulic fluid or compressed air during a pressing cycle. To practice the instant method, suitable memory means is provided for storing a correlation between a load generated at a selected portion of the press and a pressure of a working fluid in a cylinder disposed in a path of transmission of the load in question. The selected portion at which the load is detected may be a portion at which the blank holding force or blank forming force is generated. For instance, the load is measured by a suitable load measuring apparatus installed on the press, in place of the die set, upon replacement of the die set. Described more specifically, the load is measured by detecting the amount of strain or deformation of the load measuring apparatus by strain gages, dynamic strain gages or load cells. The pressure of the working fluid may be detected by a suitable hydraulic or pneumatic pressure sensor. The detection of the fluid pressure may be effected during a production run of the press.

According to the present diagnostic method, which is practiced during an actual pressing operation on the press, the pressure of the fluid is detected, and the press is diagnosed for any abnormality, on the basis of the detected fluid pressure and the stored correlation, by checking if the detected value of the load substantially coincides with a predetermined reference that permits the product to have the intended quality. The reference may be a reference load value which is determined by a test pressing operation on a try press used in the manufacture of the die set installed on the press to which the present invention is applicable. The reference load value is determined so that the product has the intended quality if the actual load is substantially equal to the reference load value. The determination of the presence or absence of an abnormality may be effected by first obtaining the generated load on the basis of the detected pressure of the fluid and according to the correlation, and then comparing the obtained generated load with a predetermined reference load value. Alternatively, the actually detected fluid pressure is compared with a reference fluid pressure value which is obtained from the reference load value and according to the correlation.

Thus, the present diagnostic method permits on-line monitoring of the blank holding force or blank forming force, which cannot be directly measured during a production run of the press. Therefore, the instant method is effective to find out an abnormality due to deterioration or chronological change of the components of the press, and quality deterioration of the product, at an early point of time during a continuous or intermittent production run of the press.

The object indicated above may also be attained according to a ninth aspect of the present invention, which provides a diagnostic method of diagnosing a press for the presence of any abnormality that deteriorates a quality of a product manufactured by the press, the press having a cushioning device including a cushion platen, a pressure ring for holding a blank, force generating means for producing a resistance to a lowering movement of the cushion platen, to thereby generate a blank holding force, a plurality of balancing hydraulic cylinders disposed on the cushion platen and communicating with each other, and a plurality of cushion pins which are associated at lower ends thereof with the balancing hydraulic cylinders, respectively and support at upper ends thereof the pressure ring, so that the blank holding force generated when the pressure ring is lowered during a pressing operation is evenly distributed by the balancing hydraulic cylinders to the pressure ring through the cushion pins, the method comprising steps of: (a) obtaining diagnostic information by detecting at least one of the resistance to the lowering movement of the cushion platen and a pressure in the balancing hydraulic cylinders; and (b) determining the presence or absence of an abnormality, by checking if the diagnostic information substantially coincides with a predetermined reference that permits the product to have an intended quality.

This diagnostic method can be performed on line, namely, during a production run of the press, where the press is equipped with a cushioning device. According to the present diagnostic method, at least one of the resistance to the lowering movement of the cushion platen and the pressure in the balancing hydraulic cylinders is used as the diagnostic information. The force generating means may include a pneumatic cylinder or a hydraulic cylinder with a pressure relief function. in this case, the resistance to the cushion platen may be represented by the pressure in the pneumatic cylinder or the relief pressure of of the hydraulic fluid. This pneumatic or hydraulic pressure can be detected by a suitable pressure sensor even during an actual pressing operation on the press. The press is diagnosed for any abnormality, by checking if the diagnostic information substantially coincides with a predetermined reference that permits the product to have an intended quality. For example, the diagnosis is carried out by checking if the diagnostic information is held within a predetermined range of tolerance. For the cushioning device to establish even distribution of the blank holding force to the cushion pins, the pistons of all the balancing hydraulic cylinders under operation to transmit the blank holding force should be kept in neutral positions, that is, located between their upper and lower stroke ends. The pressure in the balancing hydraulic cylinders or the resistance to the cushion platen when the pistons of all the balancing hydraulic cylinders are kept in the neutral positions can be used as the predetermined reference with which the detected diagnostic information is compared to determine the presence or absence of any abnormality. This reference hydraulic pressure or resistance value may be obtained according to a predetermined equation on the basis of the specifications of the cushioning device and the optimum blank holding force, or may be determined by experiment.

The resistance to the lowering movement of the cushion platen, or the pressure of the balancing hydraulic cylinders may vary due to deterioration or chronological change of the components of the cushioning device, whereby the cushioning device fails to normally function to evenly distribute the blank holding force. This abnormality of uneven distribution of the blank holding force and consequent deterioration of the product quality may be detected by the present diagnostic method, at an early point of time during a continuous or intermittent production run of the press.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

Figure 1:
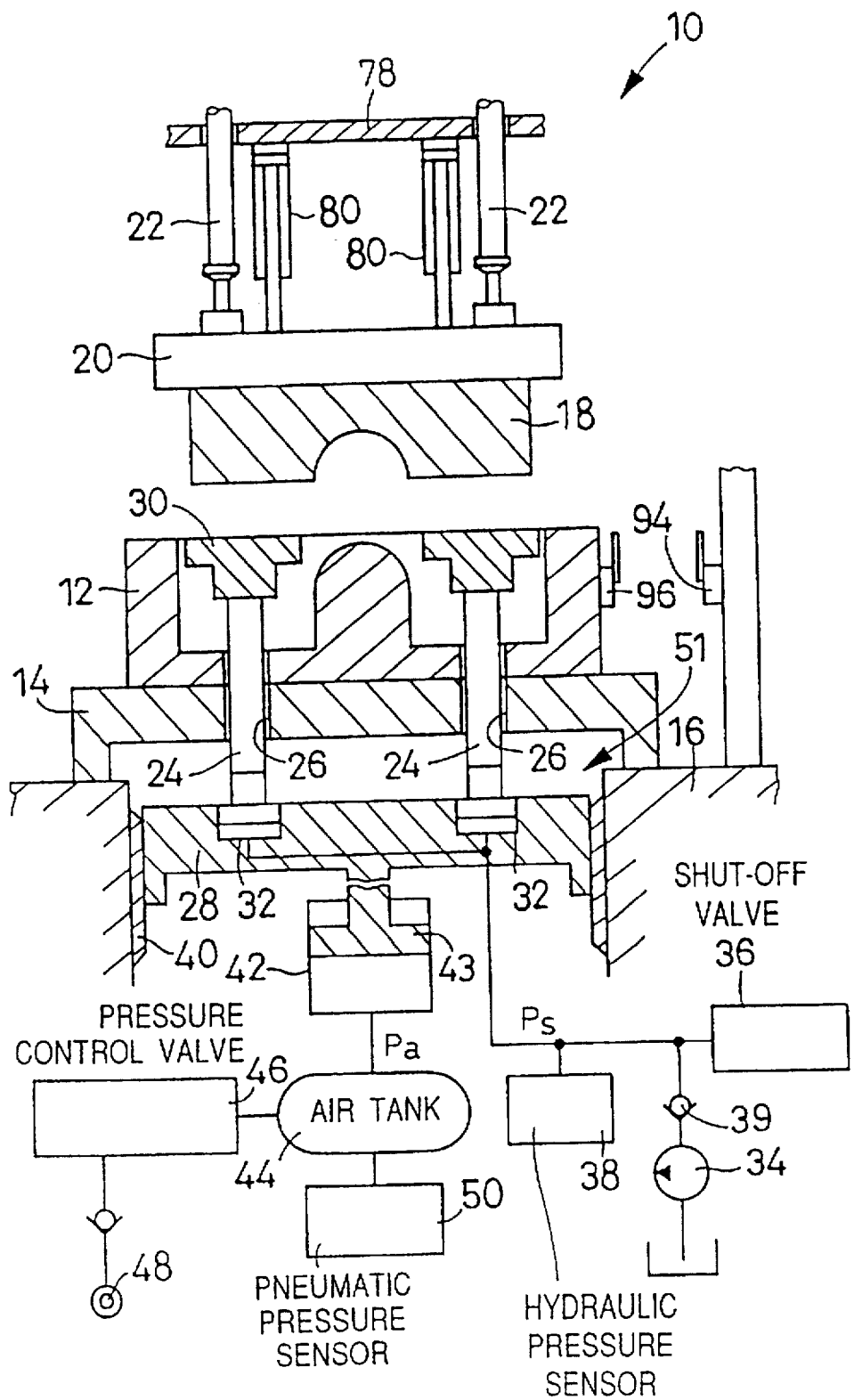
FIG. 1 is a schematic elevational view partly in cross section showing an example of a single-action press to which a diagnosing method of the present invention is suitably applicable.
Figure 2:
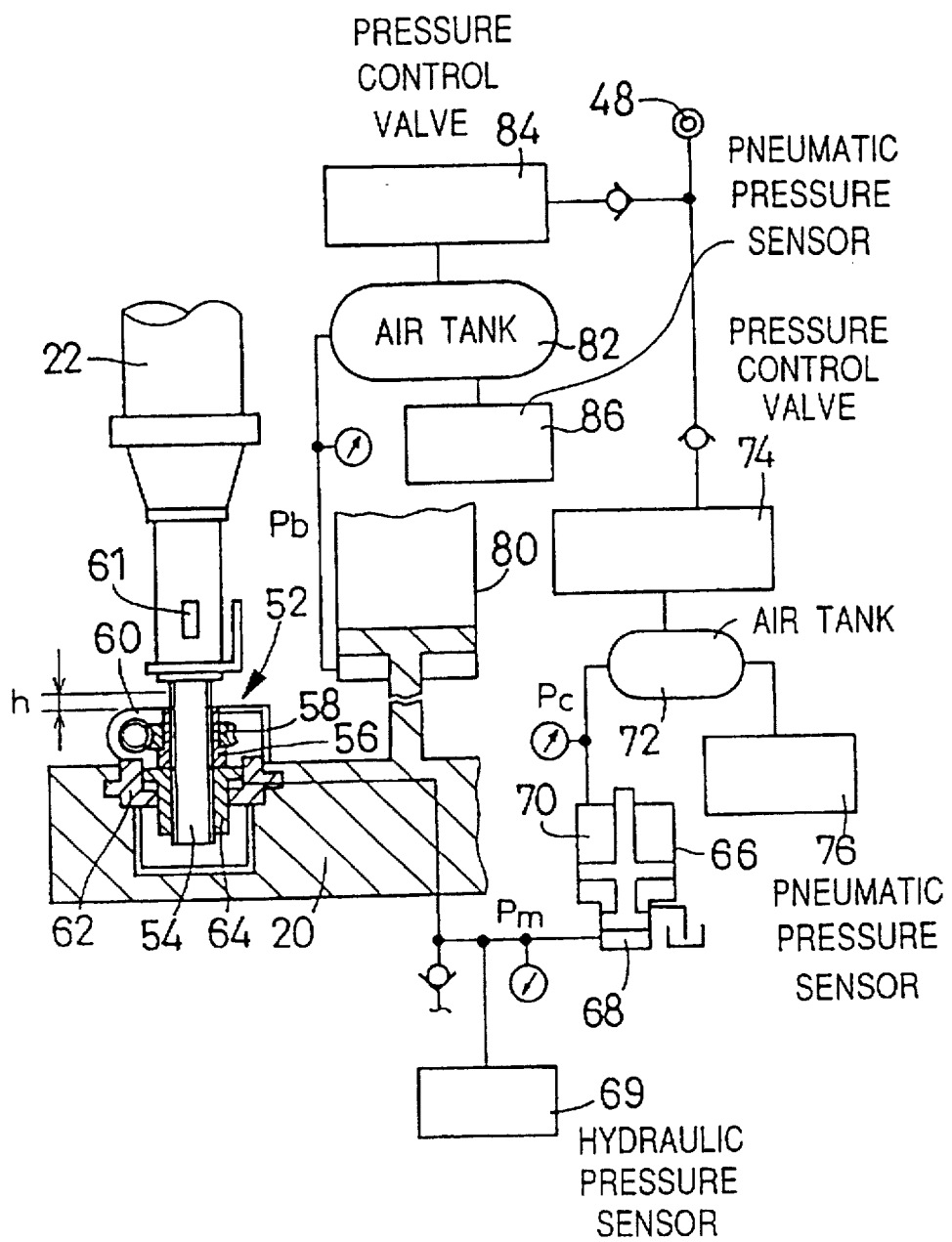
FIG. 2 is a schematic view showing a die-height adjusting mechanism, a counterbalancing cylinder and the related components of the press of FIG. 1.
Figure 4:
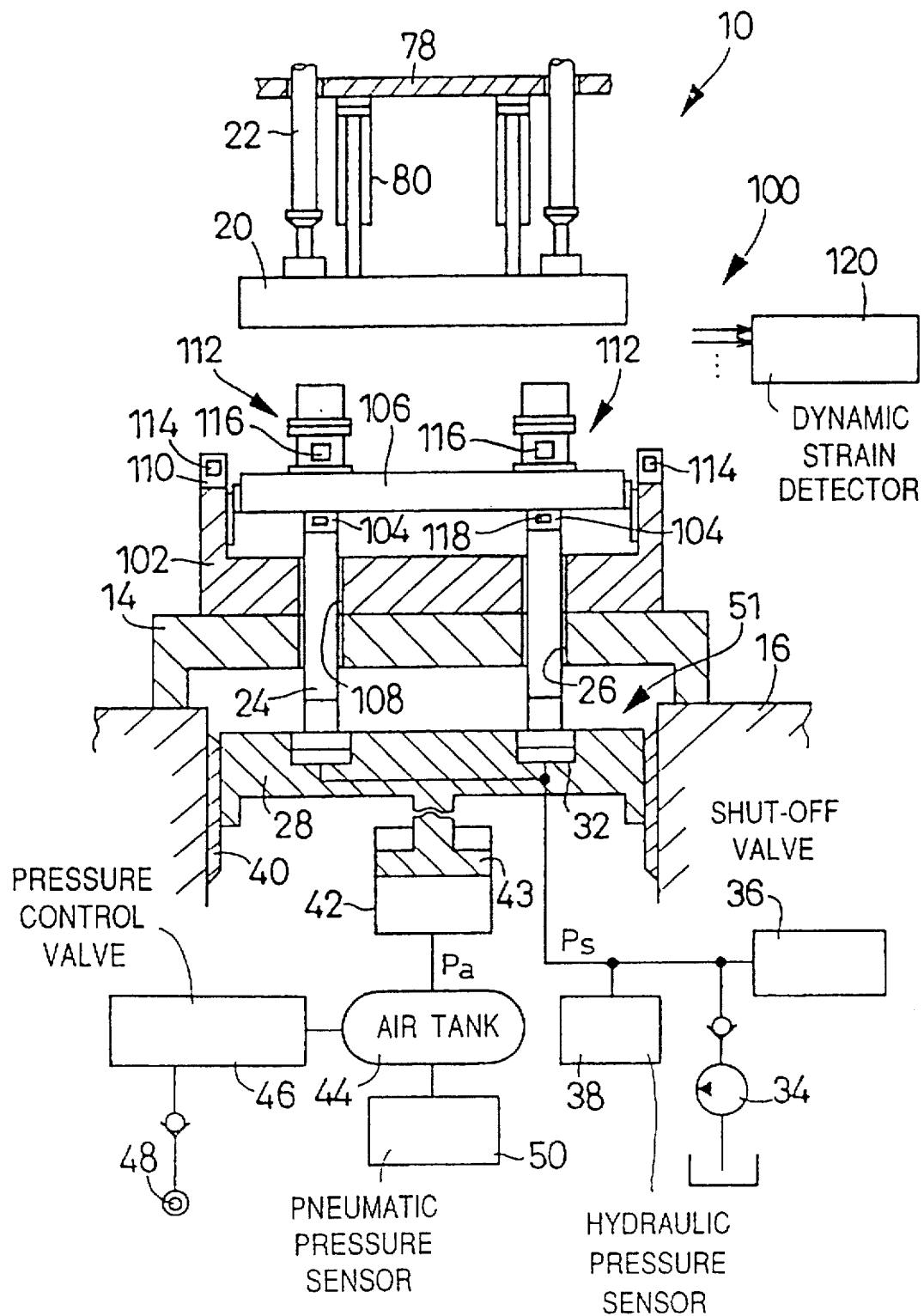
FIG. 4 is a schematic view of the press of Fig. as equipped with an apparatus for measuring a load on the press.
Figure 5:
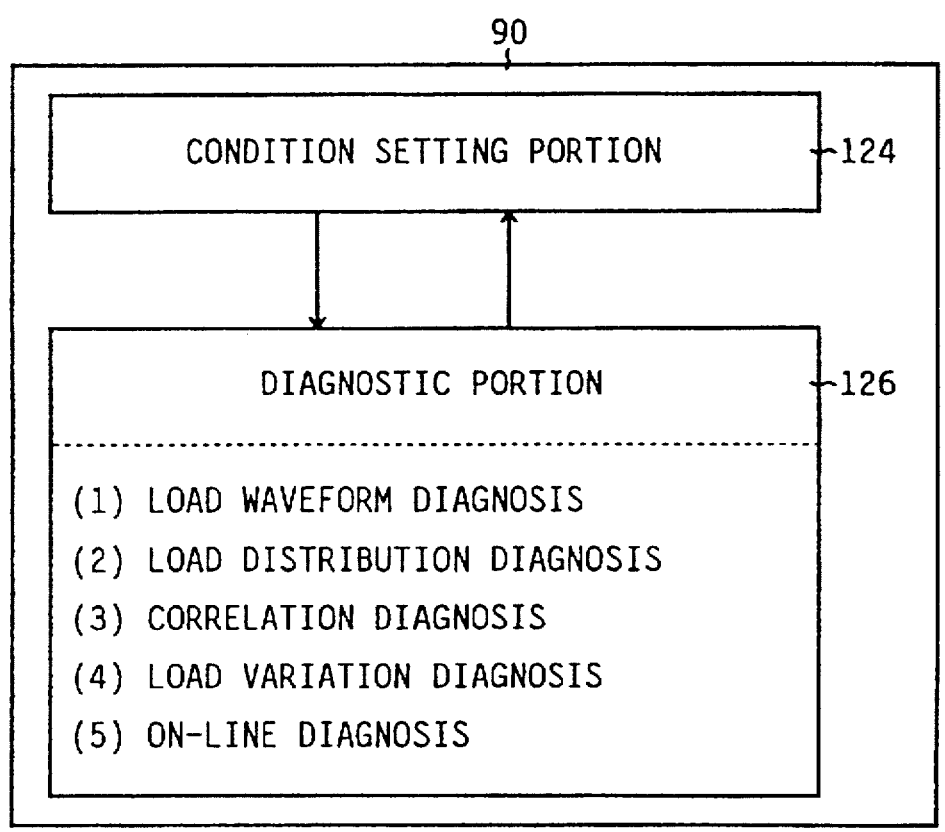
FIG. 5 is a block diagram explaining functions of the control system of FIG. 3.
Figure 9:
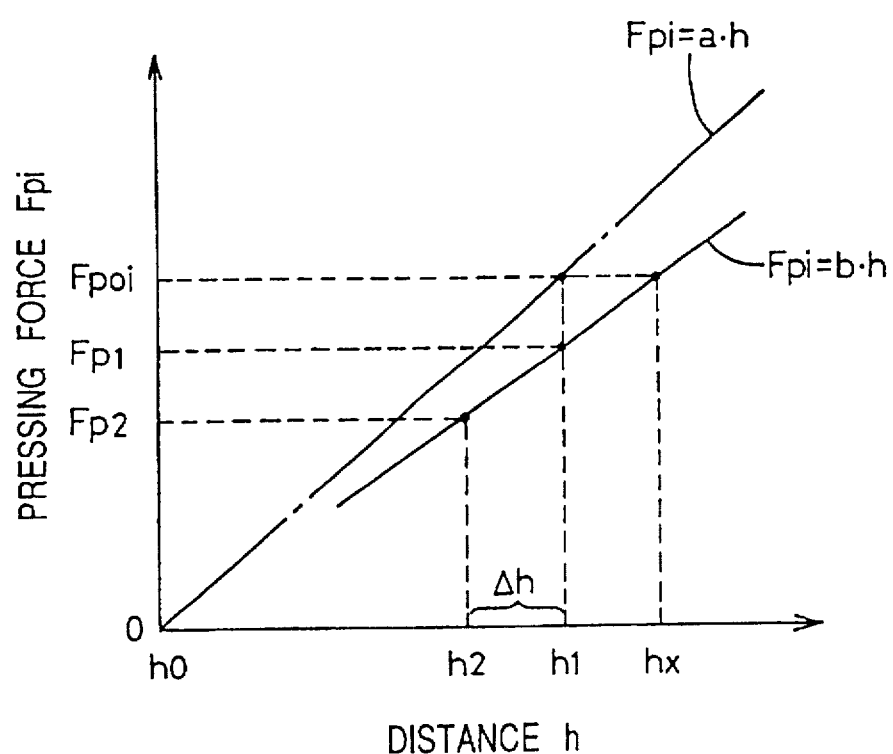
Figure 10:
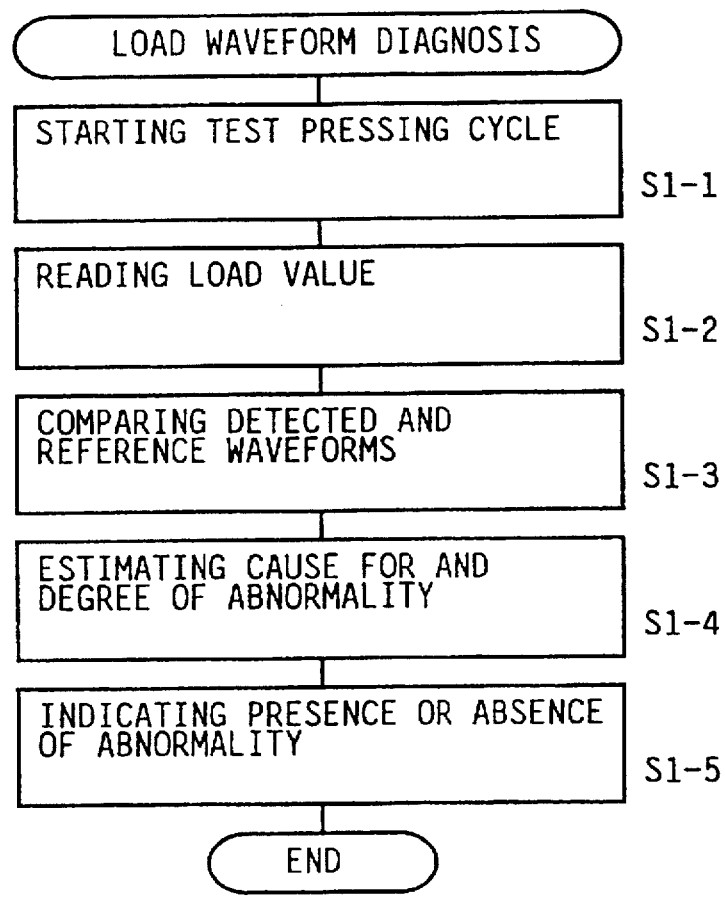
Figure 11A:
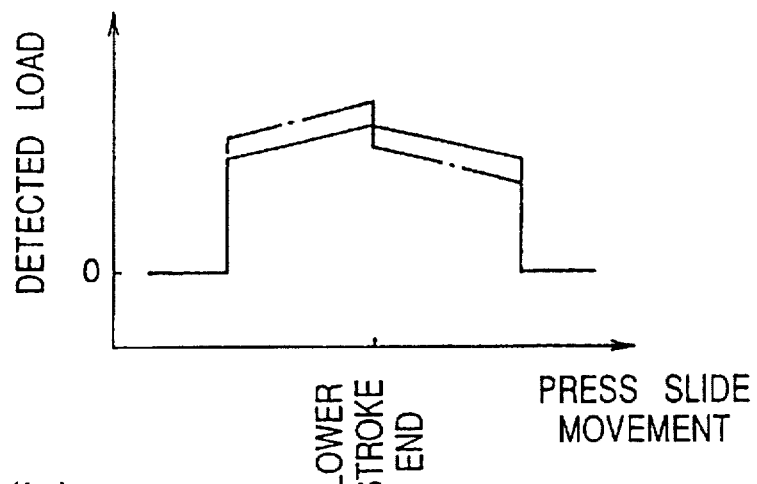
Figure 11B:
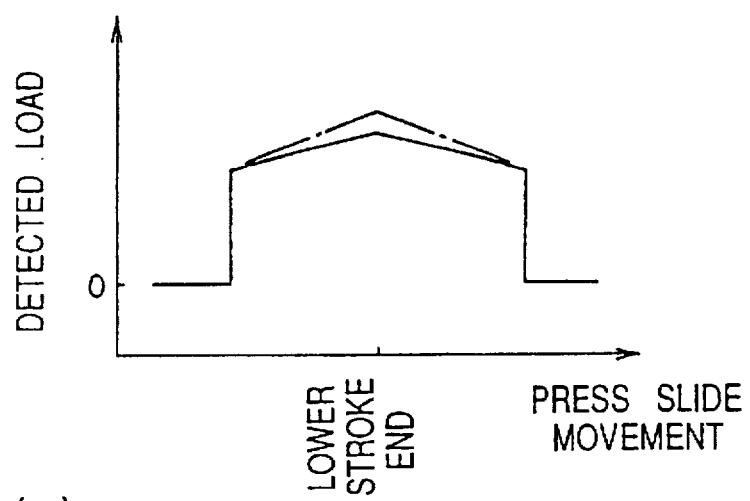
Figure 11C:
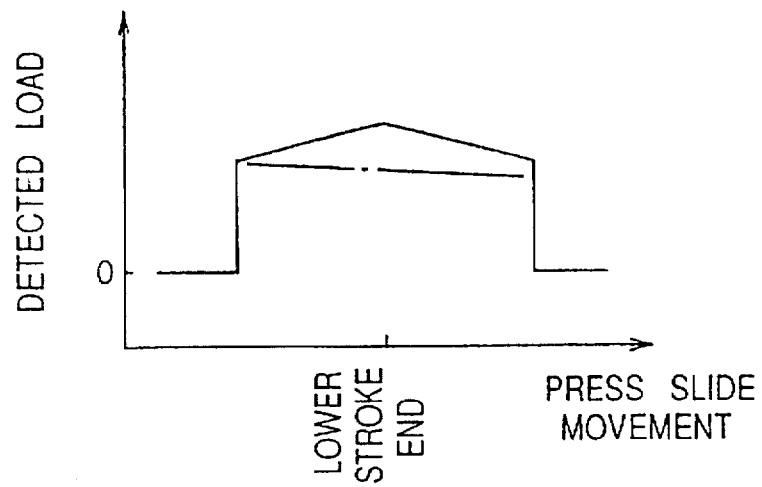
Figure 12:
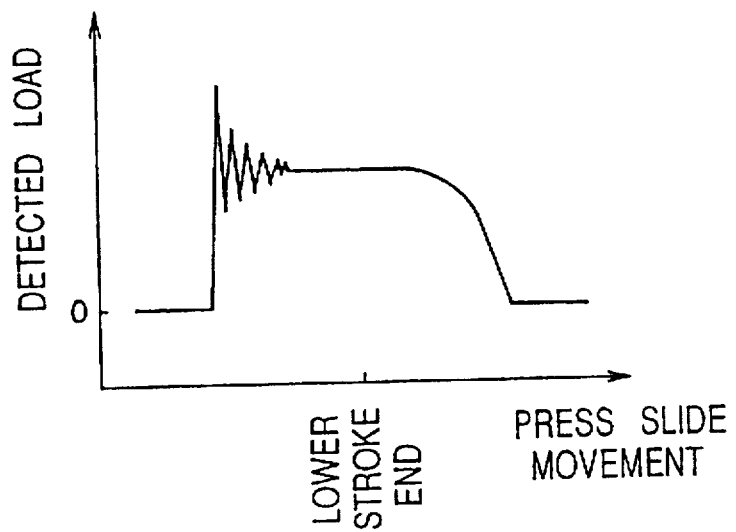
Figure 13:
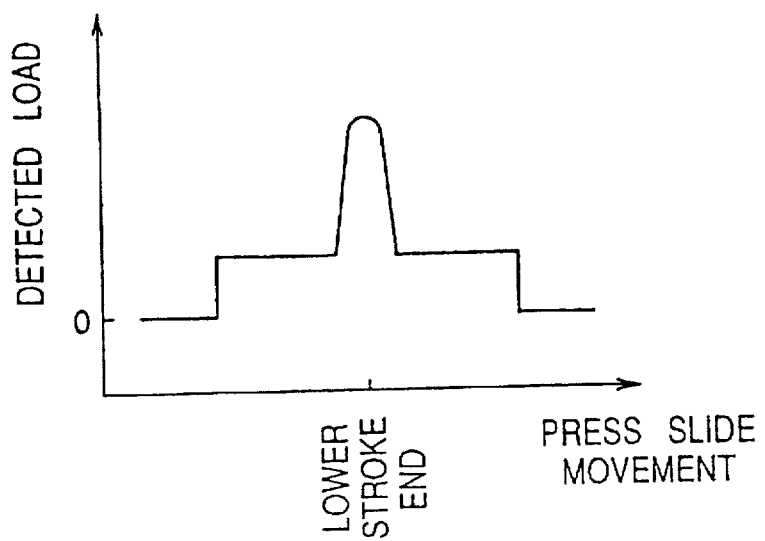
Figure 14:
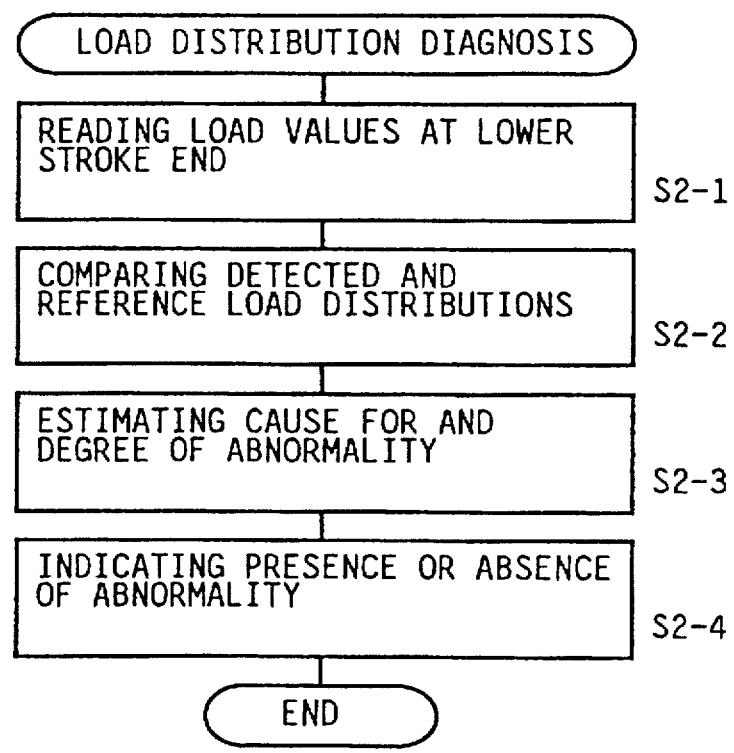
Figure 15:
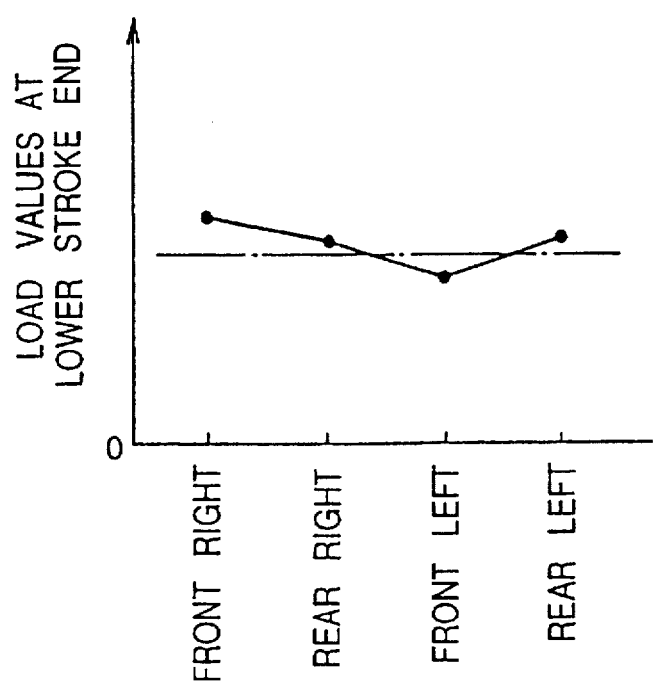
Figure 16:
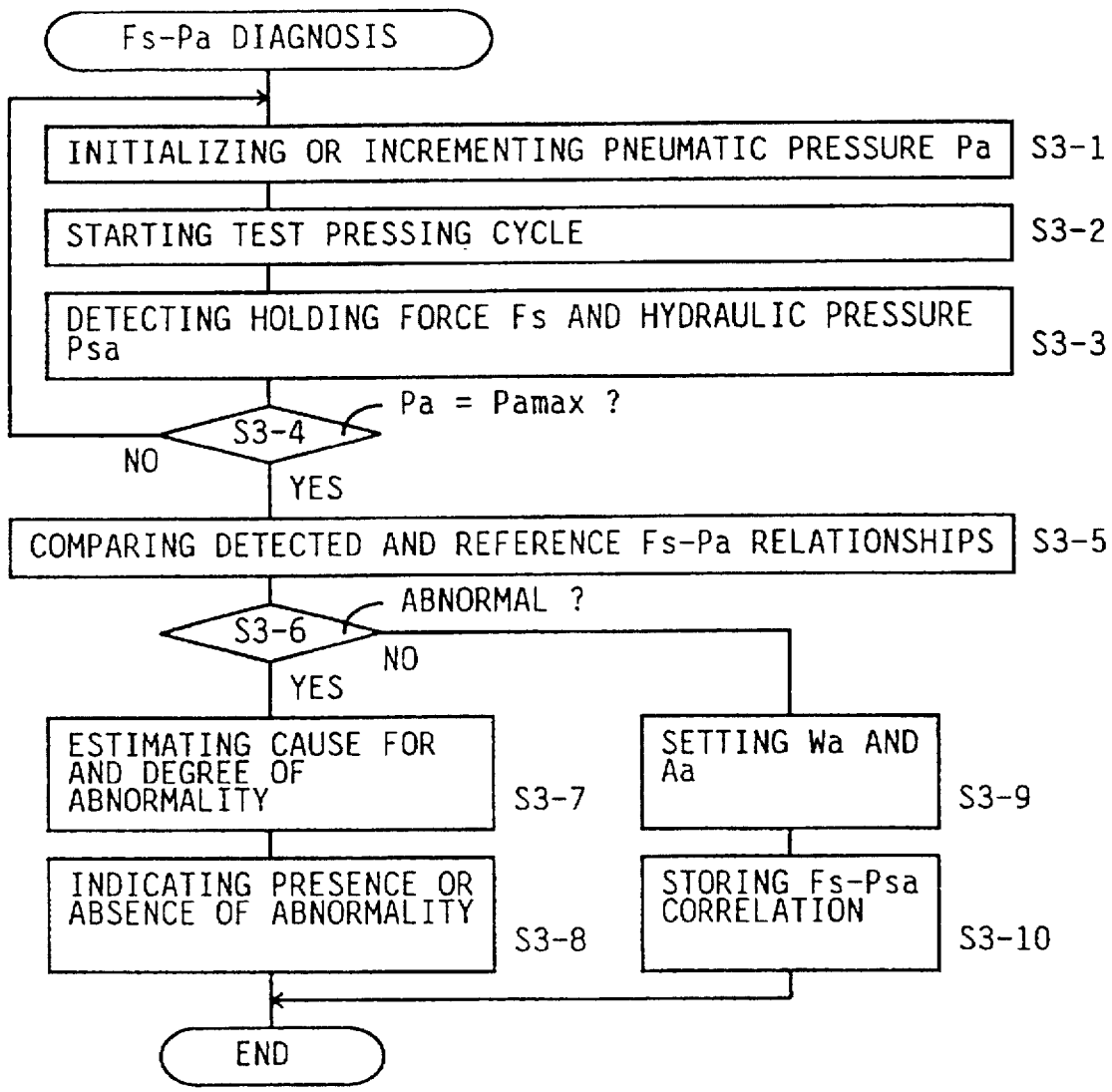
Figure 17:
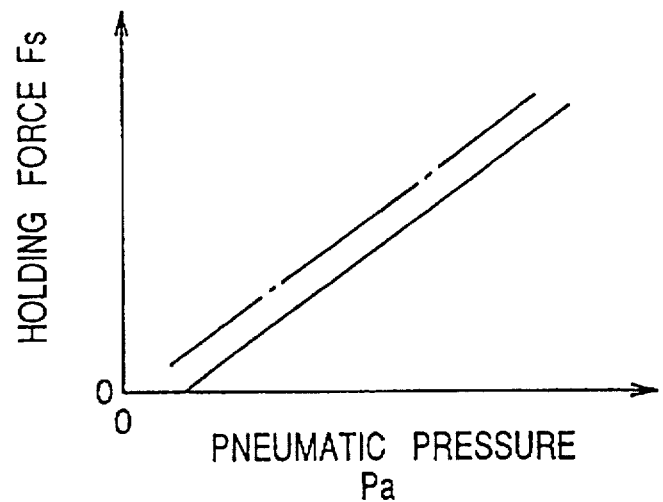
Figure 18:
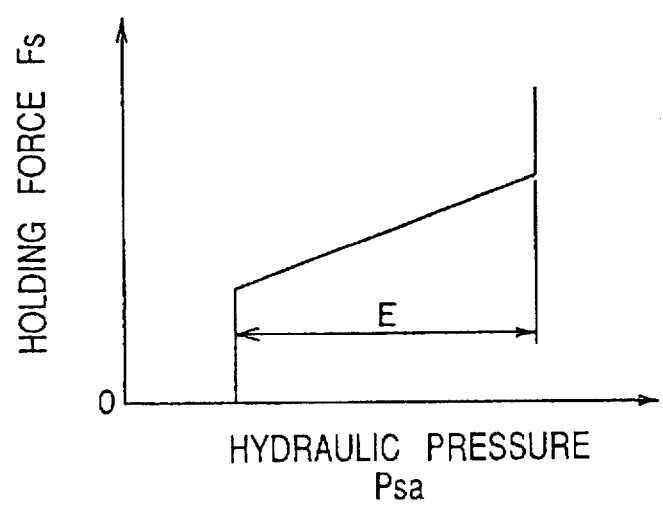
Figure 19:
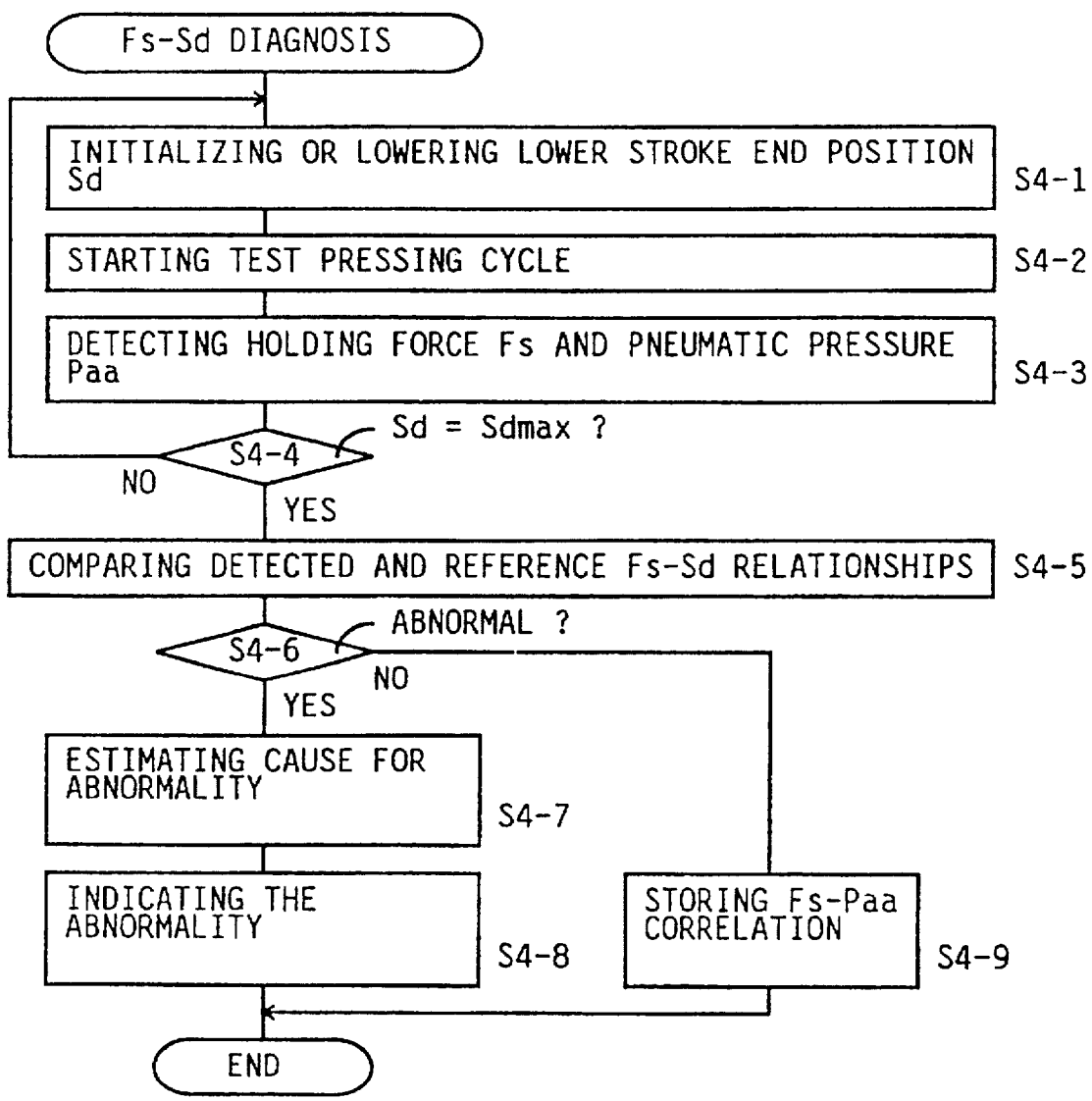
Figure 20:
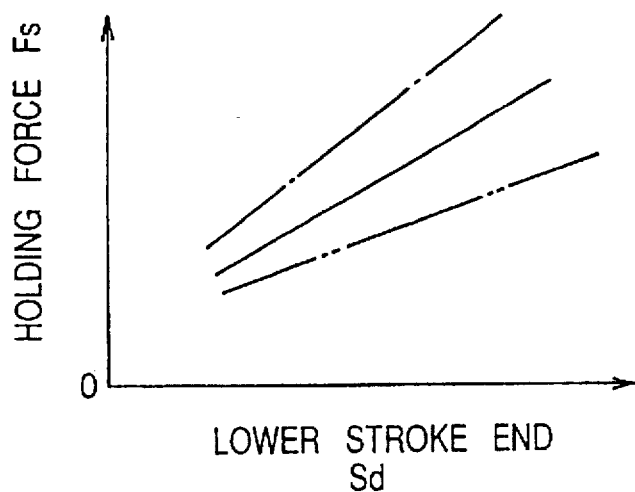
Figure 21:
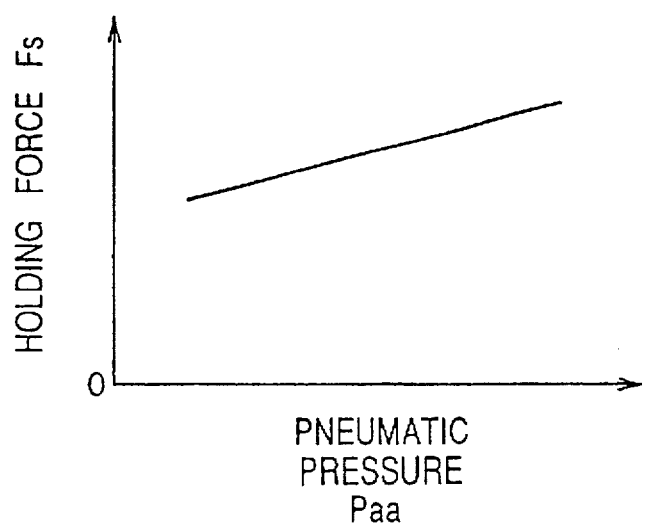
Figure 22:
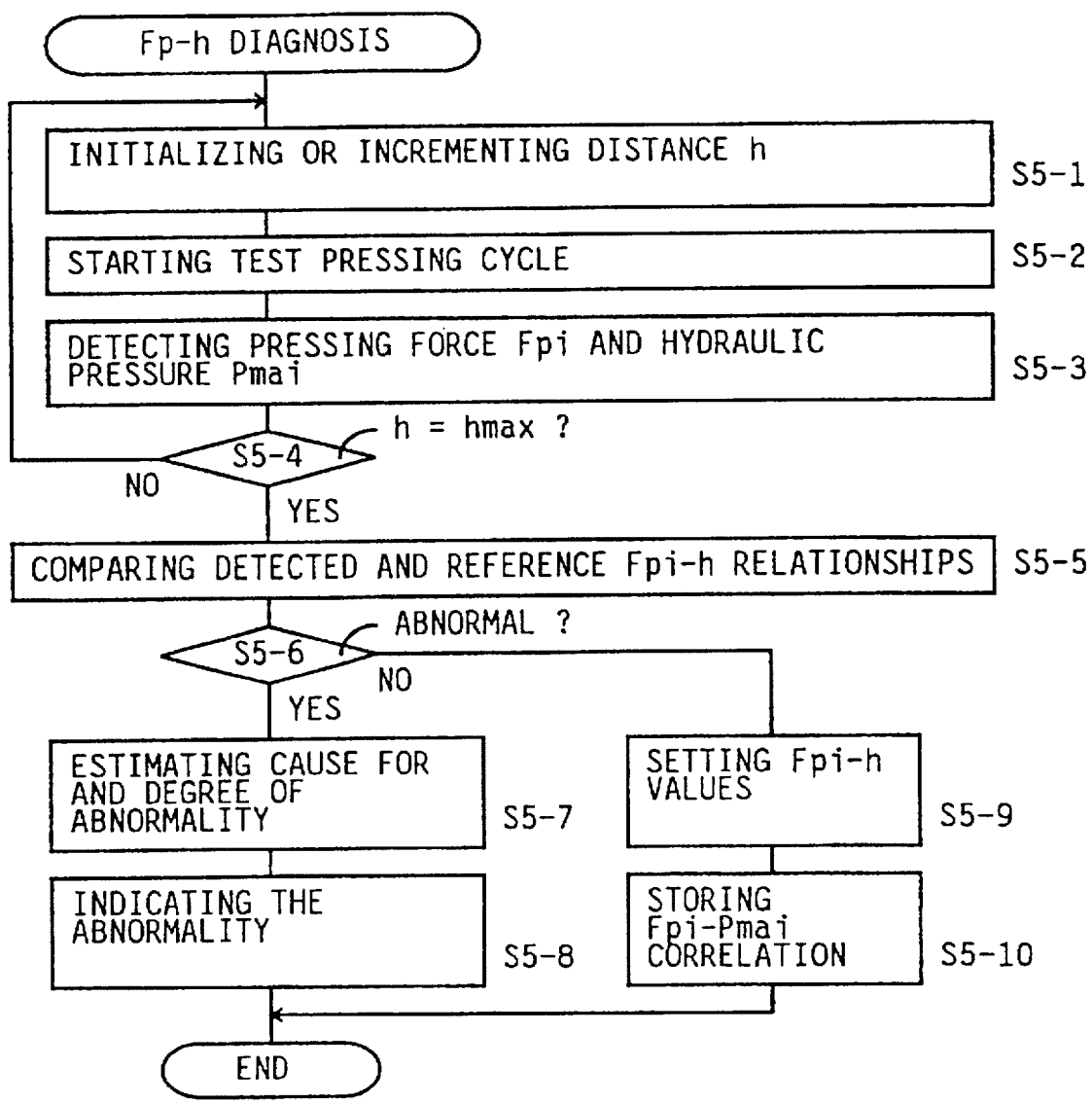
Figure 23:
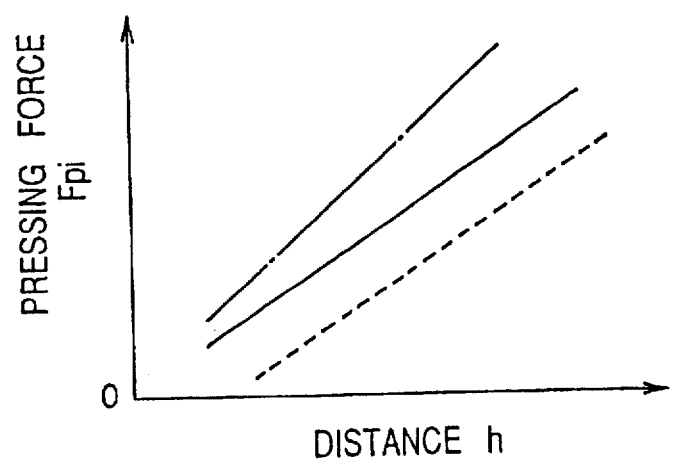
Figure 24:
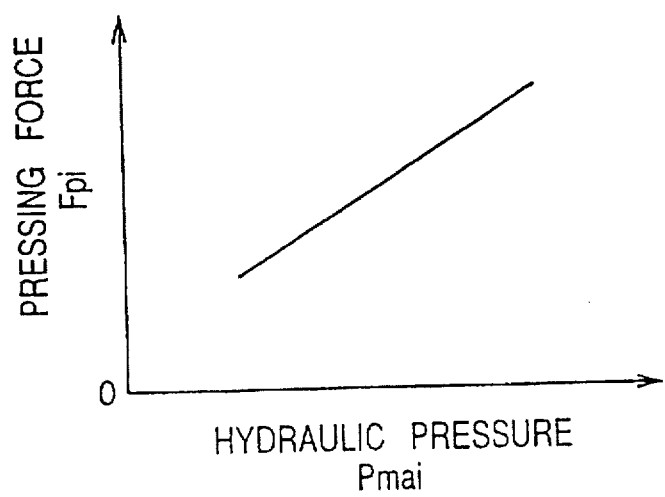
Figure 25:
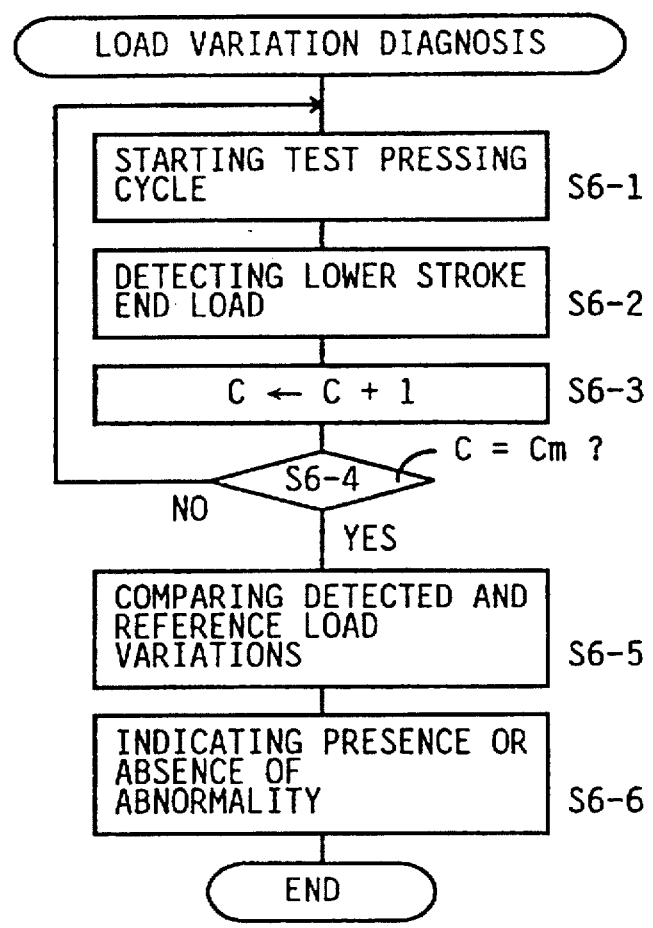
Figure 26:
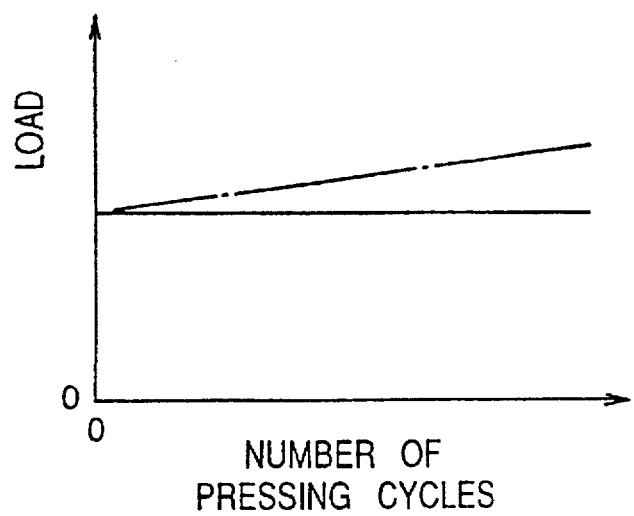
Figure 27:
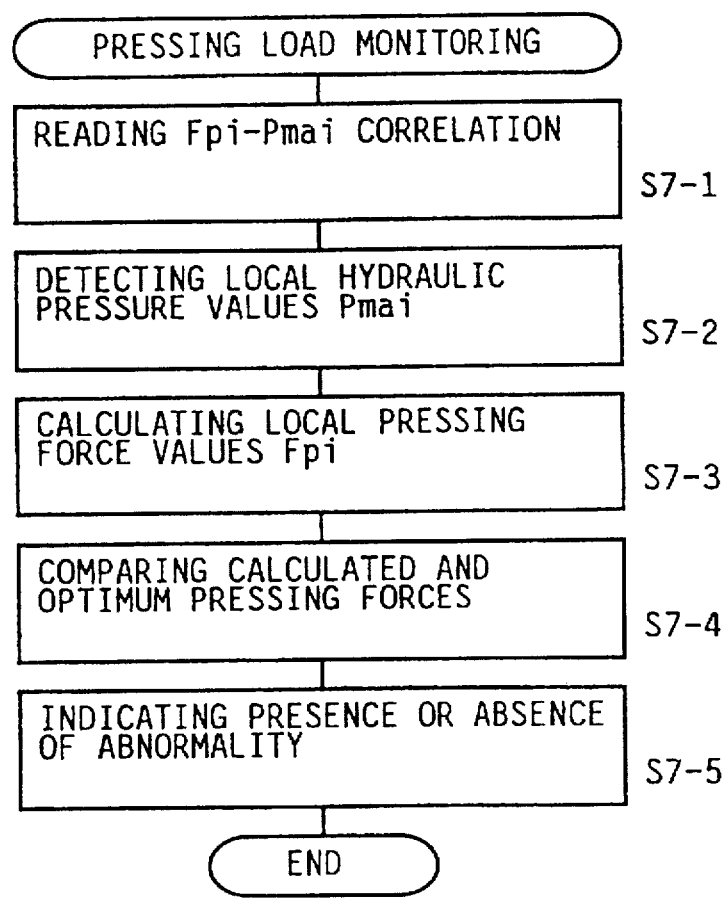
Figure 28:
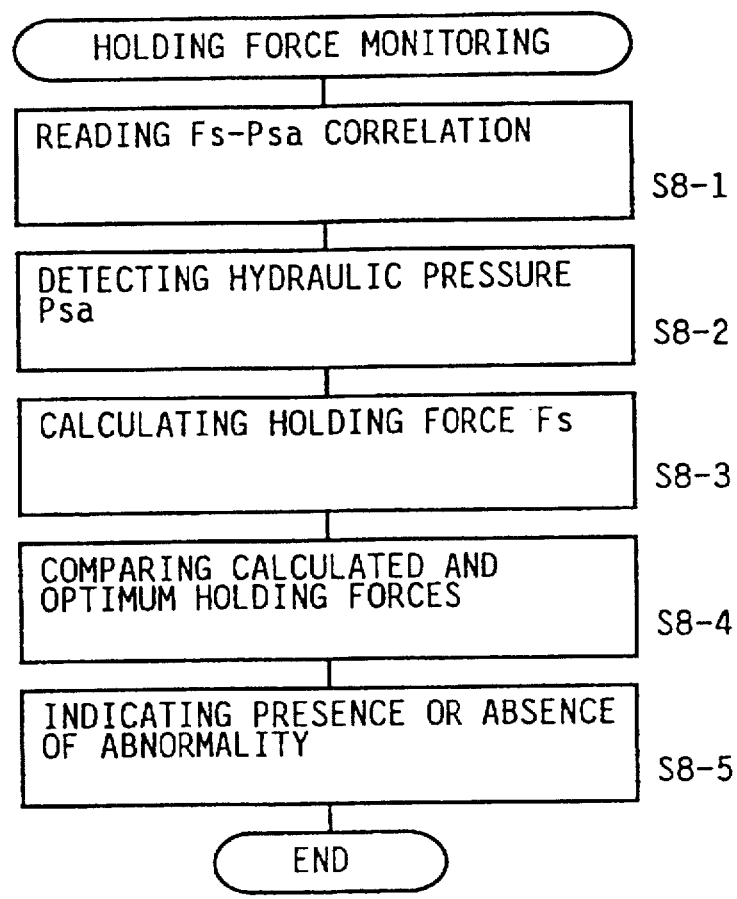
Figure 29:
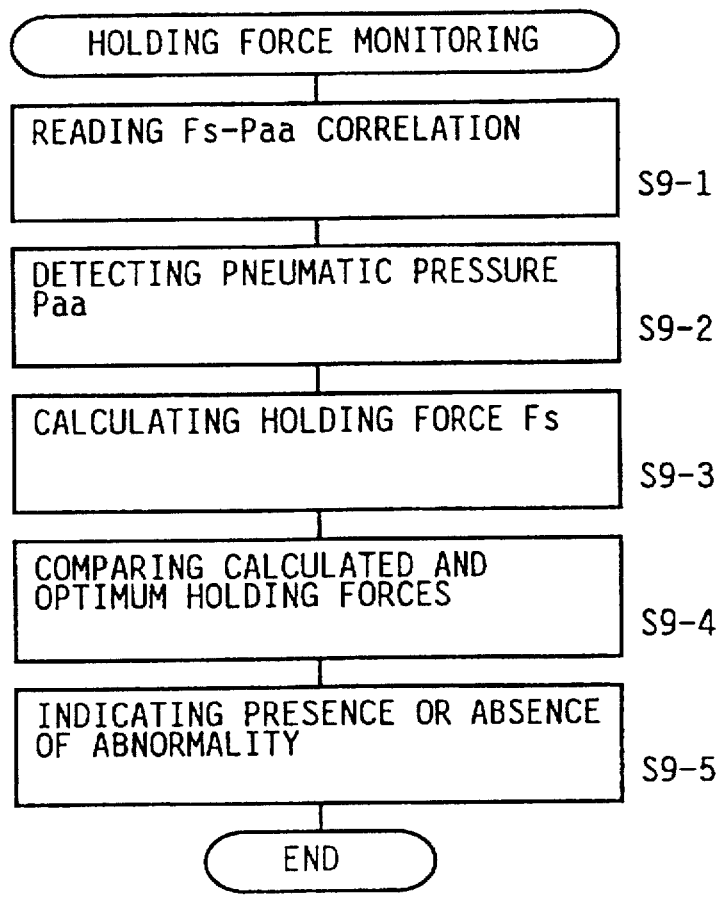
Figure 30:
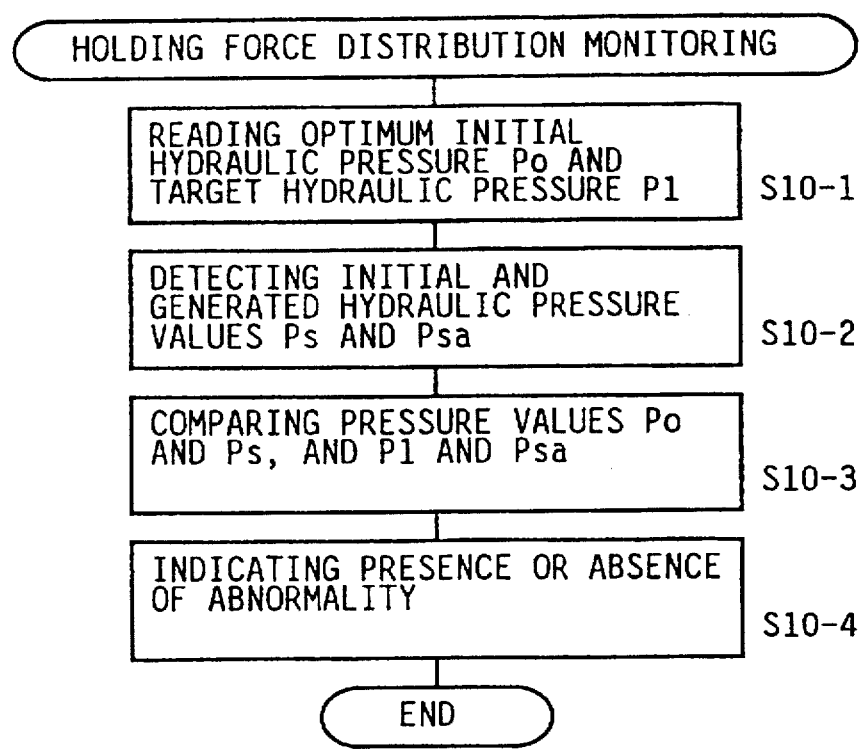
Figure 31:
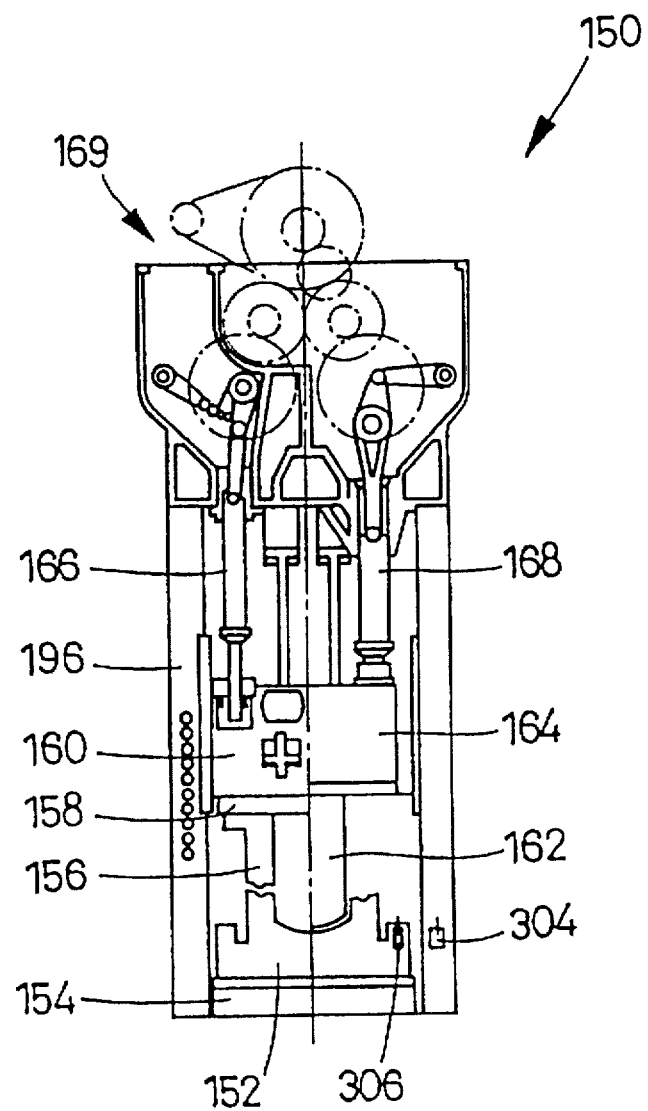
Figure 32:
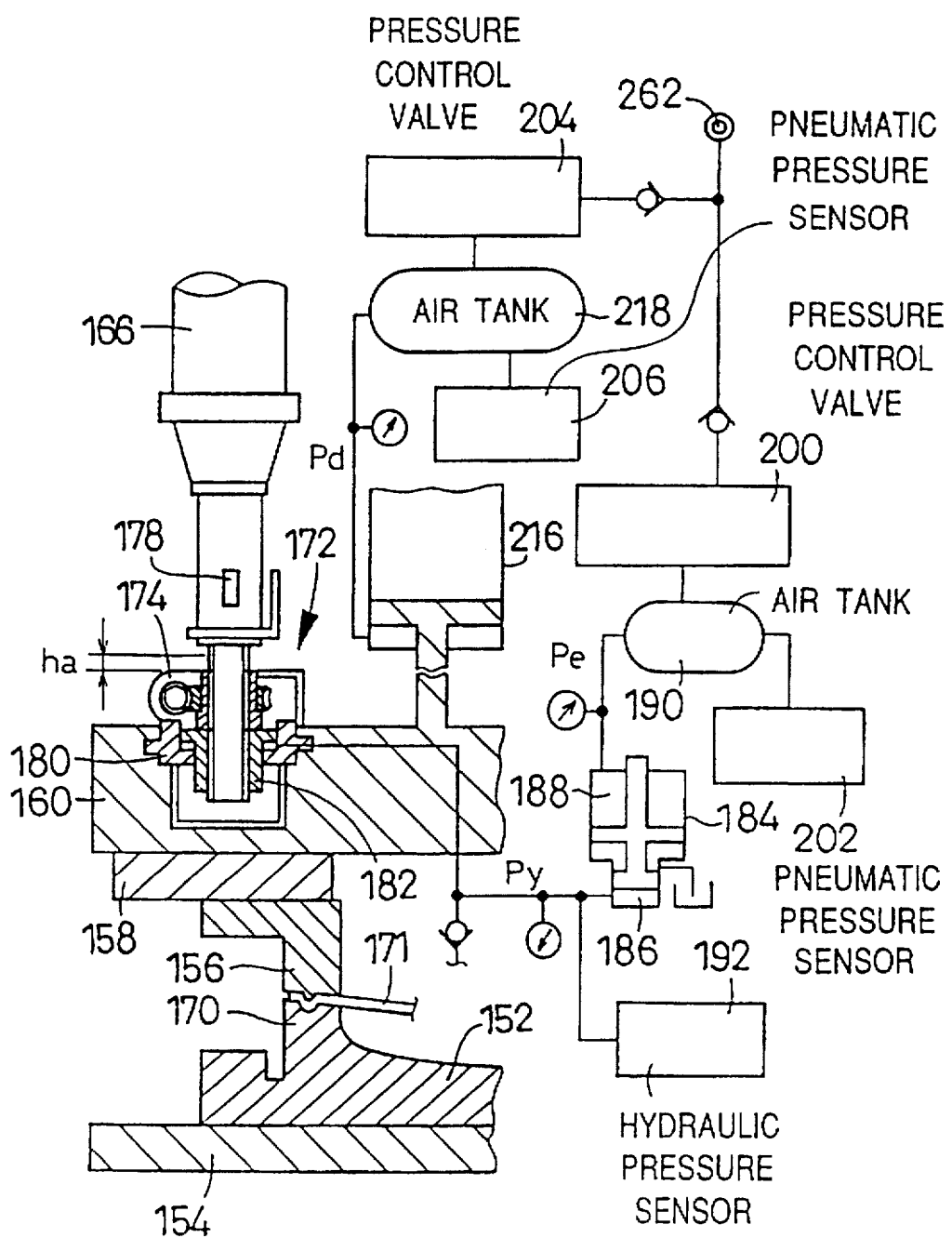
Figure 33:
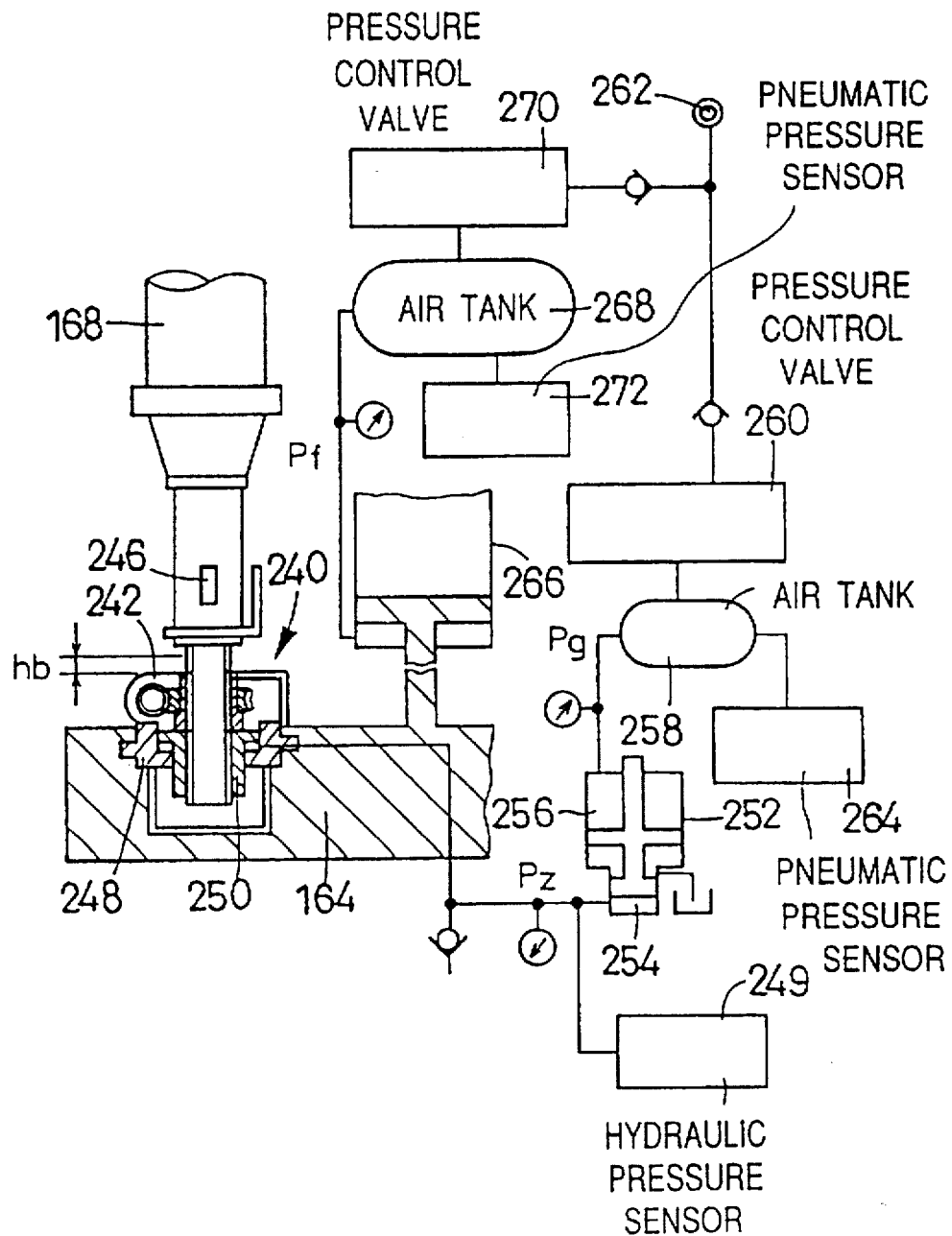
Figure 34:
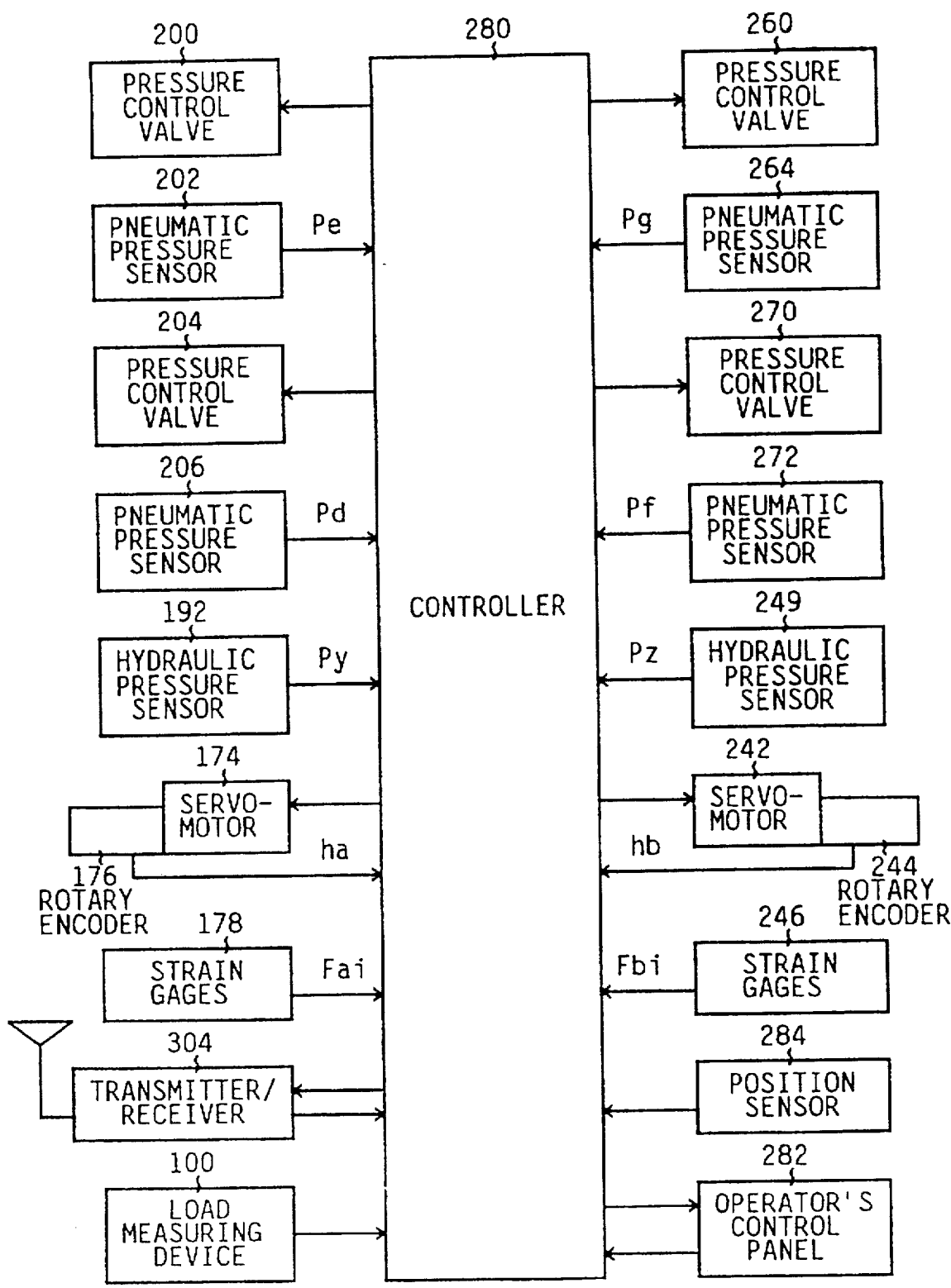
Figure 35:
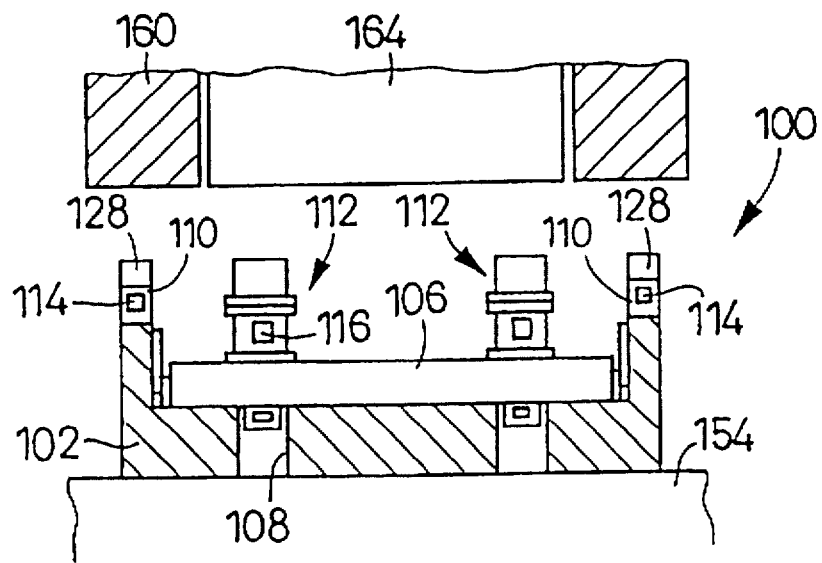
Figure 36:
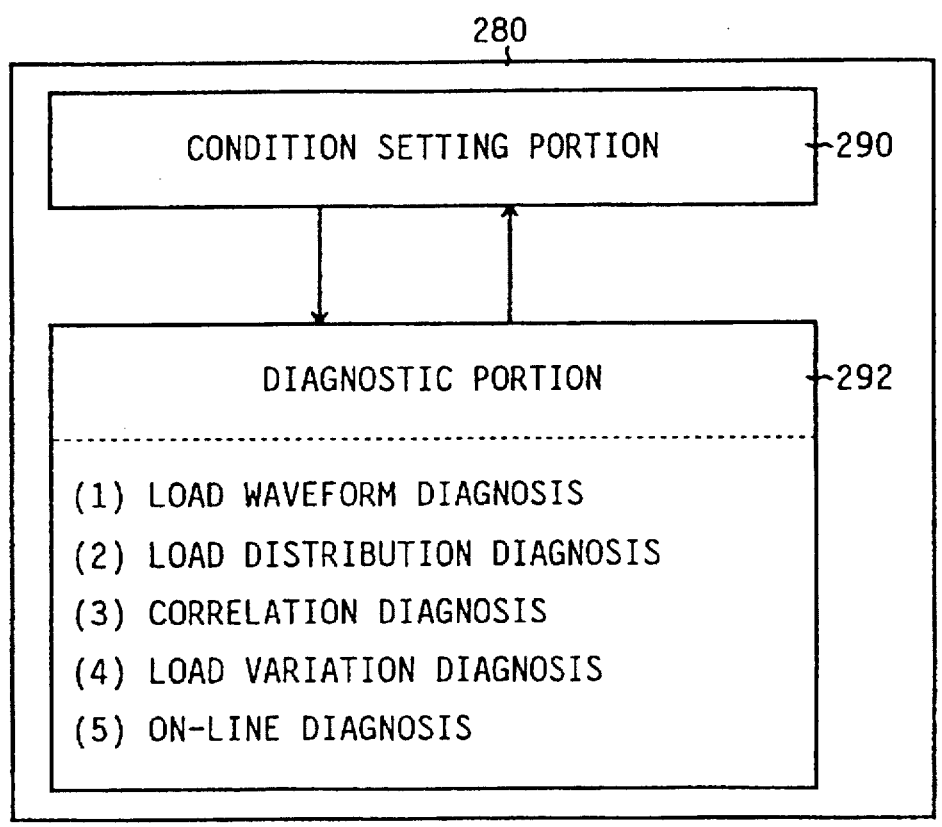
Figure 37:
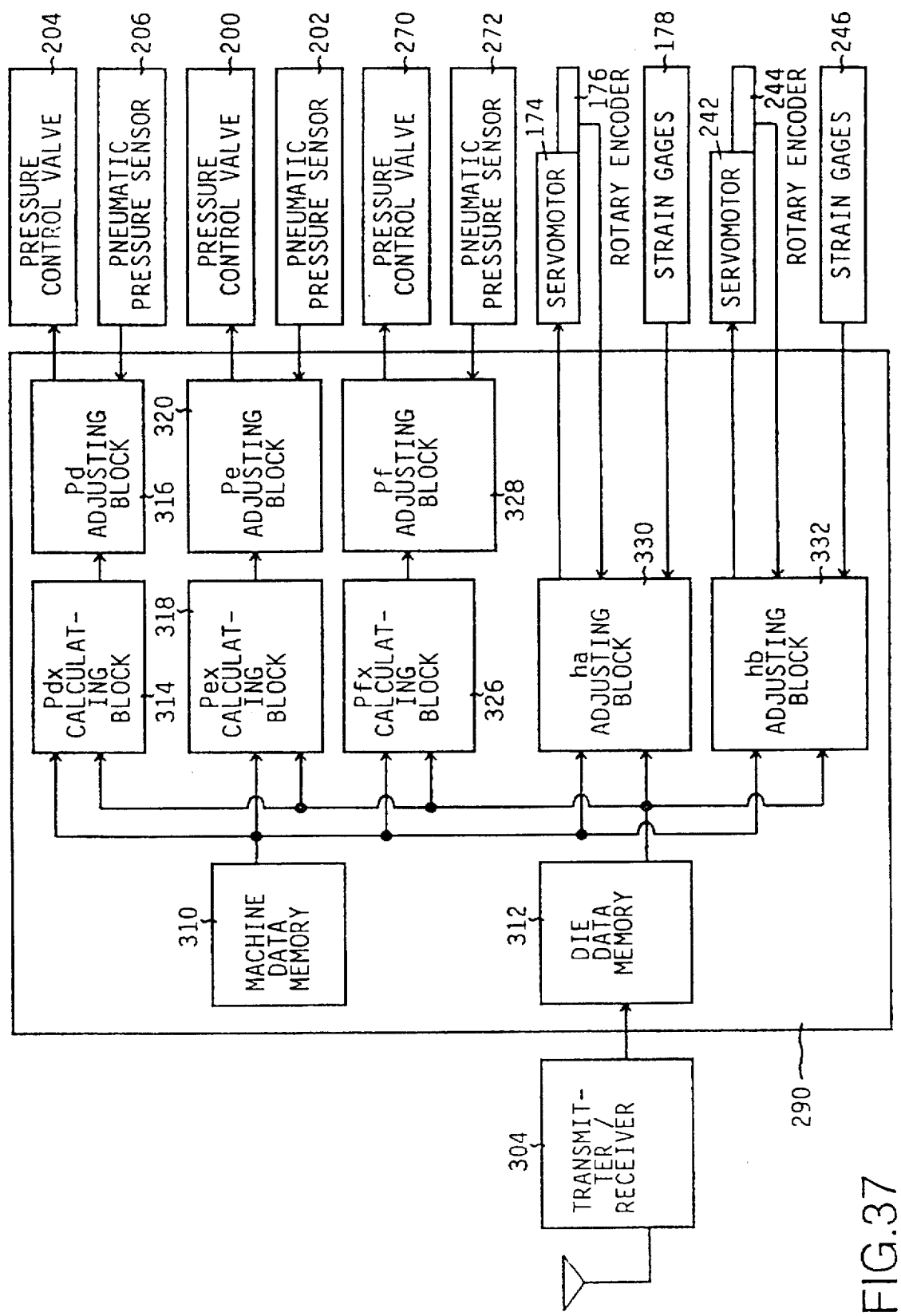
Figure 38:
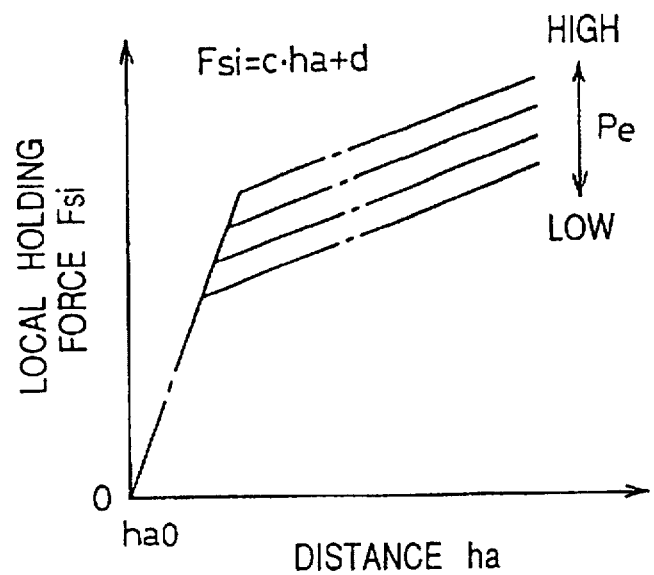
Figure 39:
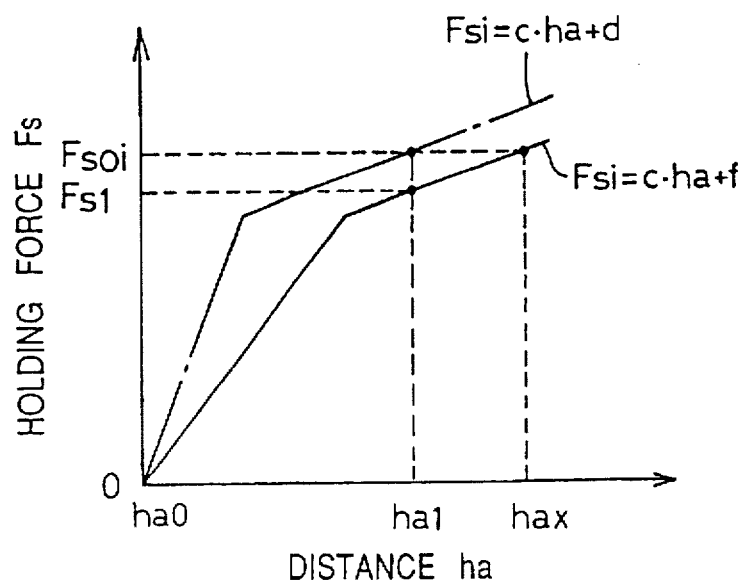
Figure 41:
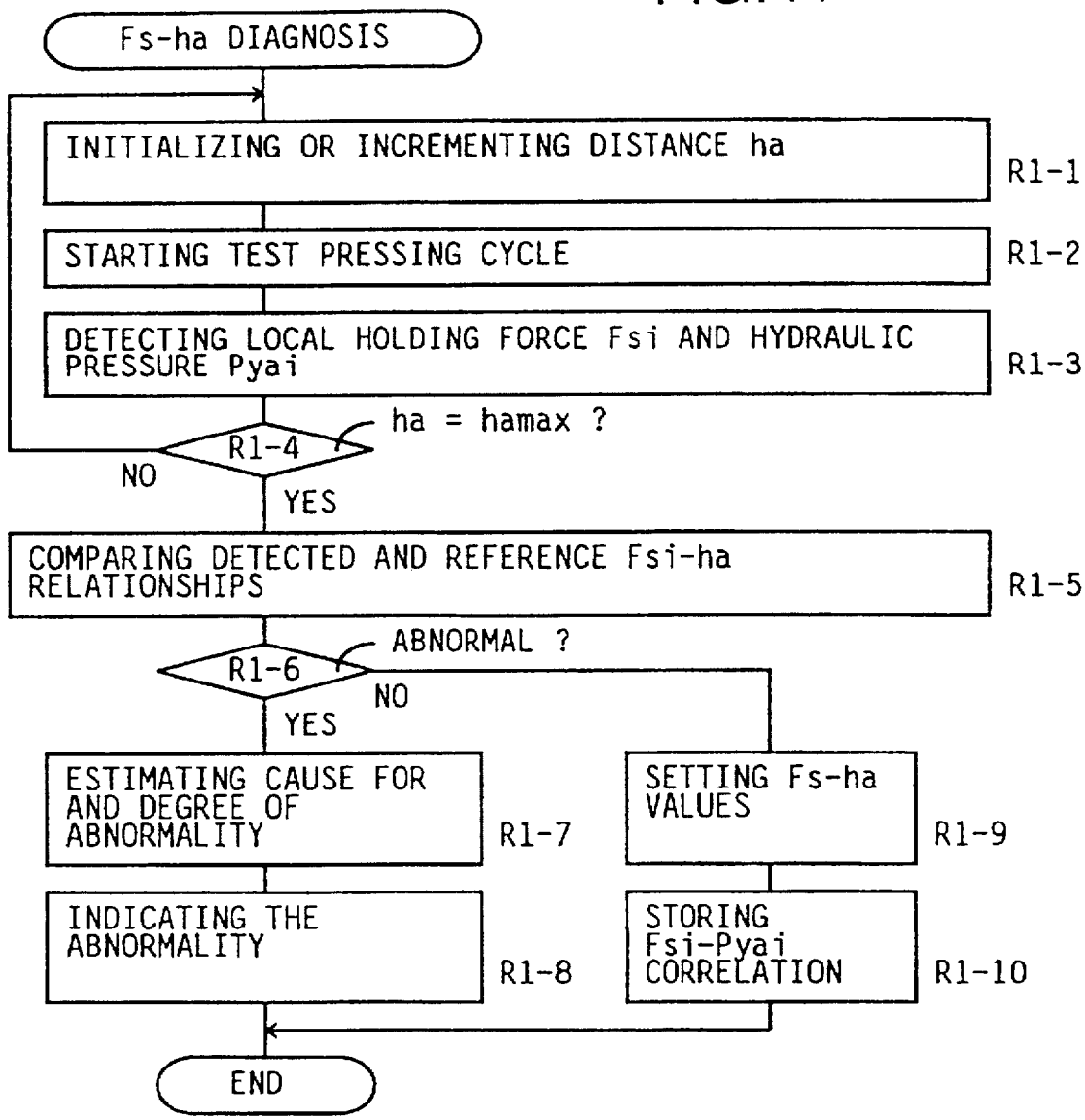
Figure 42A:
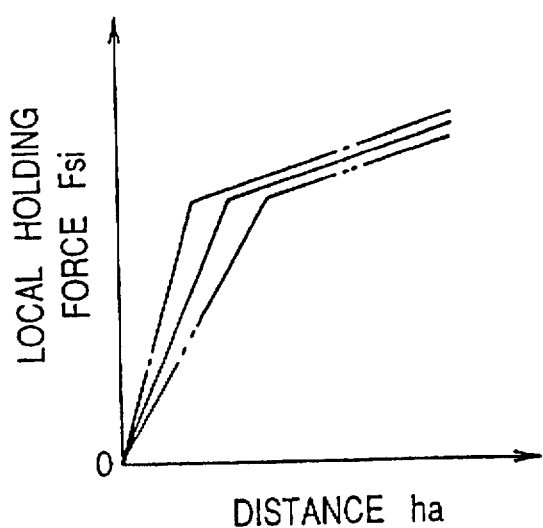
Figure 42B:
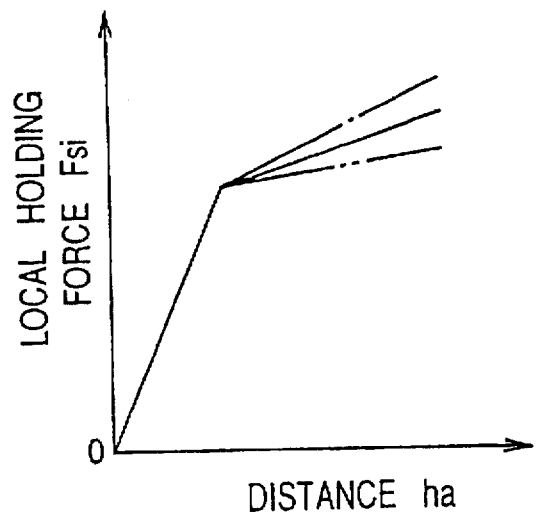
Figure 42C:
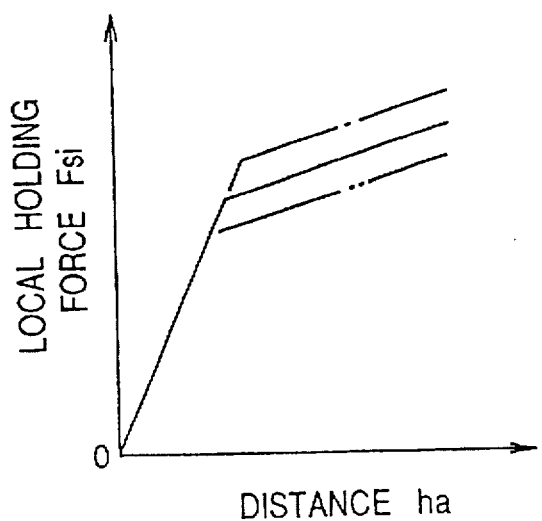
Figure 42D:
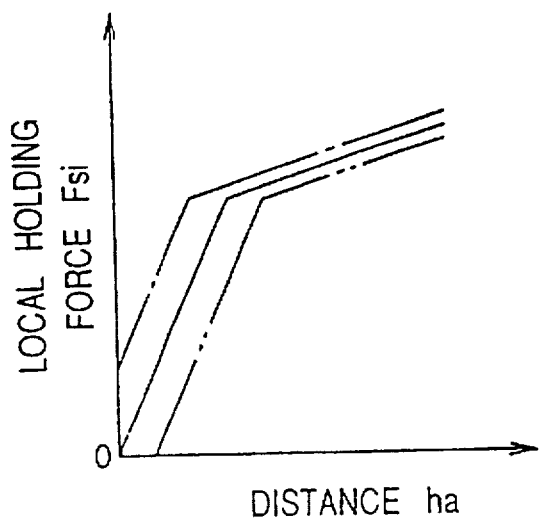
Figure 43:
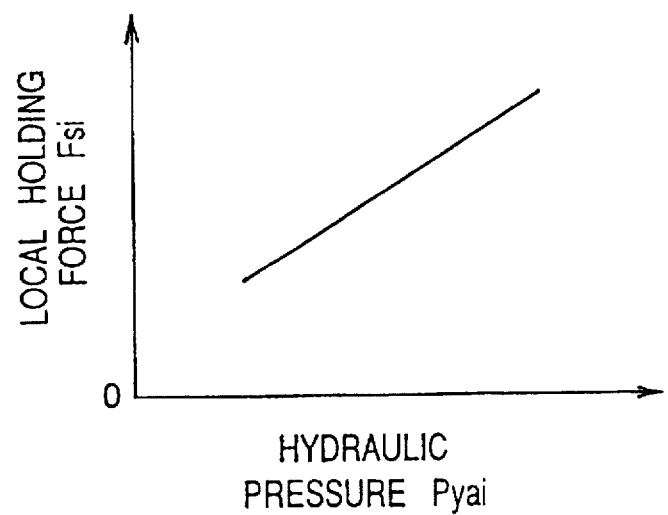
Figure 44:
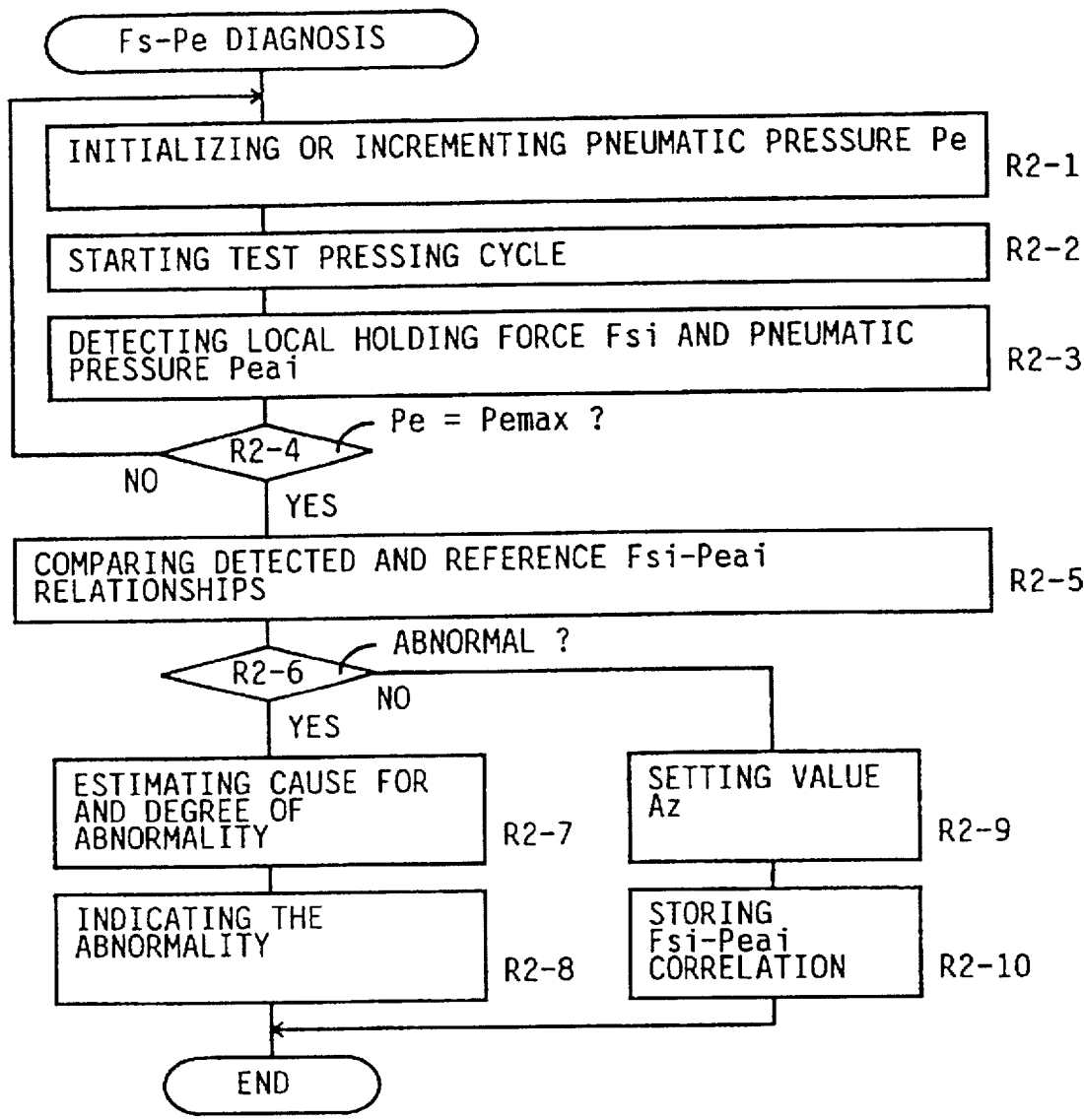
Figure 45:
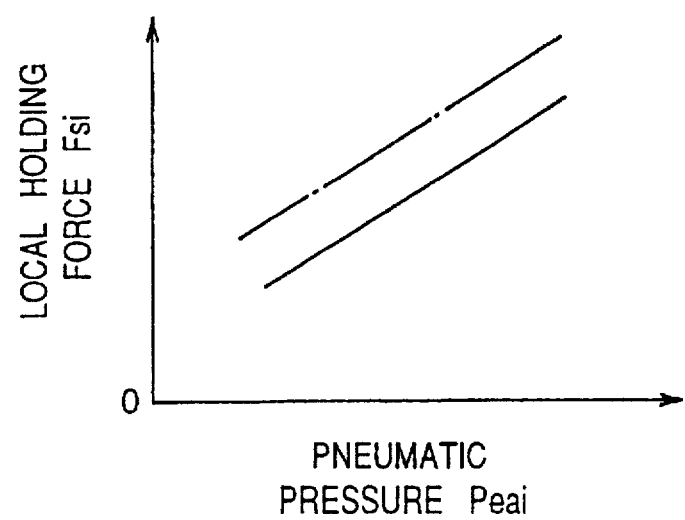
Figure 46:
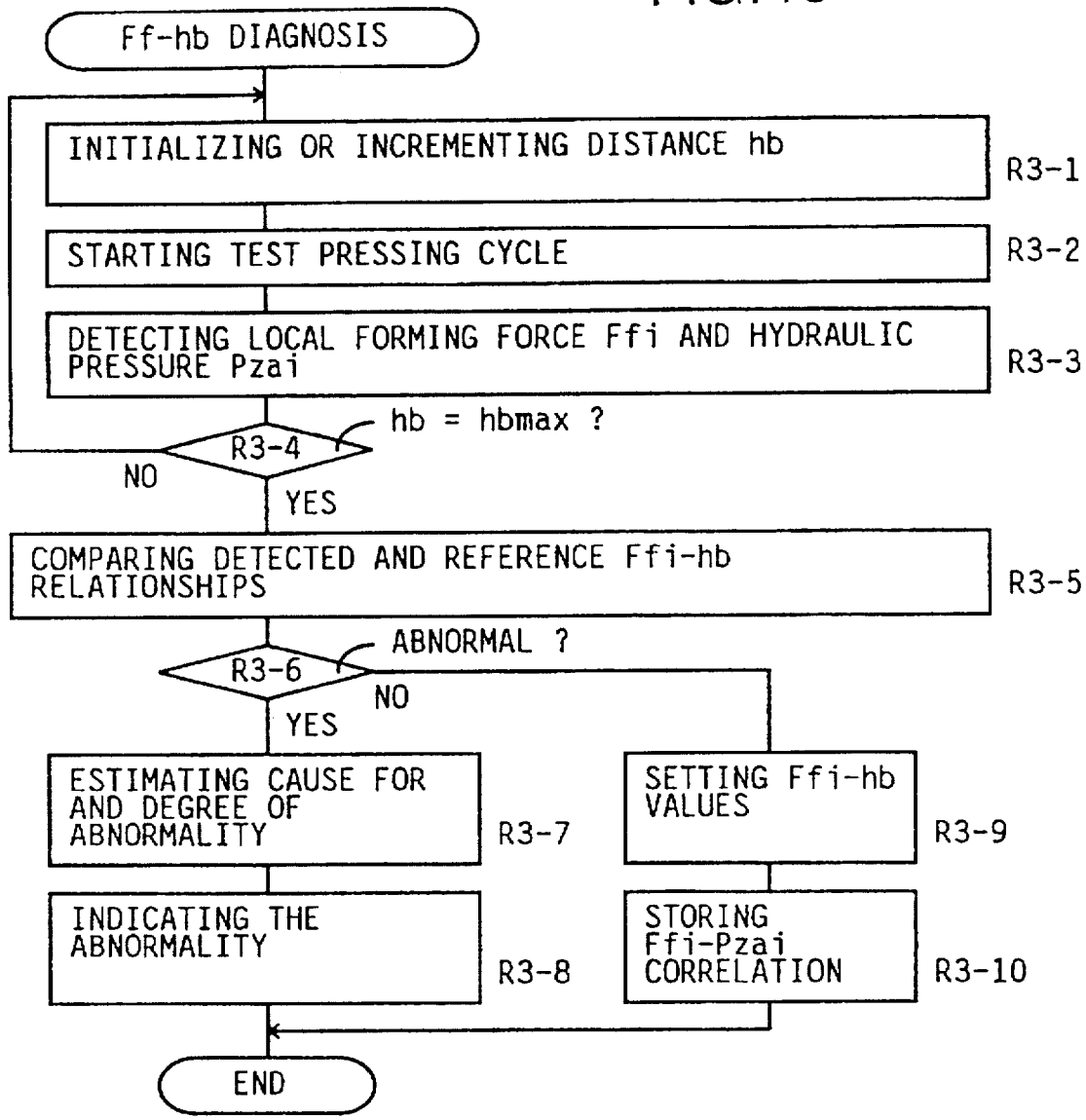
Figure 47:
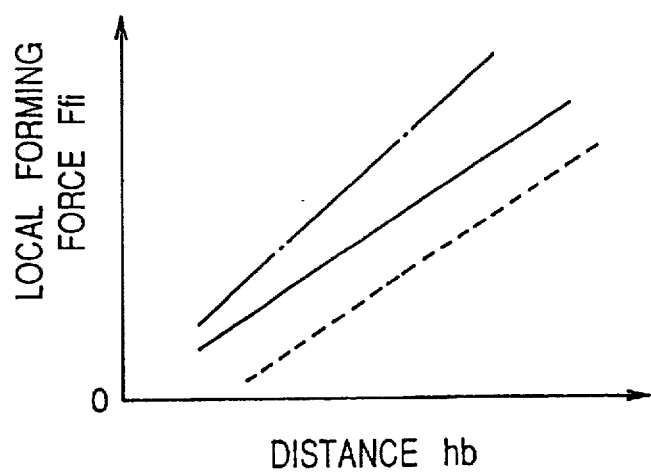
Figure 48:
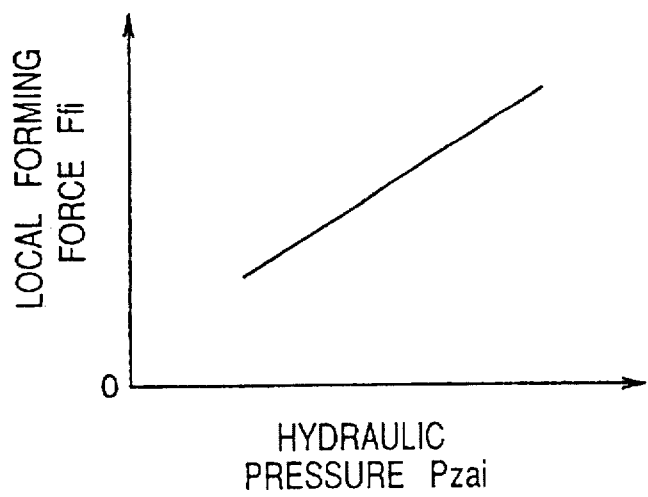
Figure 49:
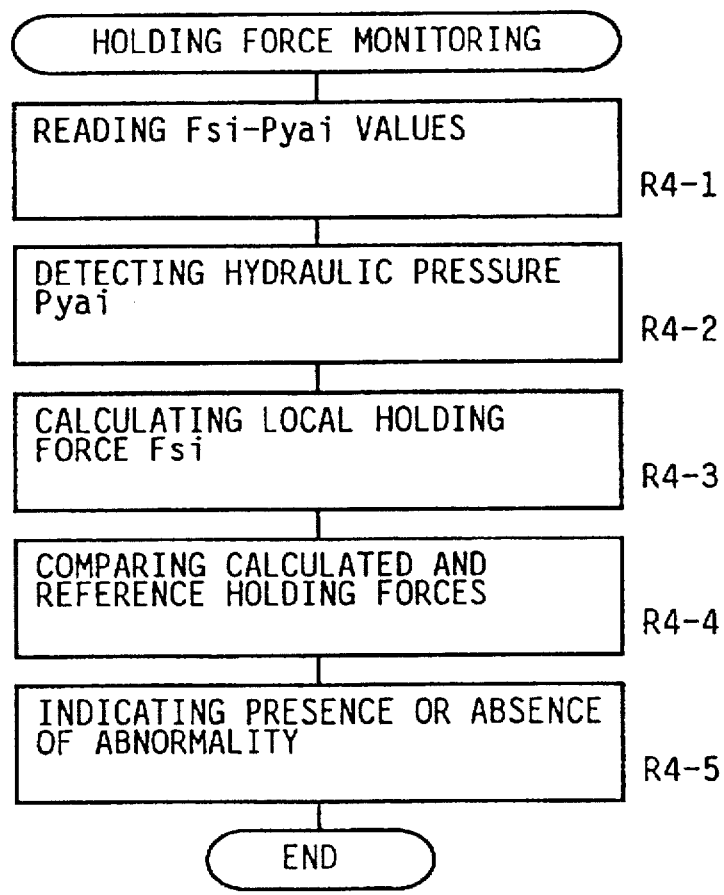
Figure 50:
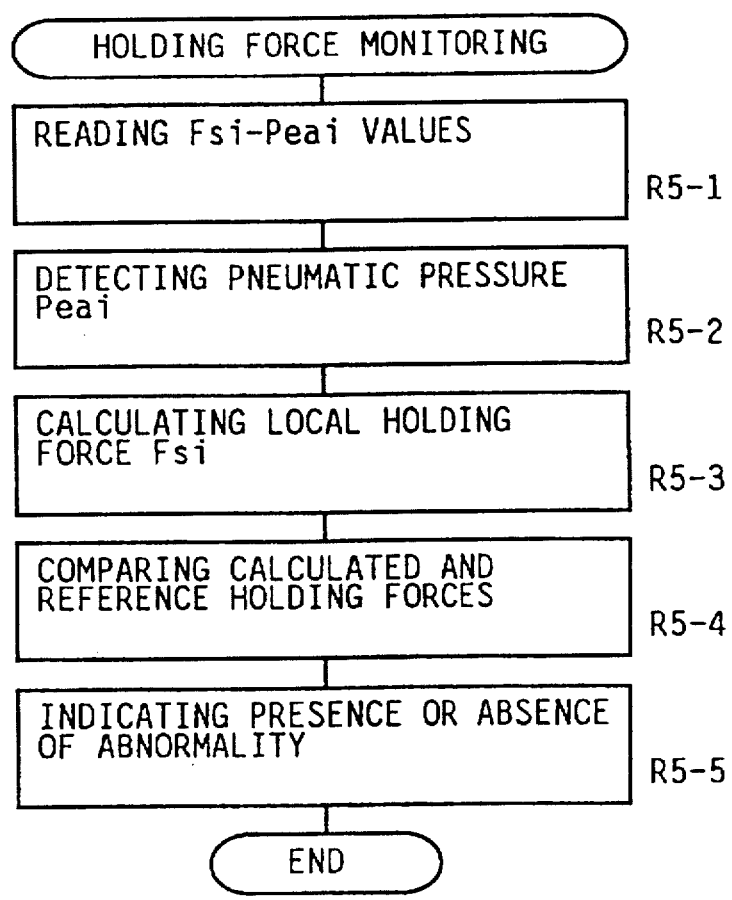
Figure 51:
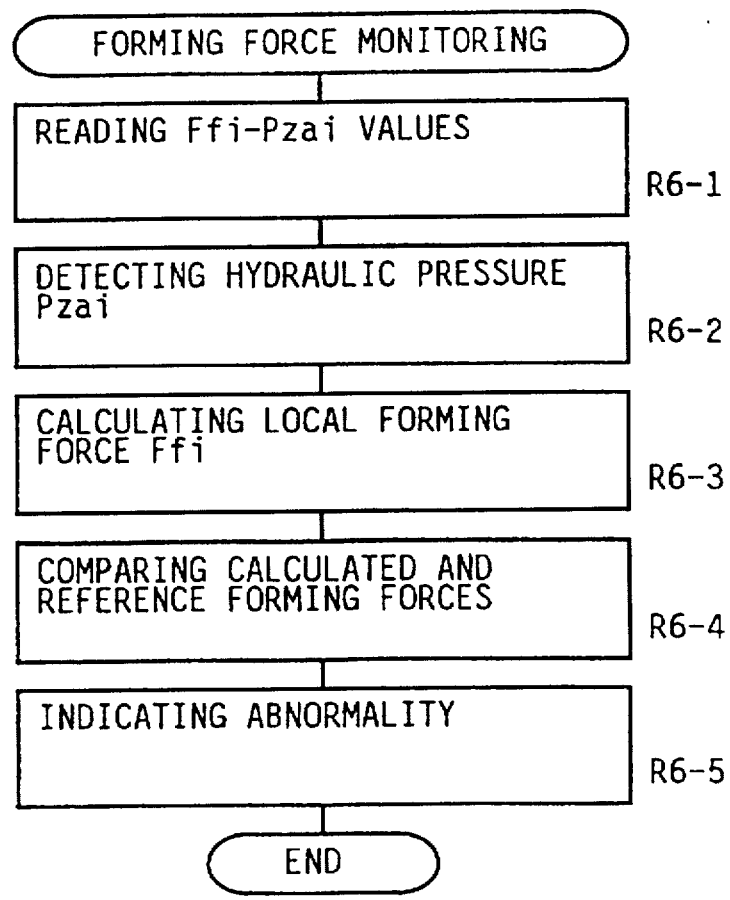
Figure 52:
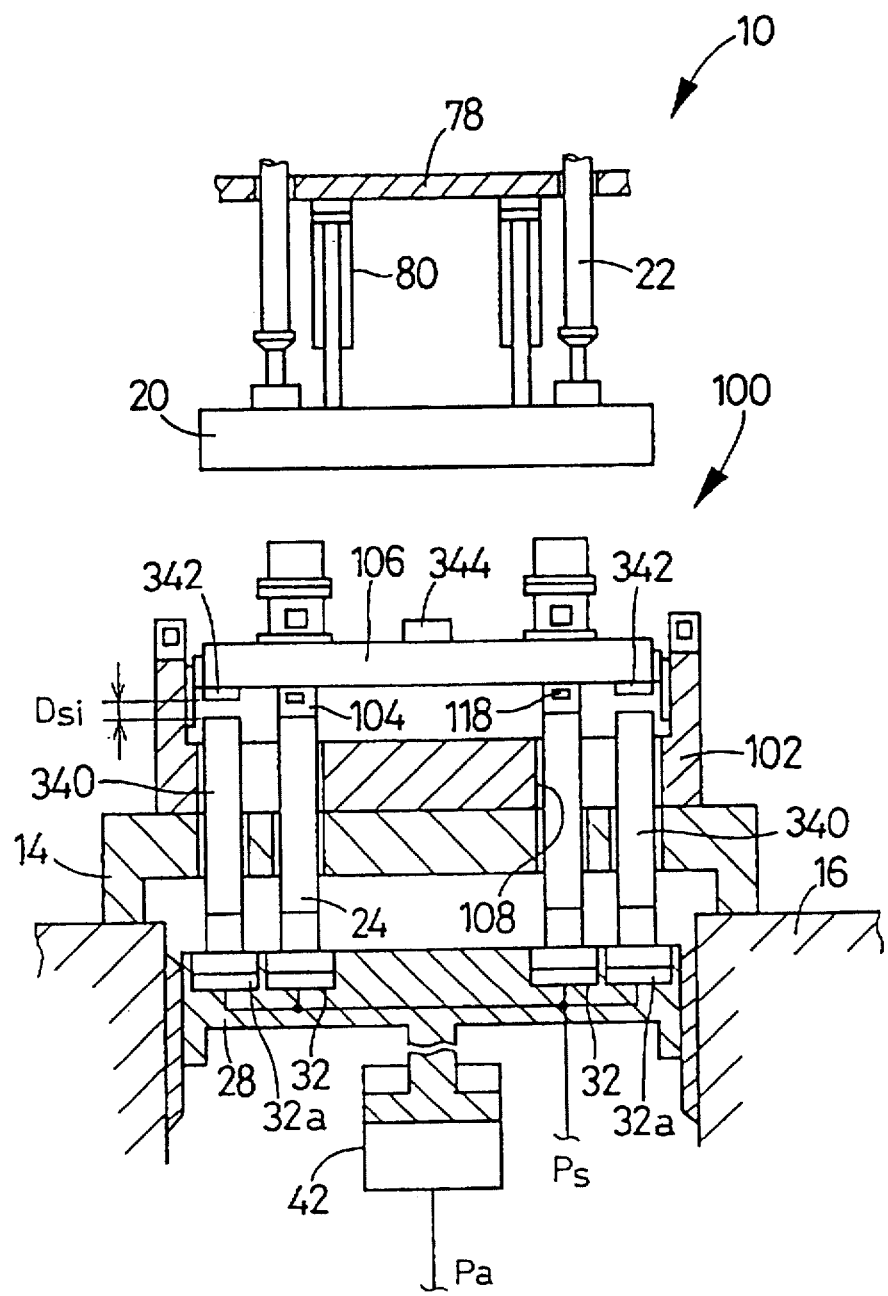
Figure 53:
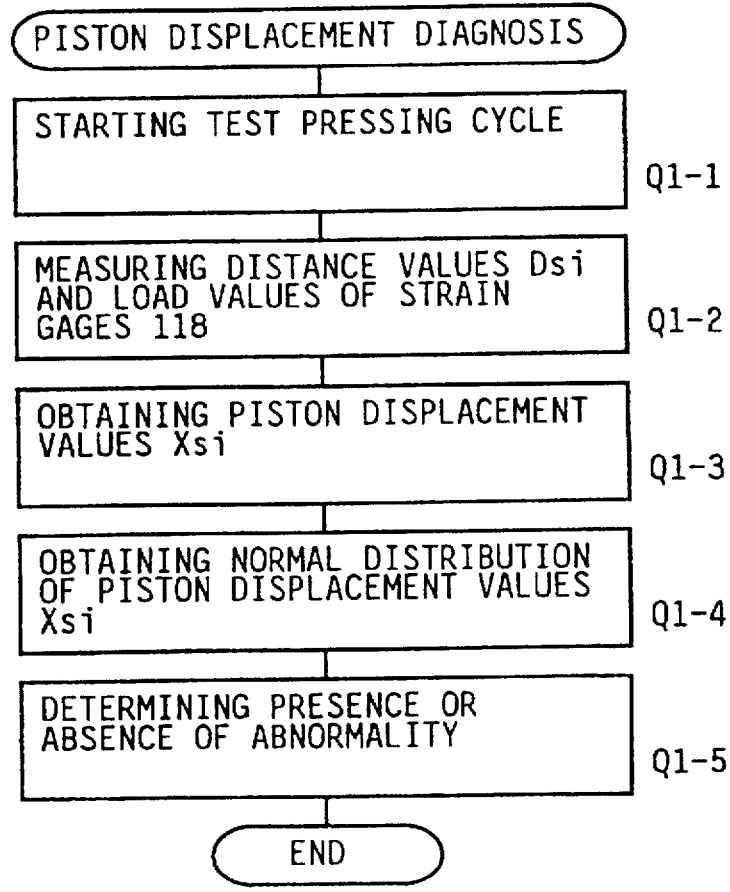
Figure 54:
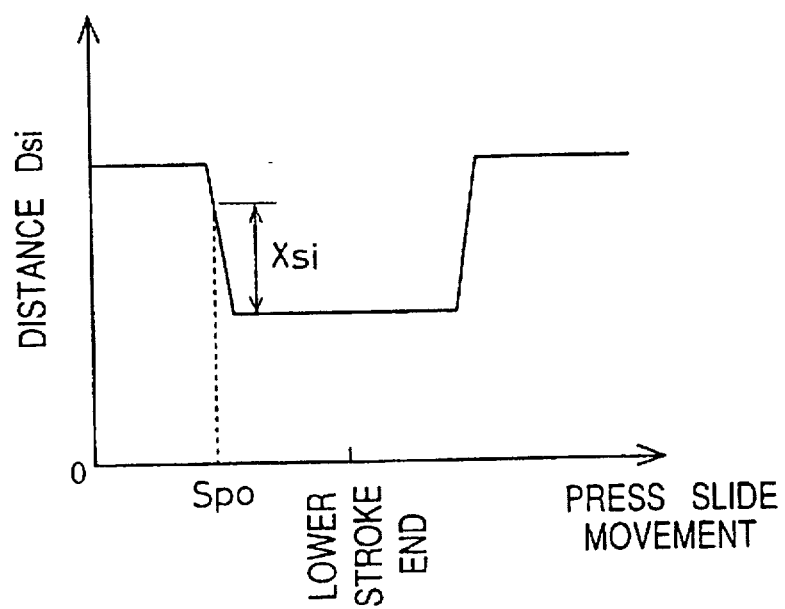
Figure 55:
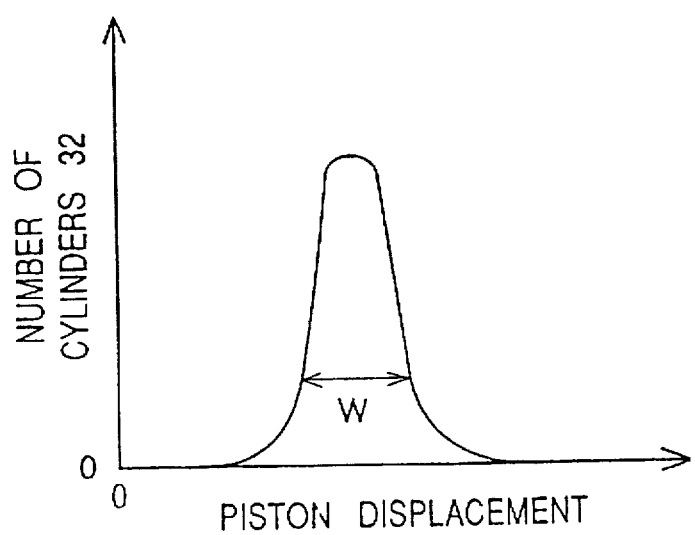
Figure 56:
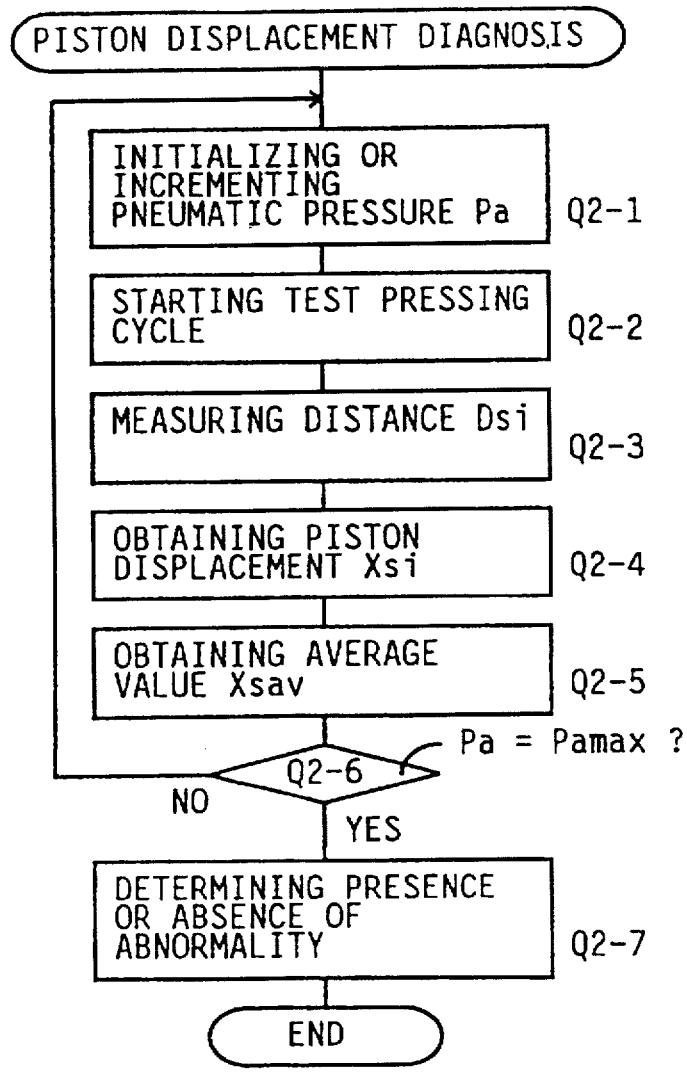
Figure 57:
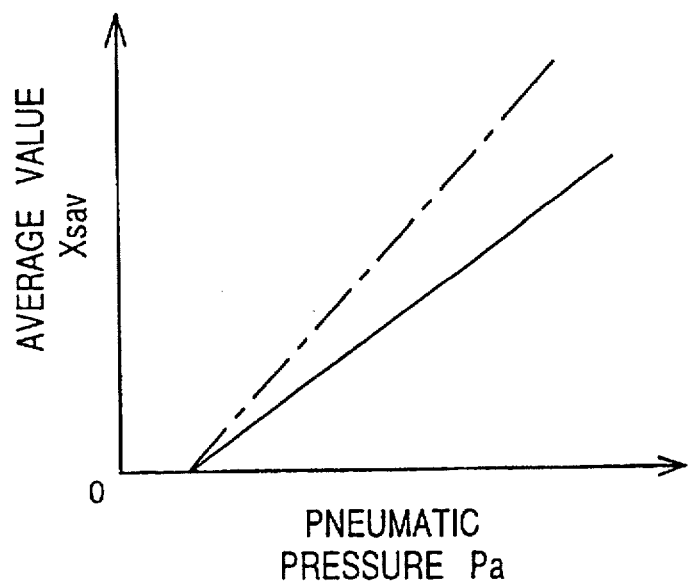
Figure 58:
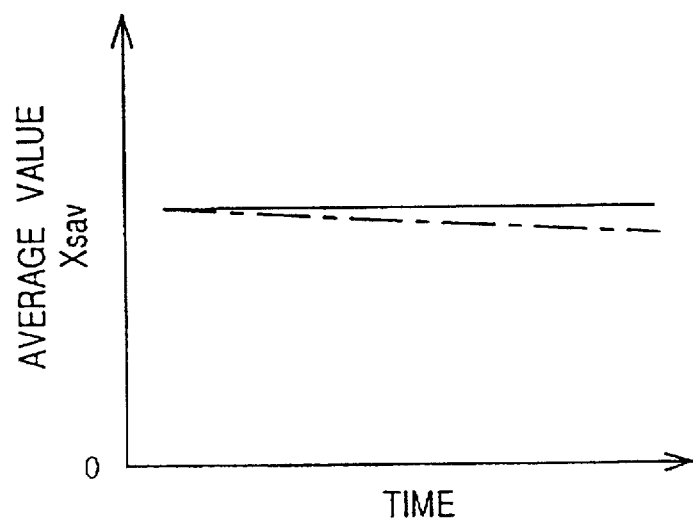
Figure 59:
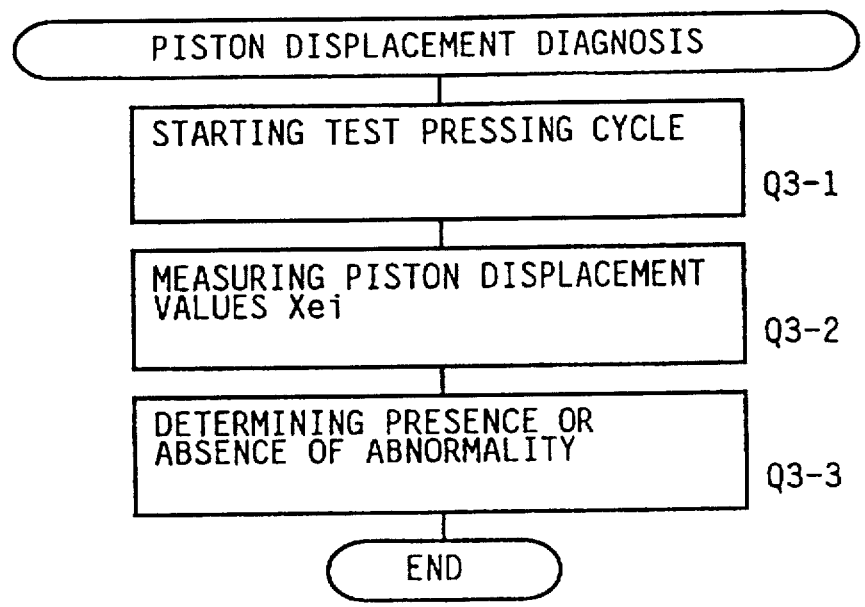
Figure 60:
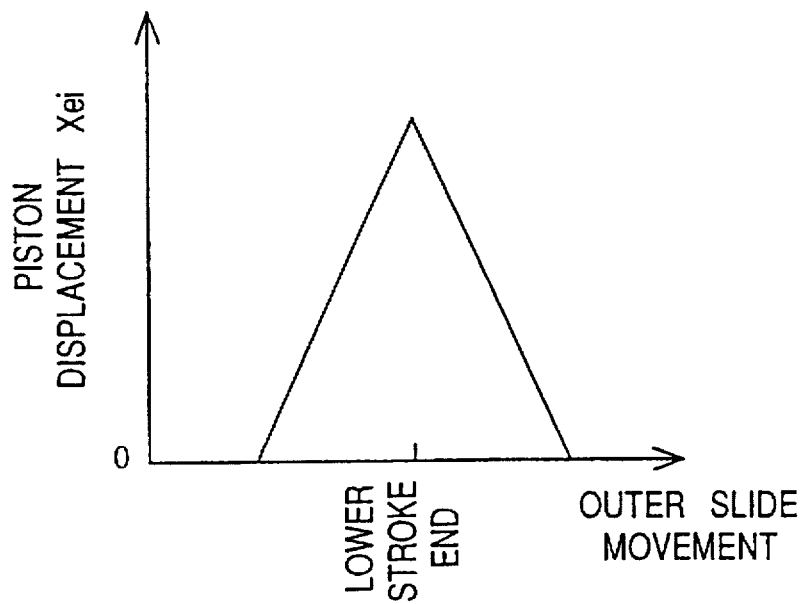
Figure 61:
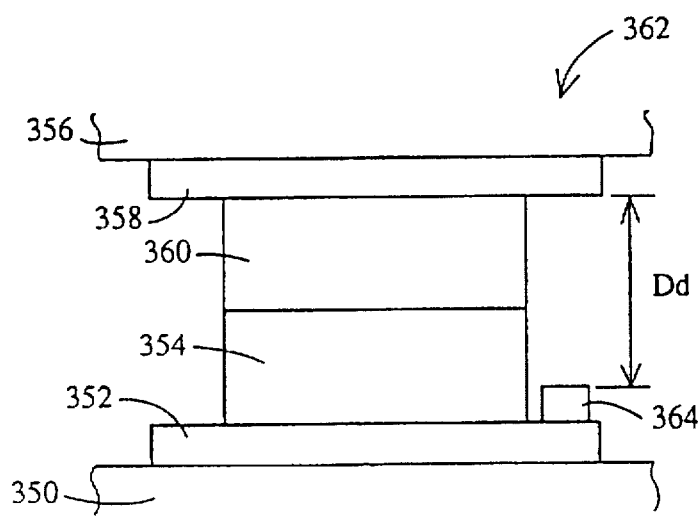
Figure 62:
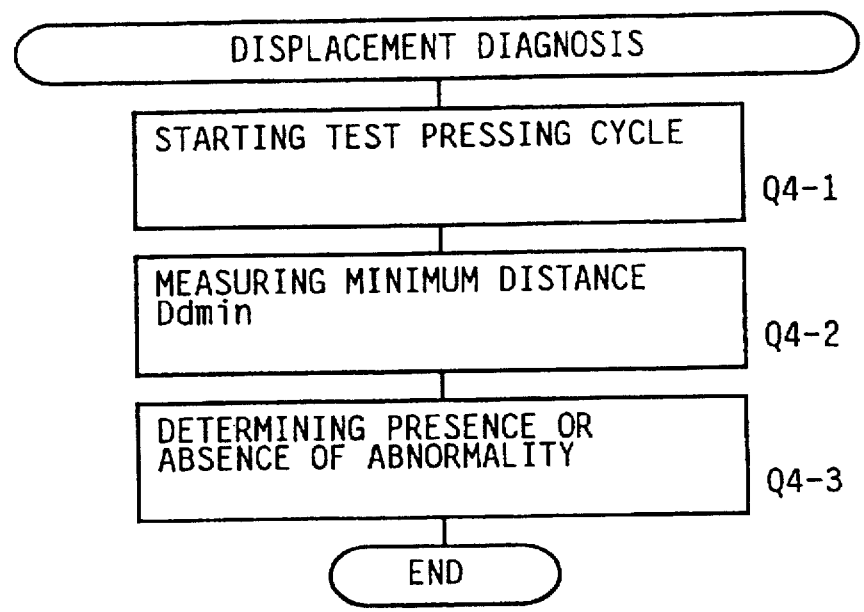
Figure 63:
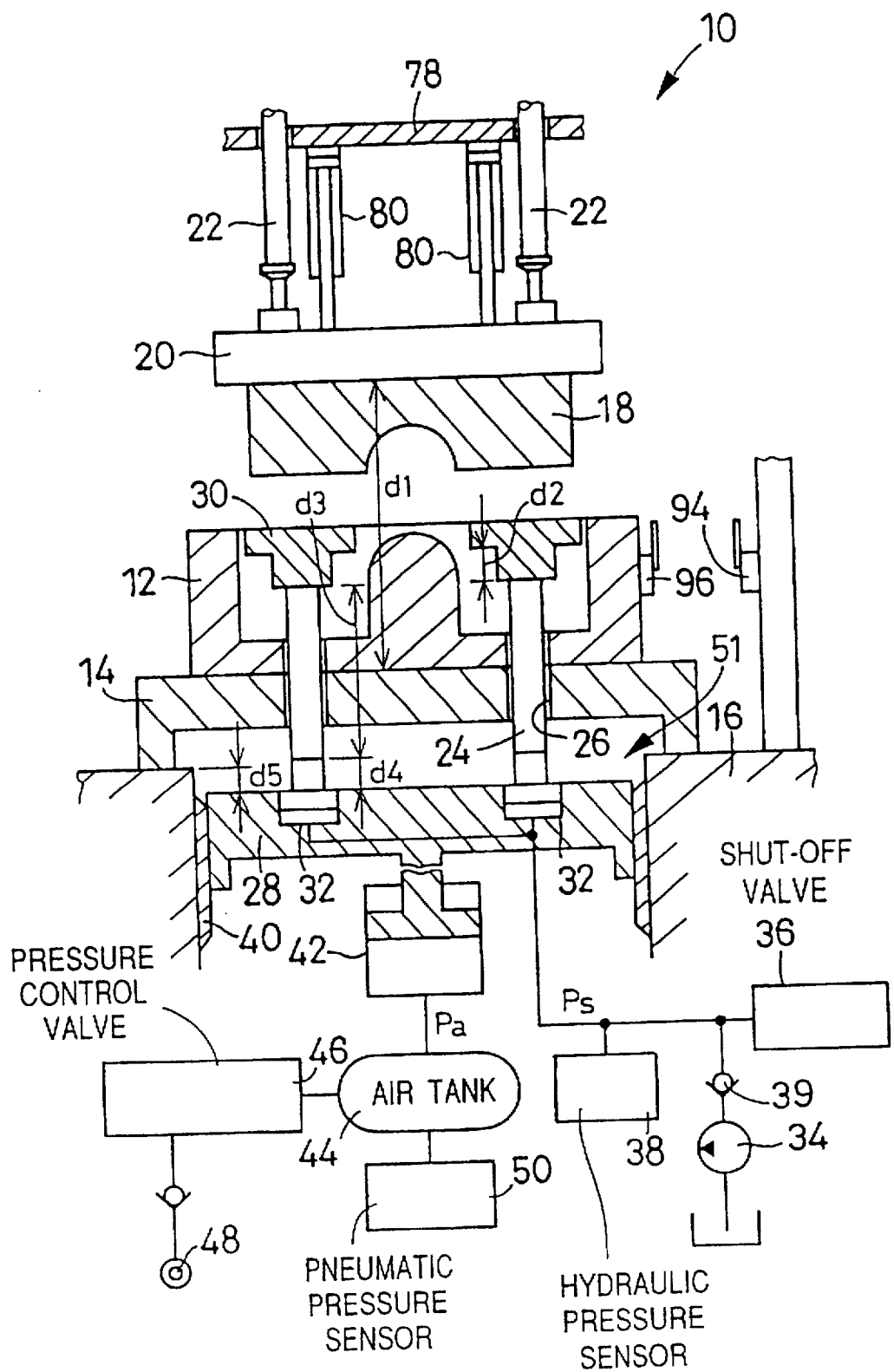
Figure 64:
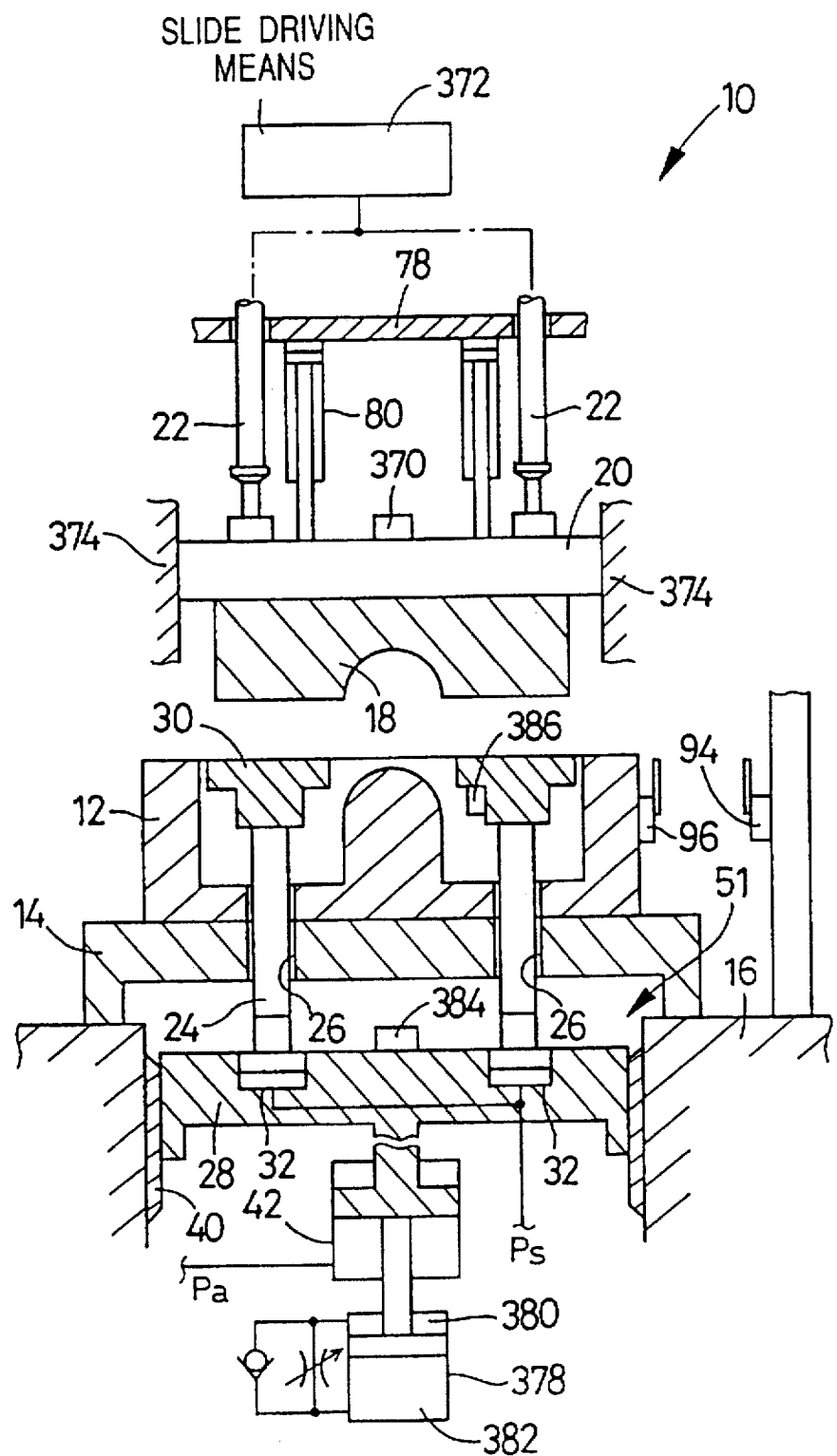
Figure 65:
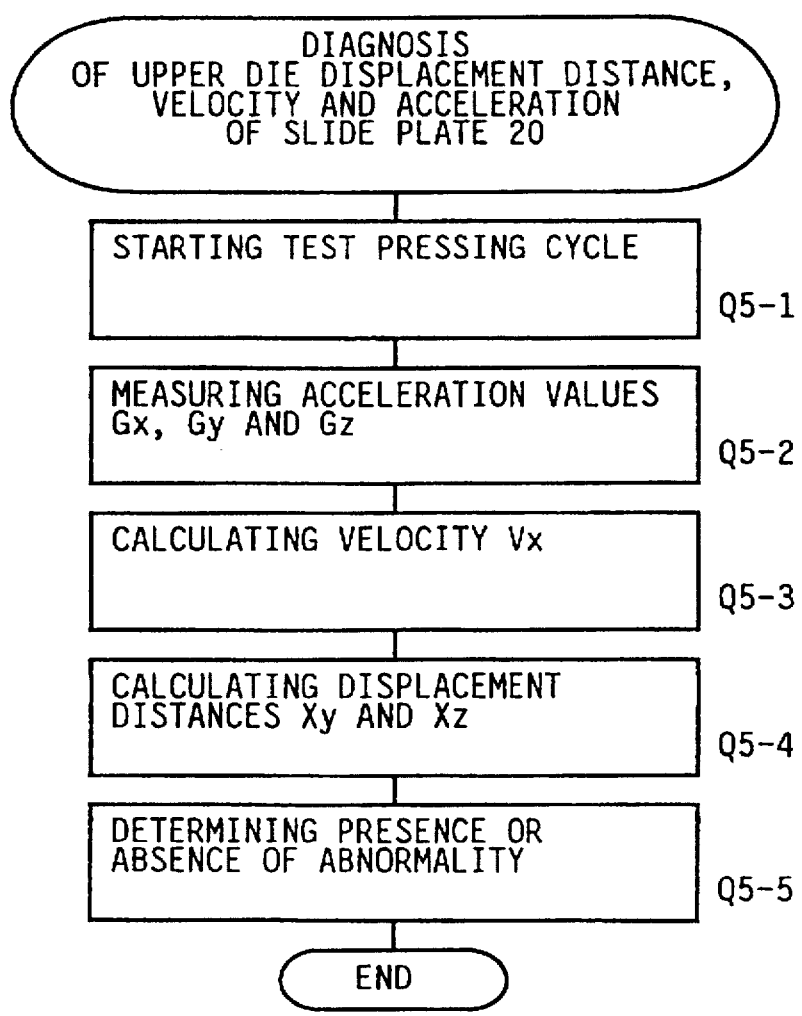
Figure 66:
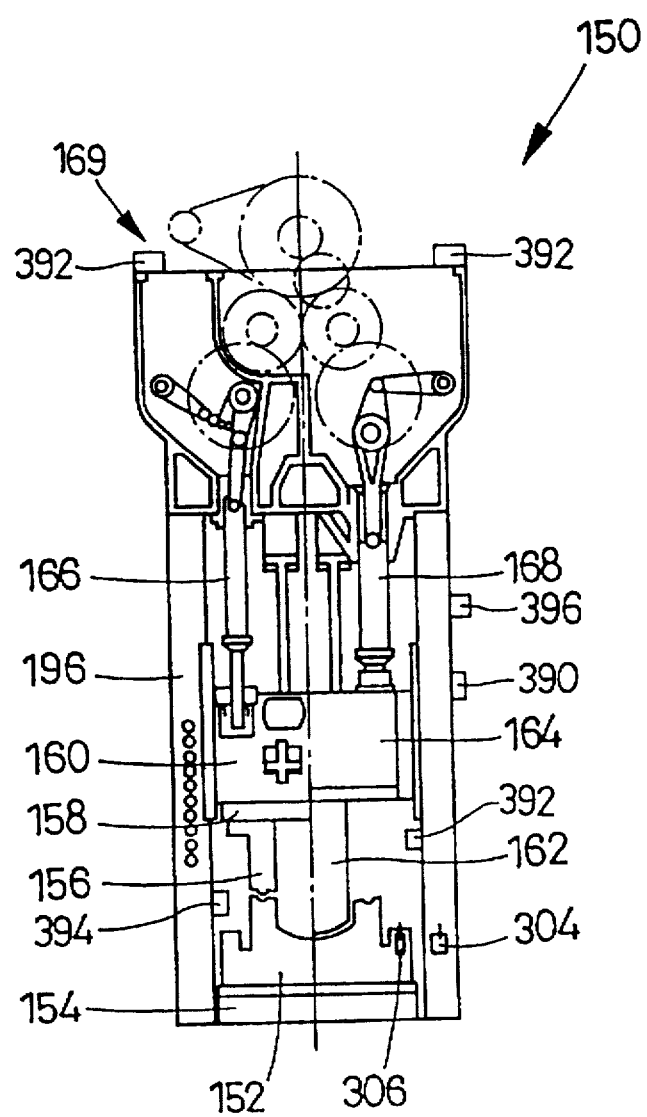
Figure 67:
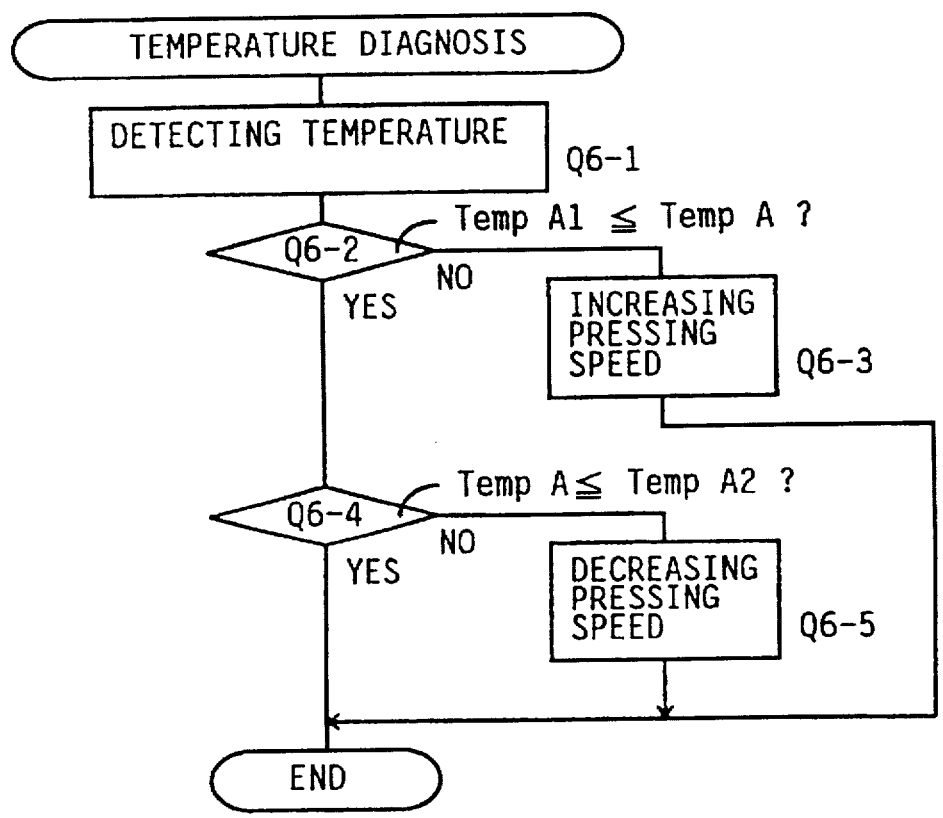
Figure 68:
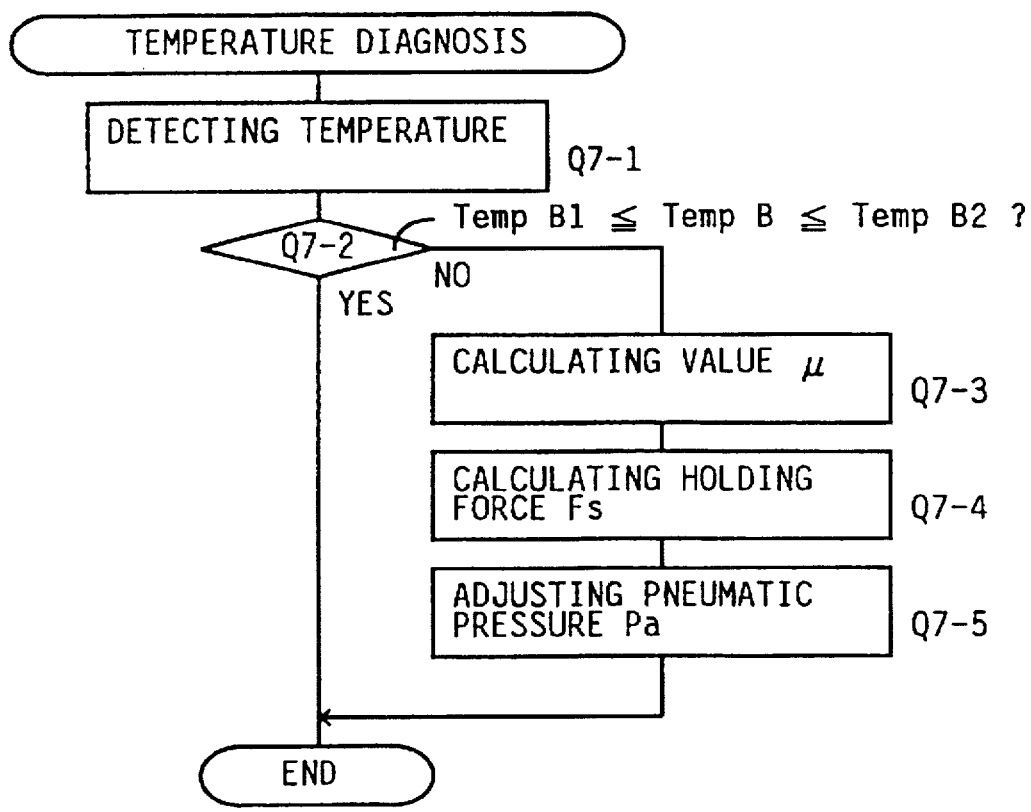
Figure 69:
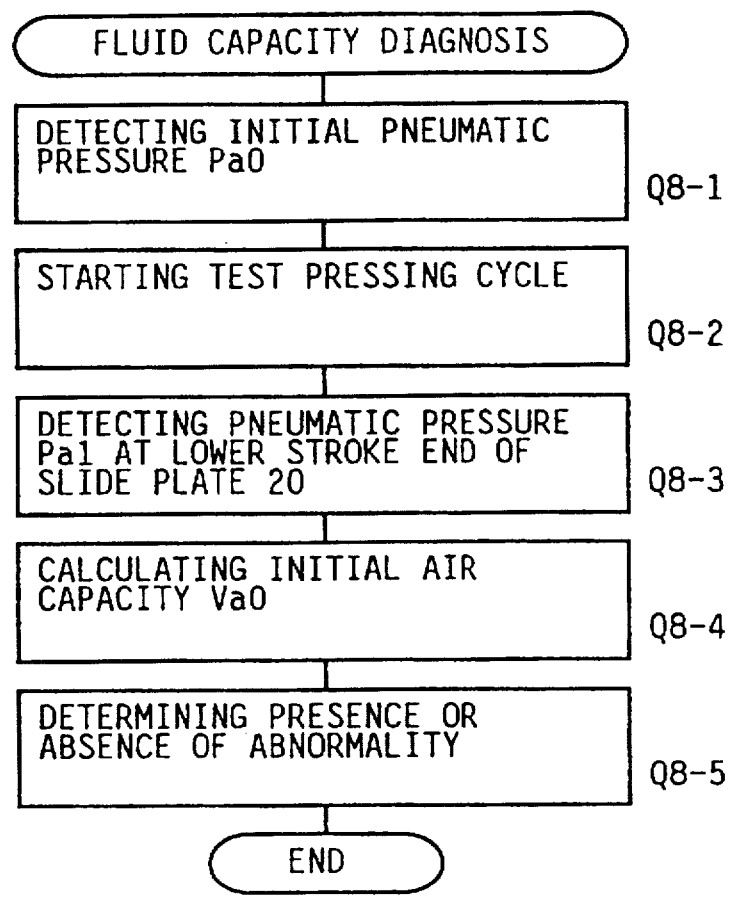
Figure 70:
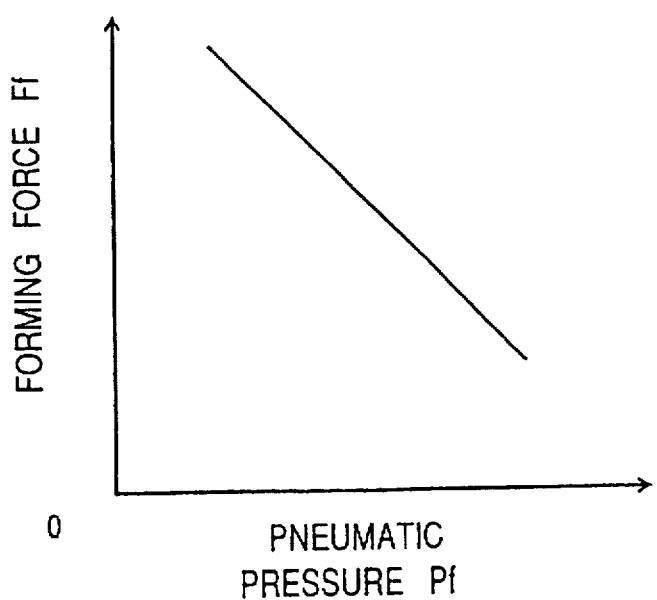
Figure 71:
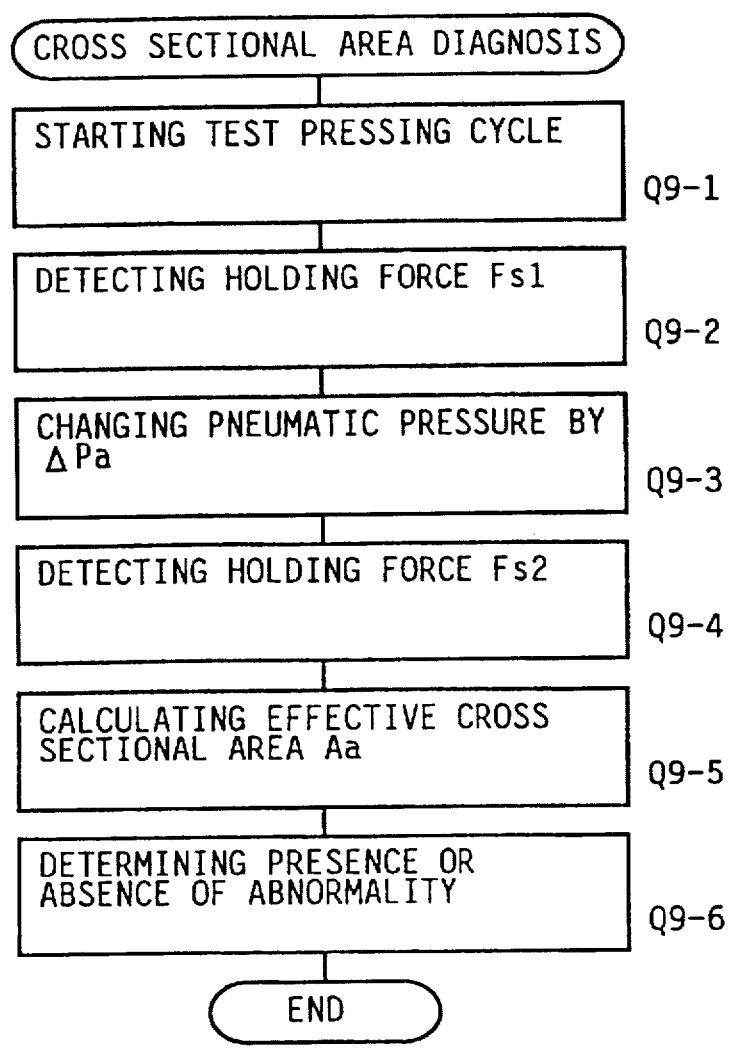
Figure 72:
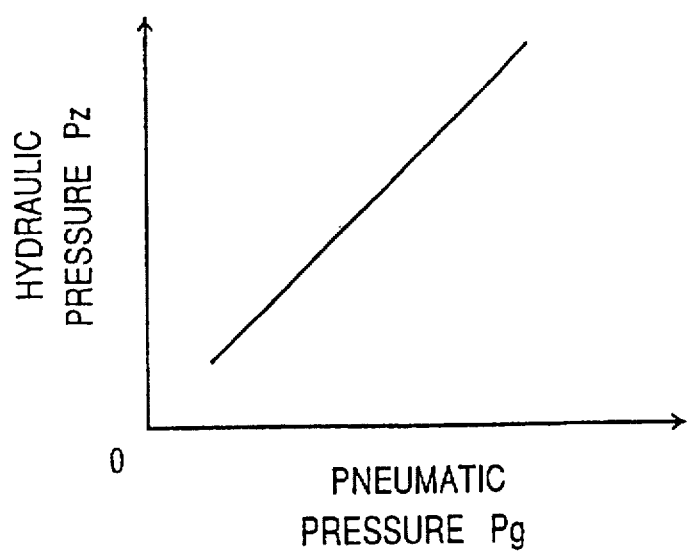
Figure 73:
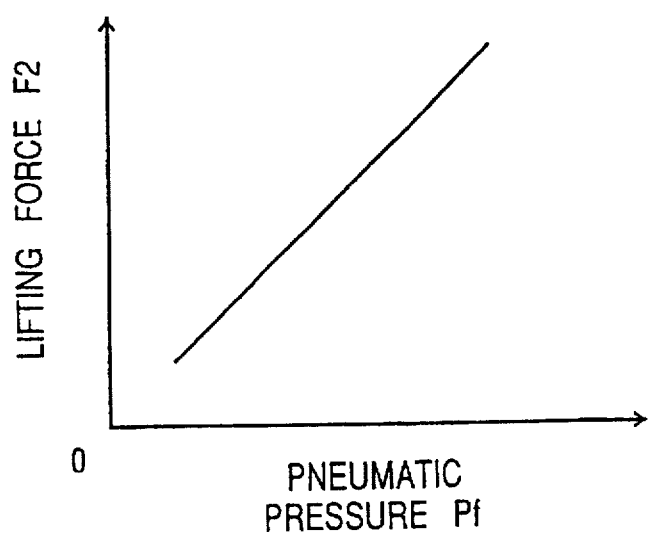

Fig. B is a graph indicating a relationship between a holding force Fs acting on a pressure ring of the press, as obtained by the apparatus of FIG. 4, and a pneumatic pressure Pa applied to a cushioning pneumatic cylinder of the press;

FIG. 9 is a graph indicating a relationship between a pressing force Fpi and a distance h as indicated in FIG. 2;

FIG. 10 is a flow chart illustrating an example of a load waveform diagnostic routine executed by a diagnostic portion shown in FIG. 5;

FIGS. 11(a), 11(b) and 11(c) are views showing examples of the waveform obtained by the diagnostic routine of FIG. 10;

FIG. 12 is a view showing another example of the waveform obtained by the diagnostic routine of FIG. 10;

FIG. 13 is a view showing a further example of the waveform obtained by the diagnostic routine of FIG. 10;

FIG. 14 is a flow chart illustrating an example of a load distribution diagnostic routine executed by the diagnostic portion of FIG. 5;

FIG. 15 is a graph indicating one example of a load distribution obtained by the diagnostic routine of FIG. 14;

FIG. 16 is a flow chart illustrating an example of a correlation diagnostic routine executed by the diagnostic portion of FIG. 5;

FIG. 17 is a graph indicating one example of a correlation obtained by the diagnostic routine of FIG. 16;

FIG. 18 is a graph indicating a correlation between the holding force Fs and a generated hydraulic pressure Psa, which is also obtained by the diagnostic routine of FIG. 16, together with the correlationship of FIG. 17;

FIG. 19 is a flow chart illustrating another example of the correlation diagnostic routine executed by the diagnostic portion of FIG. 5;

FIG. 20 is a graph indicating one example of a correlationship obtained by the diagnostic routine of FIG. 19;

FIG. 21 is a graph indicating a correlation between the holding force Fs and a generated pneumatic pressure Paa, which is also obtained by the diagnostic routine of FIG. 19, together with the correlationship of FIG. 20;

FIG. 22 is a flow chart illustrating a further example of the correlation diagnostic routine of FIG. 19;

FIG. 23 is a graph indicating an example of a correlationship obtained by the diagnostic routine of FIG. 22;

FIG. 24 is a graph indicating a correlationship between a pressing force Fpi and a generated hydraulic pressure Pmai, which is also obtained by the diagnostic routine of FIG. 22, together with the correlationship of FIG. 23;

FIG. 25 is a flow chart illustrating an example of a load variation diagnostic routine executed by the diagnostic portion of FIG. 5;

FIG. 26 is a graph indicating an example of a load variation pattern obtained by the diagnostic routine of FIG. 25;

FIG. 27 is a flow chart illustrating an example of an ON-line pressing load monitoring routine executed by the diagnostic portion of FIG. 5;

FIG. 28 is a flow chart illustrating an example of an ON-line holding force monitoring routine executed by the diagnostic portion of FIG. 5;

FIG. 29 is a flow chart illustrating another example of the ON-line holding force monitoring routine;

FIG. 30 is a flow chart illustrating an example of an ON-line holding force distribution monitoring routine executed by the diagnostic portion of FIG. 5;

FIG. 31 is an elevational view showing an example of a double-action press to which the diagnosing method of this invention is also suitably applicable;

FIG. 32 is a schematic elevational view showing an outer die-height adjusting mechanism and the related components, provided in the press of FIG. 31;

FIG. 33 is a schematic elevational view showing an inner die-height adjusting mechanism and the related components, provided in the press of FIG. 31;

FIG. 34 is a schematic block diagram illustrating a control system for the double-acting press of FIG. 31;

FIG. 35 is a fragmentary elevational view of the press of FIG. 31 as equipped with a load measuring apparatus;

FIG. 36 is a block diagram indicating functions of the control system of FIG. 34;

FIG. 37 is a schematic block diagram illustrating the functions of a condition setting portion shown in FIG. 36 of the control system of FIG. 34;

FIG. 38 is a graph indicating a relationship between a holding force Fsi and a distance ha on the press of FIG. 31;

FIG. 39 is a graph explaining a manner of calculating an optimum distance has for obtaining an optimum holding force Fsoi, on the basis of the relationship of FIG. 38;

FIGS. 40(a) through 40(d) are graphs indicating examples of a load waveform obtained by a load waveform diagnostic routine executed by a diagnostic portion shown in FIG. 36 of the control system of FIG. 34;

FIG. 41 is a flow chart illustrating an example of a correlation diagnostic routine executed by the diagnostic portion of FIG. 36;

FIGS. 42(a) through 42(d) are graphs indicating examples of a correlationship obtained by the diagnostic routine of FIG. 41;

FIG. 43 is a graph indicating a correlationship between the holding force Fsi and a generated hydraulic pressure Pyai, which is also obtained by the diagnostic routine of FIG. 41, together with the correlation of FIG. 42;

FIG. 44 is a flow chart illustrating another example of the correlation diagnostic routine executed by the diagnostic portion of FIG. 36;

FIG. 45 is a graph indicating an example of a correlationship obtained by the diagnostic routine of FIG. 44;

FIG. 46 is a flow chart illustrating a further example of the correlation diagnostic routine executed by the diagnostic portion of FIG. 36;

FIG. 47 is a graph indicating an example of a correlationship obtained by the diagnostic routine of FIG. 46;

FIG. 48 is a graph indicating a correlationship between a forming force Ffi and a generated hydraulic pressure Pzai, which is also obtained by the diagnostic routine of FIG. 46, together with the correlationship of FIG. 47;

FIG. 49 is a flow chart illustrating an example of an ON-line holding force monitoring routine executed by the diagnostic portion of FIG. 36;

FIG. 50 is a flow chart illustrating another example of the ON-line holding force monitoring routine;

FIG. 51 is a flow chart illustrating an example of an ON-line forming force monitoring routine executed by the diagnostic portion of FIG. 36;

FIG. 52 is an elevational view of the single-acting press of FIG. 1 as equipped with a load measuring apparatus provided with distance sensors for effecting diagnosis on the basis of displacement distance of pistons of balancing hydraulic cylinders of the press;

FIG. 53 is a flow chart illustrating an example of a piston displacement diagnostic routine which is executed using the outputs of the distance sensors of FIG. 52;

FIG. 54 is a graph explaining a manner of obtaining the piston displacement distance Xsi in step Q1-3 of the routine of FIG. 53;

FIG. 55 is a graph depicting an optimum distribution of the piston displacement obtained in step Q1-4 of the routine of FIG. 53;

FIG. 56 is a flow chart illustrating another example of the piston displacement diagnostic routine using the outputs of the distance sensors of FIG. 52;

FIG. 57 is a graph indicating a piston displacement characteristic obtained in steps Q2-1 through Q2-6 in the routine of FIG. 56, in relation to a reference characteristic;

FIG. 58 is a graph indicating an example of the piston displacement variation pattern, in relation to a reference pattern, in another example of the piston displacement diagnostic routine using the outputs of the distance sensors of FIG. 52;

FIG. 59 is a flow chart illustrating a further example of the piston displacement diagnostic routine;

FIG. 60 is a graph indicating an example of a piston displacement characteristic obtained in step Q3-2 of the routine of FIG. 59;

FIG. 61 is a view showing a press provided with a distance sensor for measuring a displacement of a die plate of the press, which displacement is used to effect a diagnosis of the press;

FIG. 62 is a flow chart illustrating the displacement diagnostic routine using the distance sensor of FIG. 61;

FIG. 63 is an elevational view of the press of FIG. 1, indicating various dimensions d1–d5 measured to diagnose the cushioning device for abnormality;

FIG. 64 is an elevational view of the press of FIG. 1 as equipped with an accelerometer for effecting a diagnosis on the basis of displacement amount, velocity and acceleration of an upper die;

FIG. 65 is a flow chart illustrating an example of a diagnostic routine executed using the displacement amount, velocity and acceleration of the upper die, which are obtained by the accelerometer of FIG. 63;

FIG. 66 is a view showing the press of FIG. 31 as equipped with temperature sensors to detect temperatures used to diagnose the press for abnormality;

FIG. 67 is a flow chart illustrating an example of a diagnostic routine based on the temperatures detected by the temperature sensors of FIG. 66;

FIG. 68 is a flow chart illustrating an example of a diagnostic routine on the press of FIG. 1 based on a temperature of the pressure ring 30;

FIG. 69 is a flow chart illustrating an example of a diagnostic routine on the press of FIG. 1 based on the air capacity of the cushioning pneumatic cylinder;

FIG. 70 is a graph indicating an example of a relationship between the pneumatic pressure Pf of the counterbalancing pneumatic cylinder of FIG. 33 and the forming force Ff;

FIG. 71 is a flow chart illustrating an example of a diagnostic routine on the press of FIG. 1 based on an effective cross sectional area of the cushioning pneumatic cylinder;

FIG. 72 is a graph indicating an example of a relationship between the hydraulic pressure Pz of the overload-protective cylinder of FIG. 33 and the associated pneumatic pressure Pg; and FIG. 73 is a graph indicating an example of a relationship between the pneumatic pressure Pf of the counterbalancing pneumatic cylinder and the associated lifting force F2.

DETAILED DESCRIPTION OF THE PREFERRED EMBODIMENTS

Referring first to FIG. 1, there is shown one example of a single-action press adapted to draw a blank to manufacture a product, for instance, an outer panel of a motor vehicle. The press 10 has a lower die in the form of a punch 12 mounted on a stationary bolster 14 which is fixedly disposed on a press bed 16. The press 10 further has an upper die 18 attached to a slide plate 20 connected to suitable well known slide driving means, which includes, for example, a drive motor, gears, a crankshaft, joint pins, and links. The slide plate 20 is vertically reciprocated by the slide driving means through four plungers 22. The bolster 14 has a multiplicity of through-holes 26 through which respective cushion pins 24 extend. Located below the bolster 14 is a cushion pad or platen 28 for supporting the cushion pins 24. The cushion pins 24 also extend through the punch 12, to support at their upper ends a pressure member in the form of a pressure ring 30 disposed around a working portion of the punch 12. The number and the positions of the cushion pins 24 are suitably determined depending upon the shape and other parameters of the pressure ring 30.

The cushion pad 28 incorporates a multiplicity of balancing hydraulic cylinders 32 corresponding to the cushion pins 24 which extend through the through-holes 26. The lower ends of the cushion pins 24 are held in abutting contact with pistons 43 of the respective hydraulic cylinders 32. The cushion pad 28 is guided by a guide 40 to be moved up and down in the longitudinal direction of the cushion pins 24. The cushion pad 28 is biased in the upward direction by a cushioning pneumatic cylinder 42 whose pressure chamber communicates with an air tank 44 connected to an air source 48 (provided in a plant in which the press 10 is installed), via a solenoid-operated pressure control valve 46. Pneumatic pressure Pa within the air tank 44 and the pressure chamber of the pneumatic cylinder 42 is suitably adjusted by controlling the pressure control valve 46. The pneumatic pressure Pa is detected by a pneumatic pressure sensor 50, and an initial level of the pressure Pa is adjusted prior to each pressing cycle on the press 10. The cushioning pneumatic cylinder 42 and the air tank 44 serves as means for generating a blank holding force Fs to be applied to the pressure ring 30 through the cushion platen 28 and the cushion pins 24, while the press is in a drawing operation on a blank in the form of a metal strip or sheet, for example. Described more specifically, a force acting on the blank under drawing is applied to the cushion platen 28 via the pressure ring 30 and the cushion pins 24, whereby the cushion platen 28 is lowered, forcing down the piston 43 of the pneumatic cylinder 42. As a result, the blank holding force Fs corresponding to the pneumatic pressure Pa in the cylinder 42 acts on the pressure ring 30.

Although only one pneumatic cylinder 42 is shown in FIG. 1, two or more pneumatic cylinders may be used as needed. In this case, all the pneumatic cylinders are connected to the common air tank 44. The pressure chambers of the balancing hydraulic cylinders 32 communicate with each other, and are supplied with a pressurized working fluid or oil delivered from an electrically operated hydraulic pump 34. Hydraulic pressure Ps within the pressure chambers of the cylinders 32 is regulated by opening and closing a solenoid-operated shut-off valve 36. The hydraulic pressure Ps is detected by a hydraulic pressure sensor 38, and is adjusted so that the blank holding force Fs generated by the cushioning pneumatic cylinder 42 is substantially evenly distributed to the cushion pins 24, namely, over the entire area of the pressure ring 30. The cushion platen 28, hydraulic cylinders 32 and cushion pins 24 cooperate to constitute a cushioning device for even distribution of the holding force Fs over the pressure ring 30.

Figure 3:
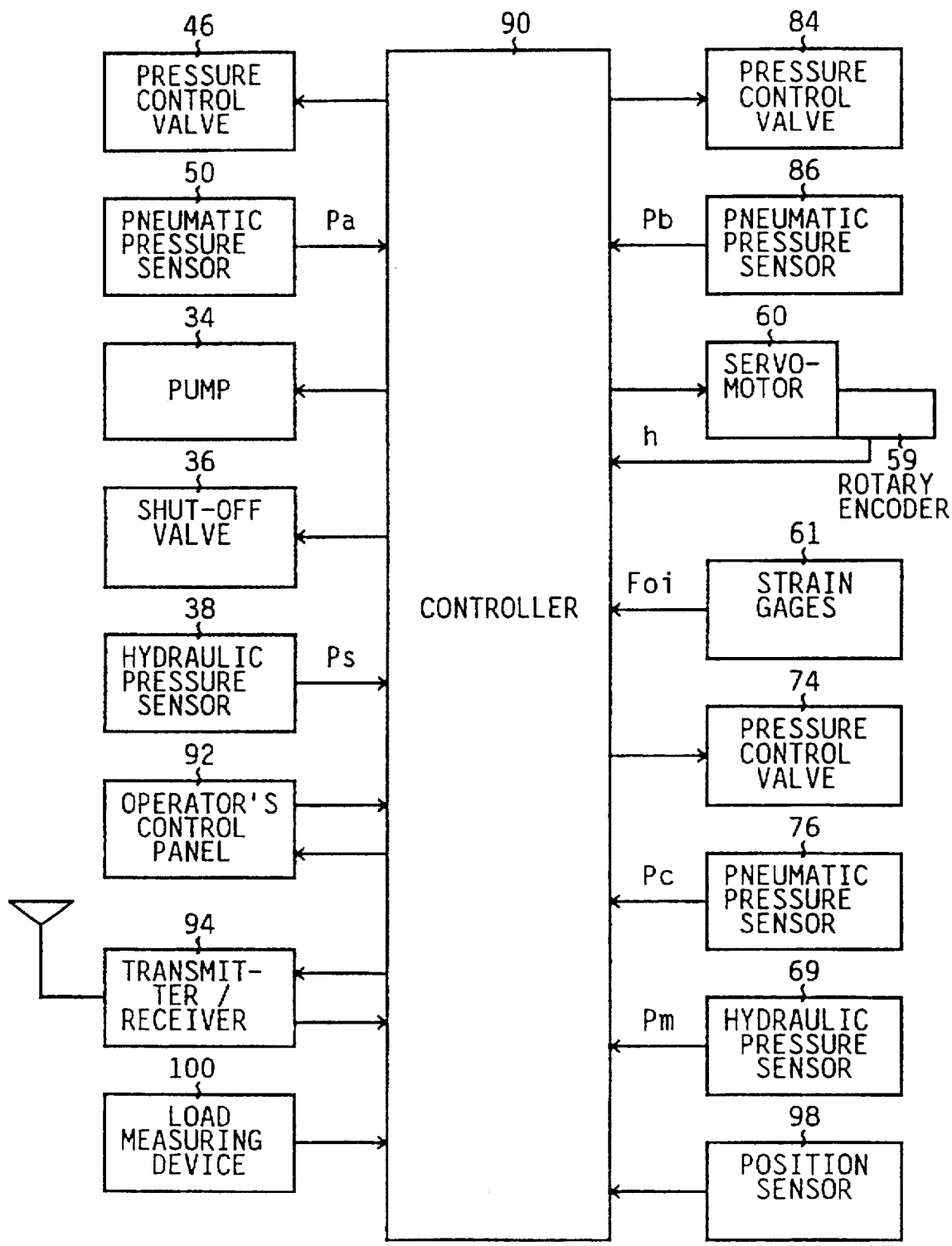
FIG. 3 is a block diagram indicating a control system for the press of FIG. 1.

As shown in FIG. 2, each of the plungers 22 is connected to the slide plate 20 via a die-height adjusting mechanism generally indicated at 52. The die-height adjusting mechanism 52 engages a threaded shaft 54 formed integrally with the corresponding plunger 22. The mechanism 52 includes a nut 56 engaging the threaded shaft 52, a worm wheel 58 fixed to the nut 56, and a servomotor 60 for rotating a worm which meshes with the worm wheel 58. The servomotor 60 is bidirectionally operated to rotate the worm wheel 58 an the nut 56 clockwise or counterclockwise, for thereby adjusting the height or vertical position of the die-height adjusting mechanism 52 relative to the threaded shaft 54, a relative distance h between the plunger 22 and the slide plate 20, more precisely, between the lower end of the plunger 22 and the upper end of the mechanism 52. The distance h is detected by a rotary encoder 59 attached to the servomotor 60, as indicated in FIG. 3.

It will be understood that the slide plate 20 is lowered away from the plunger 22 as the relative distance h increases, and that the vertical position of the slide plate 20 when the press is at rest in its initial position is shifted toward the punch 12. Accordingly, a pressing force Fp which acts on the blank when the plunger 22 is located at its lower stroke end can be adjusted by changing the distance h. In other words, the distance h is adjusted for each of the four plungers 22, depending upon the desired pressing force Fp, by suitably operating the servomotor 60. As shown in FIG. 2, each plunger 22 is provided with a strain gage 61. This gage 61 is adapted to detect a local load Foi (i=1, 2, 3, 4) which acts on the corresponding plunger 22. Described more specifically, the local load Foi of each plunger 22 is obtained from a data map stored in a controller 90, which data map represents a relationship between the output level of the strain gage 61 and an actual load value as measured by a load measuring device 100 which will be described.

The slide plate 20 incorporates an overload-protective hydraulic cylinder 62 which has a piston 64 connected to the die-height adjusting mechanism 52, and a housing fixed to the slide plate 20. The pressure chamber of the hydraulic cylinder 62 is filled with the oil and communicates with an oil chamber 68 of a hydro-pneumatic cylinder 66. Hydraulic pressure Pm within the oil chamber 68 is manually adjusted, and is detected by a hydraulic pressure sensor 69. The cylinder 66 also has an air chamber 70 which communicates with an air tank 72 connected to the above-indicated air source 48 through another solenoid-operated pressure control valve 74. Pneumatic pressure Pc within the air chamber 70 and air tank 72 is adjusted by means of the pressure control valve 74. The pneumatic pressure Pc is detected by a pneumatic pressure sensor 76, and is adjusted depending upon the pressing capacity of the press 10. That is, the pneumatic pressure Pc is determined so that when an excessive load acts on the overload-protective hydraulic cylinder 62, the piston of the hydro-pneumatic cylinder 66 is moved towards the air chamber 70, so as to permit movements of the adjusting mechanism 52 and the slide plate 20 towards each other, for thereby protecting the press 10 and the die set 12, 18 from damage due to an overload. The hydraulic cylinder 62, hydro-pneumatic cylinder 66, air tank 72 and the related components are provided for each of the four plungers 22 associated with the respective mechanisms 52, and the pneumatic pressure Pc in each of the four air tanks 72 is suitably controlled.

The slide plate 20 is also connected to four counterbalancing pneumatic cylinders 80 attached to a frame 78 (indicated at the top of FIG. 1) of the press 10. Each pneumatic cylinder 80 has a pressure chamber communicating with an air tank 82, which is also connected to the air source 48 through a solenoid-operated pressure control valve 84. By controlling the valve 84, pneumatic pressure Pb within the pressure chamber of the cylinder 80 and the air tank 82 can be regulated. The pressure Pb is detected by a pneumatic pressure sensor 86, and is adjusted so that the force corresponding to the pressure Pb counterbalances with the total weight of the slide plate 20 and the upper die 18. The pressure chambers of the four counterbalancing pneumatic cylinders 80 communicate with the common air tank 82.

The press 10 is provided with the controller 90 as shown in FIG. 3. The controller 90 is adapted receive output signals of the pneumatic pressure sensors 50, 86, 76, hydraulic pressure sensors 38, 69, rotary encoder 59 and strain gages 61, which are indicative of the pneumatic pressures Pa, Pb, Pc, hydraulic pressures Ps, Pm, relative distance h and local load values Foi, respectively. The controller 90 is constituted by a microcomputer, which incorporates a central processing unit (CPU), a random-access memory (RAM), a read-only memory (ROM), and input/output interface circuit, and analog-digital converters. The CPU operates to process various signals according to control programs stored in the ROM, while utilizing a temporary data storage function of the RAM, so as to control the pressure control valves 46, 84, 74 and shut-off valve 36, and apply drive signals to the pump 34 and servomotor 60. While the block diagram of FIG. 3 shows only one piece, for the servomotor 60, strain gage 61, hydraulic pressure sensor 69, pressure control valve 74 and pneumatic pressure sensor 76, the controller 90 controls all of the four pieces provided on the press 10, as described above with respect to the above-indicated five components.

The controller 90 is connected to an operator's control panel 92, a transmitter/receiver 94, a position sensor 98 and the load measuring device 100. The operator's control panel 92 is adapted to display the various pressure values Pa, Pb, Pc, Ps, Pm indicated above, and has various switches for entering or changing various parameters of the press 10. The transmitter/receiver 94 is provided on the press 10, for receiving from an ID card 96 attached to the punch 12, die set information indicative of the specifications of the specific die set 12, 18, 30 installed on the press 10. To this end, The ID card 96 which stores such die set information has a built-in battery and a data transmitting function. The transmitter/receiver 94 is adapted to transmit a signal to the ID card 96, to request transmission of the appropriate die set information. The information received by the transmitter/receiver 94 is transmitted to the controller 90. The position sensor 98 may be a rotary encoder for detecting the rotating angle of the crankshaft of the slide driving means of the press 10, or a sensor for detecting the vertical position of the slide plate 20.

The load measuring apparatus 100 is installed on the press 10, without the punch 12, lower die 18 and pressure ring 30 being mounted on the press 10, as shown in FIG. 4, to measure the loads which are expected to act predetermined portions of the press 10 in operation. The load measuring apparatus 100 has a positioning member 102 of rectangular box construction fixed on the bolter 14, and a measuring member 106 accommodated within the positioning member 102. The measuring member 106 is movable in the vertical direction, and has a plurality of sensing pins 104 protruding from the underside thereof. The sensing pins 104 correspond to the cushion pins 24. The positioning member 102 has a plurality of apertures 108 through which the respective cushion pins 24 extend. The measuring member 106 rests on the cushion pins 24 extending through the through-holes 26 and the apertures 108, such that the sensing pins 104 are held in abutting contact with the corresponding upper ends of the cushion pins 24. The positioning member 102 also has four sensing posts 110 projecting upwards at the four corners of the rectangular box. On the other hand, the measuring member 106 has four sensing elements 112 projecting upwards from the upper surface, near the four corner portions of an area in which a drawing operation is effected. The four sensing posts 110 and the four sensing elements 112 are provided with respective sets of strain gages 114, 116. Suitably selected ones of the sensing pins 104 indicated above are provided with respective sets of strain gages 118. The strain gages 114, 116, 118 are connected to a dynamic strain detector 120, which in turn is connected to the controller 90. The dynamic strain detector 120 has a function of an amplifier, and is capable of adjusting a zero point thereof. Each set of strain gages 114, 116, 118 consists of four strain gages attached to respective four side surfaces of each sensing post 110, sensing element 112 or pin 104.

Figure 6:
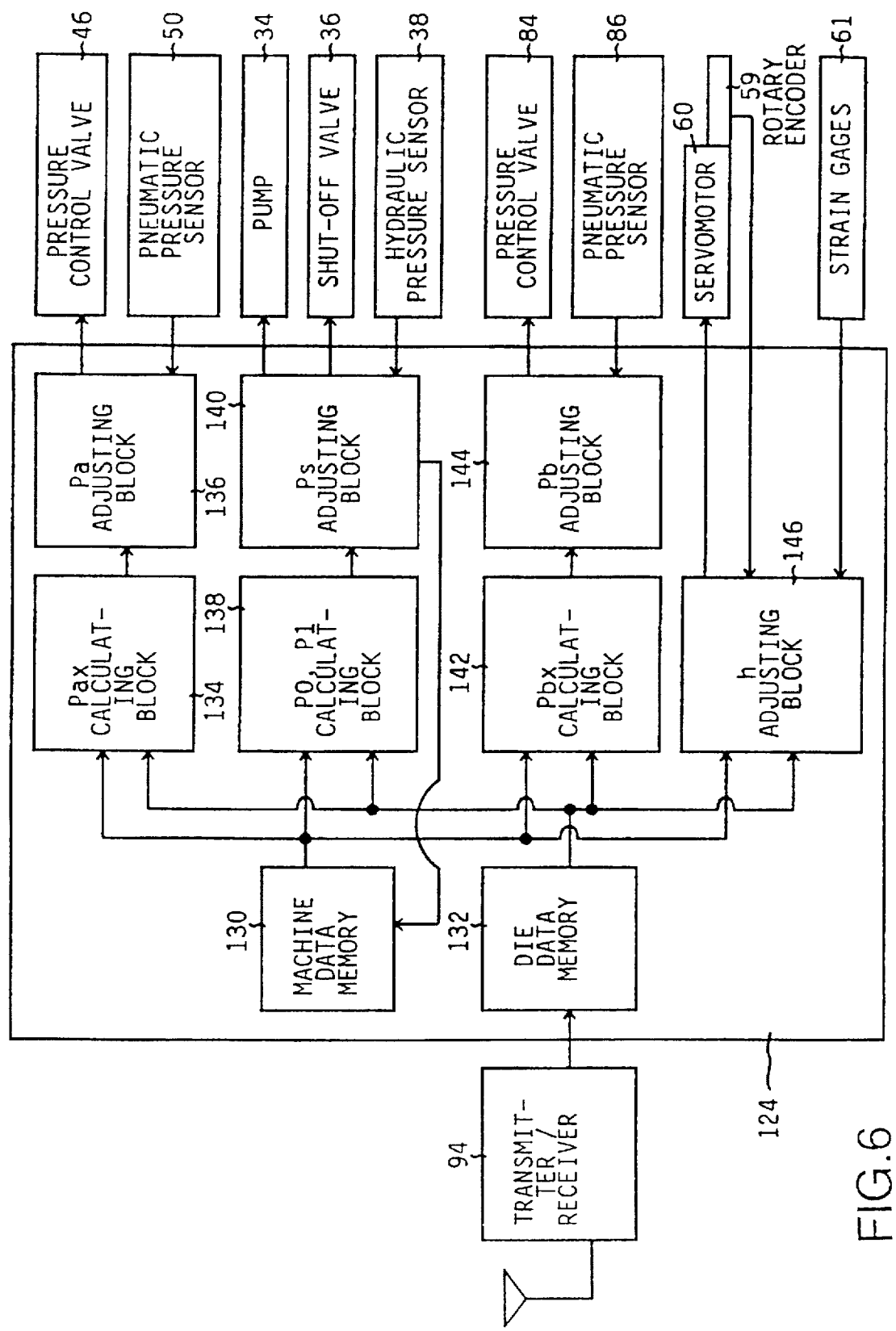
FIG. 6 is a block diagram for explaining the functions of a condition setting portion shown in FIG. 5 of the control system.

Referring back to FIG. 3, the controller 90 is adapted to achieve various functions according to the control programs stored in the ROM. The controller 90 includes two functional portions, namely, a condition setting portion 124 and a diagnostic portion 126, as illustrated in FIG. 5. The condition setting portion 124 has various functional blocks as indicated in FIG. 6. The condition setting portion 124 includes a machine data memory 130 and a die data memory 132. The machine data memory 130 stores data including machine information entered through the operator's control panel 92, while the die data memory 132 stores the die set information which is read from the ID card 96 and transmitted by the transmitter/receiver 94 when the die set 12, 18, 30 is installed on the press 10. For example, the machine information and the die set information include the following information necessary to determine the Pneumatic pressure values Pa, Pb, the hydraulic pressure Ps and the relative distance h that permit an intended pressing operation on the press 10:

[MACHINE INFORMATION]
Weight Wa of the cushion platen 28
Average weight Wp of the cushion pins 24
Weight Ws of the slide plate 20
Pressure-receiving area Aa of the pneumatic cylinder 42
Total pressure-receiving area Ab of the four pneumatic cylinders 80
Average pressure-receiving area As of the hydraulic cylinders 32
Modulus K of elasticity of volume of the working oil used for the hydraulic cylinders 32
Mean travel Xav of the pistons of the hydraulic cylinders 32
Total volume V of the oil in the hydraulic circuit including the hydraulic cylinders 32
Provisional h-Fpi characteristic relationship (Fpi=a·h) [DIE SET INFORMATION]
Weight Wr of the pressure ring 30

Weight Wu of the upper die 18
Optimum holding force Fso
Optimum local pressing force Fpoi of each cushion pin 24
Number n of the cushion pins 24

It is noted that the die set information also includes data indicative of the specific die set used (that is, the product to be obtained using the die set, and a model of a car for which the product is used), a type of the press 10 on which the die set is installed, and a process in which the product is produced.

The weight Wa of the cushion platen 28 is the actual weight of the platen 28 minus the sliding resistance applied to the platen 28. This weight Wa can be obtained by the load measuring apparatus. Described in detail, the weight value Wa is obtained from a Fs-Pa characteristic curve, which is obtained by measuring the holding force Fs while the pneumatic pressure Pa is changed. To measure the holding force Fs, the slide plate 22 is lowered to its lower stroke end by the plungers 22. During this downward movement of the slide plate 20, the lower surface of the slide plate 20 is brought into contact with the sensing elements 112 on the measuring member 106, whereby the measuring member 106 is lowered against the biasing force of the pneumatic cylinder 42. The loads acting on the four sensing elements 112 during this downward movement of the measuring member 106 are detected by the strain gages 116. Before the slide plate 20 has reached its lower stroke end, the measuring member 106 comes into abutting contact with the positioning member 102. At this time, the loads as detected by the strain gages 116 suddenly rise, due to rigidity of the structure of the press 10. The graph of FIG. 7 indicates an example of a variation in the load detected by the strain gages 116 provided on one of the four sensing elements 112. In the graph, a load value Fsi corresponds to the holding force expected to be applied to the pressure ring 30, and a load value Fpi corresponds to a forming force expected to be applied to the blank in addition to the holding force Fsi. That is, a total pressing force Fpi expected to act on the blank is a sum of the load values Fsi and Ffi. To detect the load value or pressing force Fpi, the positioning member 102 and the measuring member 106 are designed to have higher rigidity than the punch 12 and upper die 18 which are used for an actual drawing operation. The graph of FIG. 8 indicates a Pa-Fs relationship between the pneumatic pressure Pa of the pneumatic cylinder 42 and the total holding force Fs (sum of the four load values Fsi obtained by the four sensing elements 112). The weight Wa of the cushion platen 28 is calculated on the basis of a load value Fx which can be obtained from the Pa-Fs relationship. Described more specifically, the weight Wa is calculated by subtracting the total weight of the measuring member 106 (including the weight of the sensing pins 104 and elements 112) and the cushion pins 24, from the load value Fx. The thus obtained weight Wa is different from and smaller than the actual weight of the cushion platen 28, by an amount which is determined by various parameters such as the sliding resistance values of the guide 40 and piston 43. The obtained weight Wa includes a degree of the air leakage of the pneumatic cylinder 42 and a detecting error of the pneumatic pressure sensor 50. Accordingly, the obtained weight Wa is specific to the particular condition of the press 10 on which the measuring apparatus 100 was operated.

Figure 8:
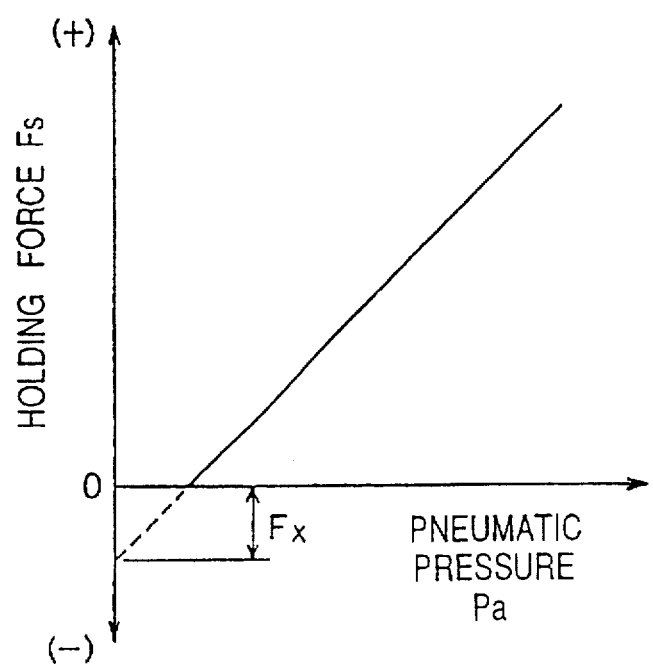

The weight Wp is an average value of the weights of the cushion pins 24 used on the press 10. The weight Ws of the slide platen 20 is equal to the actual weight of the slide plate 20 minus a sliding resistance value thereof with respect to a guide therefor. To obtain the weight Ws, the local load values Foi are detected by the respective strain gages 61 during the downward movement of the slide plate 20. The total load value Fo of the four local load values Foi of the four plungers 22 is detected while the pneumatic pressure Pb of the pneumatic cylinder 80 is continuously changed. Like the weight Wa of the cushion platen 28, the weight Ws of the slide plate 20 can be obtained from the obtained characteristic relationship between the total load Fo and the pneumatic pressure Pb. The pressure-receiving area Aa of the pneumatic cylinder 42 is a value which reflects an influence of the air leakage of the cylinder 42. For instance, the area Aa corresponds to a gradient of a line which represents the relationship between the holding force Fs (sum of the load values Fsi) and the pneumatic pressure Pa. When a plurality of pneumatic cylinders 42 are provided, the area As is a total pressure-receiving area of all the cylinders 42. Like the pressure-receiving area As, the total pressure-receiving area Ab of the four pneumatic cylinders 80 can be obtained from the Fo-Pb characteristic relationship. The average pressure-receiving area As of the hydraulic cylinders 32 can be obtained from a characteristic relationship between the holding force Fs, and the hydraulic pressure Ps which is detected by the hydraulic pressure sensor 38 when the Fs-Pa characteristic relationship of FIG. 8 is obtained, for example.

The modulus K of elasticity of volume of the working fluid or oil is determined depending upon the specific property of the oil used. The mean travel Xav of the pistons of the hydraulic cylinders 32 is an average value of travel distances of the pistons of the cylinders 32 as measured from the upper stroke ends, when the slide plate 20 has reached its lower stroke end. The travel distances are determined so as to apply the holding force Fs to the pressure ring 30 evenly through all the cushion pins 24 in abutting contact with the ring 30. Described more specifically, the travel distances are determined so that all the pistons of the cylinders 32 are lowered from their upper stroke ends by the respective cushion pins 24 while none of the pistons are bottomed or lowered to their lower stroke ends by the cushion pins 24, upon reaching of the slide plate 20 to its lower stroke end, even in the presence of a variation in the length of the cushion pins 24 and an inclination of the cushion platen 28. The travel distances can be obtained by an experiment, or on the basis of the measured length variation of the cushion pins 24 and maximum strokes of the pistons of the cylinders 32. The volume V is a total volume of the oil existing in a portion of the hydraulic circuit associated with the hydraulic cylinders 32, which portion includes the pressure chambers of the cylinders 32 and is bounded by a check valve 39 (FIG. 1). The volume V is a value when the pistons of the cylinders 32 are at their upper stroke ends.

The provisional h-Fpi characteristic relationship (i=1, 2, 3, 4) is a relationship (Fpi=a·h) between the distance h and the pressing force Fpi when the plungers 22 have reached the lower stroke ends. This relationship is obtained by measuring the pressing force Fpi (when the plungers 22 have reached the lower stroke ends), with different values of the distance h. The provisional h-Fpi characteristic relationship reflects the rigidity of the press 10 (except for the die set). The measurement of the h-Fpi characteristic relationship is effected after the pneumatic pressure Pb of the pneumatic cylinders 80 is adjusted so that the lifting force produced by the cylinders 80 counterbalances the total weight of the slide plate 20 and the upper die 18 when the slide plate 20 is lowered by the plungers 22. An example of the provisional h-Fpi characteristic relationship is indicated by one-dot chain line in the graph of FIG. 9, wherein the maximum value h0 of the distance h when the pressing force Fpi (namely, forming force Ffi) is zero is used as a reference. When the pressing force Fpi is zero, the holding force Fs does not act on the pressure ring 30, with the cushion platen 28 held at its lower end. The h-Fpi characteristic relationship is obtained for each of the four plungers 22 (four die-height adjusting mechanisms 52). The overall pressing force Fp is a sum of the pressing forces Fpi of the individual plungers 22. The positions of the sensing elements 112 on which the strain gages 116 are provided are almost aligned with those of the four plungers 22.

Figure 7:
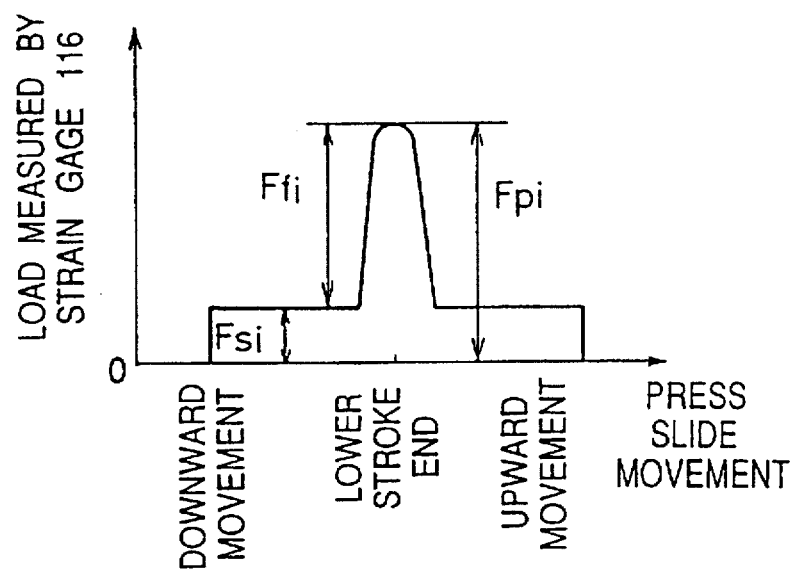
FIG. 7 is a graph indicating one example of a waveform of the load measured by the apparatus of FIG. 4.

The weight Wr of the pressure ring 30 and the weight Wu of the upper die 18 are the values actually measured of the ring 30 and die 18 as manufactured. The optimum holding force Fso and the optimum local pressing force Fpoi (i=1, 2, 3, 4) are obtained by a trial-and-error procedure, in which the optimum forces Fso and Fpoi suitable for performing a desired drawing operation are determined by test operations on a trial press on which the pressure ring 30, upper dig 18 and punch 12 are installed. The holding force Fso and pressing force Fpoi do not include components due to the influences by the weights of the die set 12, 18, 30 and the sliding resistance values of the associated components. In the case where the trial press is similar to that shown in FIGS. 1 and 2, for example, the pneumatic pressure Pb is adjusted so that the slide plate 20 is lowered by the plungers 22 while the total weight of the slide plate 20 and the upper die 18 is counterbalanced by the lifting force produced by the counterbalancing pneumatic cylinders 80. The local load values Foi are detected by the strain gages 61 during a trial drawing operation effected in the above condition. The holding force Fso and local pressing force values Fpoi can be obtained on the basis of the detected load values Foi. While the holding force Fso is a total force applied to the pressure ring 30 through the cushion pins 24, the local pressing force Fpoi is a force produced by each of the four plungers 22, and the total pressing force Fp is a sum of the local force values Fpoi of the four plungers 22. The load waveform of each strain gage 61 is similar to that of the strain gages 116 as illustrated in FIG. 7, and is used to obtain the holding force Fs and pressing force Fp. The number n of the cushion pins 24 is determined by an experiment, depending upon the size and shape of the pressure ring 30, so as to draw the blank into a desired product.

Referring back to FIG. 6, the condition setting portion 124 of the controller 90 includes a Pax calculating block 134 for calculating the optimum pneumatic pressure Pax for producing the holding force Fso, according to the following equation (1), on the basis of the machine information stored in the machine data memory 130 and the die set information stored in the die data memory 132. The holding force Fso to be produced is stored in the die data memory 132.

$$Pax=(Fso+Wa+Wr+n \cdot Wp)/Aa \tag{1}$$

The output of the Pax calculating block 134 is fed to a Pa adjusting block 136 for controlling the solenoid-operated pressure control valve 46 so that the pneumatic pressure Pa in the air tank 44 detected by the pneumatic pressure sensor 50 coincides with the optimum pneumatic pressure Pax calculated by the Pax calculating block 134. With the pneumatic pressure Pa thus established, the holding pressure Fso specified by the die information is applied to the pressure ring 30.

The condition setting portion 124 also includes a P0, P1 calculating block 138 for calculating an optimum initial hydraulic pressure P0 and a target hydraulic pressure P1 according to the following equations (2) and (3), respectively, on the basis of the machine information in the machine data memory 130 and the die set information in the die data memory 132.

$$Xav=(Fso-n \cdot As \cdot P0)V/n^2 \cdot As^2 \cdot K \tag{2}$$

$$Fso+Wr+n \cdot Wp=n \cdot As \cdot P1 \tag{3}$$

The optimum initial hydraulic pressure P0 is a pressure for applying the holding force Fso to the pressure ring 30 substantially evenly or equally through the cushion pins 24, when the upper die 18 is not in contact with the pressure ring 30. On the other hand, the target hydraulic pressure P1 is a similar pressure when the upper die 18 is in pressing contact with the pressure ring 30. The output of the adjust calculating block 138 is applied to a Ps adjusting block 140 for controlling the pump 34 and shut-off valve 36, so that the initial value of the hydraulic pressure Ps detected by the hydraulic pressure sensor 38 is equal to the calculated optimum initial hydraulic pressure P0 indicated above. With the hydraulic pressure Ps thus adjusted to the initial value P0, it is theoretically possible to lower the pistons of all the hydraulic cylinders 32 by the average travel distance Xav, in a drawing operation with the pressure ring 30 in pressing contact with the upper die 18, and to apply the holding force Fso to the pressure ring 30 substantially equally through the cushion pins 24. However, the optimum initial hydraulic pressure P0 is not necessarily accurate enough due to a possibility of existence of air in the hydraulic circuit including the cylinders 32, which causes a variation in the modulus K of elasticity of volume of the oil. In view of this drawback, the Ps adjusting block 140 is adapted to read the hydraulic pressure Ps in a test operation, and adjust the pressure Ps once adjusted to the optimum initial value P0, so that the pressure Ps is made substantially equal to the target pressure P1 also calculated by the P0, P1 block 138. If the actually detected hydraulic pressure Ps during the test operation is higher than the target value P1, some of the cushion pins 24 are not in abutting contact with the pressure ring 30, and the holding force Fso is applied to the pressure ring 30 through the other cushion pins only. In this case, the optimum initial hydraulic pressure P0 is lowered to move the cushion pins 24 upwards so that all the cushion pins 24 may contact with the pressure ring 30. If the actual hydraulic pressure Ps is lower than the target value P1, on the other hand, the pistons of some of the hydraulic cylinders 32 are bottomed, and a portion of the holding force Fso acts on the pressure ring 30 directly through the cushion platen 28 and the cushion pins 24 corresponding to the bottomed pistons. In this case, the optimum initial hydraulic pressure P0 is raised to avoid the bottoming of the pistons of any cylinders 32.

The condition setting portion 124 further includes a Pbx calculating block 142 adapted to calculate the optimum pneumatic pressure Pbx of the pneumatic cylinders 80 to produce a lifting force for counterbalancing the total weight of the slide plate 20 and the upper die 18, according to the following equation (4), on the basis of the machine information and the die set information.

$$Pbx=(Wu+Ws)/Ab \tag{4}$$

The output of the Pbx calculating block 142 is applied to a Pb adjusting block 144 adapted to control the solenoid-operated pressure control valve 84 so that the pneumatic pressure Pb in the air tank 82 detected by the pneumatic pressure sensor 86 coincides with the optimum pressure Pbx calculated by the Pbx calculating block 142. With the pressure Pb thus adjusted, the local pressing force values Fpoi as specified by the die set information can be applied to the die set 12, 18 in a drawing operation, without an influence of the weights of the slide plate 20 and upper die 18.

The condition setting portion 124 also includes an h adjusting block 146 for adjusting the relative distance h associated with the four die-height adjusting mechanisms 52, independently of each other, on the basis of the machine information and the die set information, so as to provide the optimum local pressing force Fpoi for each plunger 22 as specified by the die set information. Initially, the reference value h0 which is the maximum value of the distance h when the pressing force Fpi of each plunger 22 is zero is determined from the corresponding local load value Foi detected by the strain gages 61 on the corresponding plunger 22. Then, the distance h1 for obtaining the pressing force Fpoi is obtained from the provisional h-Fpi characteristic relationship (Fpi=a·h) as indicated by one-dot chain line in the graph of FIG. 9. Subsequently, the distance h is adjusted to the obtained value h1, with respect to the reference value h0, by operating the servomotor 60. in this condition, a test operation is conducted to measure the pressing force Fp1 on the basis of the load value detected by the strain gages 61. Since the predetermined provisional h-Fpi characteristic relationship is based on higher rigidity of the die set than the rigidity of the actually used die set 12, 14, the pressing force Fp1 is generally smaller than the pressing force Fpoi. Then, the distance h is changed to h2 which is smaller than h1 by a predetermined amount Δh, and the corresponding pressing force Fp2 is measured in the same manner as described above with respect to the value Fp1. Based on the thus obtained values Fp1, Fp2, and distances h1 and h2, a final h-Fpi characteristic relationship (Fpi=b·h) as indicated by solid line in FIG. 9 is obtained. The distance hx for obtaining the pressing force Fpoi is determined by the obtained final h-Fpi characteristic relationship. The servomotor 60 is operated to establish the determined distance hx. More precisely, the distance hx is adjusted so as to provide the local forming force (Fpoi−Fso/4), which is obtained by subtracting Fso/4 (one fourth of the holding force Fso) from the pressing force Fpoi, since the above adjustment of the distance h is effected without the holding force Fs acting on the pressure ring 30. The determination of the distance hx and the adjustment of the distance h to the determined distance hx by the servomotor 60 are effected for each of the four mechanisms 52 (four plungers 22). The adjustment of the distance h by the block 146 assures the pressing force Fpoi as specified by the die set information, irrespective of a variation in the rigidity of the press 10 from one machine to another.

The controller 90 is also adapted to regulate the pneumatic pressure Pc in the air chamber 70 of the hydropneumatic cylinder 66, so that the local pressing force Foi detected by the strain gages 61 on each plunger 22 does not exceed a predetermined upper limit Foli (i=1, 2, 3, 4). That is, the solenoid-operated pressure control valve 74 is controlled to adjust the pneumatic pressure Pc to a predetermined optimum value Pcx. This optimum value Pcx is determined on the basis of the pressure-receiving area of the cylinder 62 and the pressure-receiving areas of the oil and air chambers 68, 70 of the cylinder 66, so that if a load exceeding the upper limit Foli acts on the overload-protective hydraulic cylinder 62, due to increased sliding resistance of the slide plate 20, for example, the piston of the cylinder 66 may be moved towards the air chamber 70, thereby permitting the working oil to flow from the hydraulic cylinder 62 into the oil chamber 68 of the cylinder 66, and allowing the corresponding plunger 22 to be moved towards and relative to the slide plate 20. This adjustment of the pneumatic pressure Pc is effected for all of the four cylinders 66 provided for the respective four plungers 22, so that the pressure values Pci of the four cylinders 66 are adjusted independently of each other. This arrangement prevents a damage of the press 10 or die set 12, 18 due to excessive pressing force Fp. Since the optimum pneumatic pressure Pc can be adjusted irrespective of the die set used, the adjustment may be effected manually, namely, by manipulation of the pressure control valve 74 by the operator of the press 10.

It will be understood from the above description that the press 10 is capable of automatically calculating optimum operating conditions of the press such as optimum pneumatic pressures Pax, Pbx, optimum initial hydraulic pressure P0 and optimum distance hx, so as to establish the optimum operating parameters such as the optimum holding force Fso and optimum local pressing force values Fpoi as determined in a trial or test operation on a test press, irrespective of variations or differences in the rigidity and sliding resistances of the press from one machine to another. The automatic calculation of the optimum operating conditions is implemented by the controller 90, according to the machine information stored in the machine data memory 130 and the die set information stored in the die data memory 132 (received from the ID card 96 via the transmitter/receiver 94). Thus, the press 10 eliminates or minimizes the conventional cumbersome manual adjustment of the operation conditions of the press by the trial-and-error procedure, and reduces the operator's work load upon setting up the press, while assuring highly consistent quality of the products manufactured by the press.

it is noted that the pneumatic and hydraulic pressures Pa, Pb, Ps and distance h indicated above need not be adjusted exactly to the optimum values Pax, Pbx, P0 and hx as calculated. In this respect, it is possible to provide certain ranges of tolerances for those operating parameters or conditions, within which the quality of the products manufactured by the press 10 satisfies the intended requirements.

The diagnostic portion 126 of the controller 90 is designed to diagnose the press 10 to see if there exists any abnormality or defect that prevents the press 10 from normally operating to manufacture the product with an intended or satisfactory level of quality. The diagnostic portion 126 has the following five diagnostic functions: (1) load waveform diagnosis; (2) load distribution diagnosis; (3) correlation diagnosis; (4) load variation diagnosis; and (5) On-line diagnosis. The first four diagnostic functions (1) through (4) are performed with the load measuring device 100 mounted on the press 10, upon installation or replacement of the die set, for example, prior to the setting of the pressing conditions described above. The last diagnostic function (5) is performed while the press 10 is in operation. These diagnostic functions will be explained.

(1) LOAD WAVEFORM DIAGNOSIS

This diagnosis is performed according to a routine illustrated in the flow chart of FIG. 10, by operating an appropriate switch on the operator's control panel 92, after the load measuring apparatus 100 is installed on the press 10. The diagnostic routine of FIG. 10 is started with step S1-1 to start a test pressing cycle after the pneumatic pressure Pa, hydraulic pressure Ps and other operating parameters are adjusted to the predetermined optimum values. Step S1-1 is followed by step S1-2 in which the value of a load during the pressing cycle as measured by the apparatus 100 is read in. That is, the load value is detected as the slide plate 20 is reciprocated, namely, as a physical value in the form of the amount of displacement of the main slide 20 is changed. Then, step S1-3 is implemented to compare a waveform of the measured load with a stored reference waveform that permits the desired quality of the product, and thereby determine the presence or absence of any abnormality in the operating conditions of the press 10. If the comparison indicates the presence of any abnormality, the cause for the abnormality and the degree of the abnormality are estimated in step S1-4. Then, the control flow goes to step S1-5 in which a result of the determination in step S1-3 is indicated on a CRT (cathode ray tube) or liquid crystal display on the operator's control panel 92. If the determination of the presence of any abnormality is made in step S1-3, the cause for the abnormality and the degree of the abnormality both estimated in step S1-4 are also indicated on the panel 92. One-dot chain lines in the graphs of FIGS. 11(a), 11(b) and 11(c) represent examples of a waveform of the holding force Fs obtained from the outputs of the strain gages 116 when the press 10 is operated in an inching mode to reciprocate the slide plate 20, after the lower stroke end of the slide plate 20 is adjusted so that the measuring member 106 of the apparatus 100 will not abut on the positioning member 102 even when the slide plate 20 has reached its lower stroke end. Solid lines in the graphs represent the reference waveforms, which are determined by simulation or experiment on the basis of the pressure-receiving area Aa of the pneumatic cylinder 42 and the adjusted pneumatic pressure Pa. The reference waveforms may be the waveforms which were obtained in a previous cycle of the load waveform diagnosis and which were found normal. The comparison in step S1-3 of the detected and reference waveforms of the load value (holding force Fs) is effected by comparing the detected load values obtained at a time interval of a few or several milliseconds (msecs.) or a few or several tens of milliseconds, with the corresponding reference values of the reference waveform. The presence or absence of an abnormality is determined according to a predetermined rule or reference, for example, by checking whether the differences of the detected load values with respect to the corresponding reference values are held within a predetermined range of tolerance, or by checking whether the tendency of change of the detected load values is similar to that of the reference values. The degree of abnormality estimated in step S1-4 may be such that the detected abnormality is serious and requires an immediate repair or adjustment of the press 10, or is not so serious and allows the pressing operation to be continued with cares being exercised. The cause for the detected abnormality, which is also estimated in step S1-4, may be an excessively large sliding resistance of the cushion platen 28 as in the example of FIG. 11(a), or reduced effective volume of the pneumatic cylinder 42 or air tank 44 due to accumulation of a lubricating oil therein as in the example of FIG. 11(b). The estimated cause may be an air leakage from the pneumatic circuit associated with the pneumatic cylinder 42, or an oil leakage from the hydraulic circuit associated with the hydraulic cylinders 32, as in the example of FIG. 11(c). These causes for the abnormality adversely affect the characteristic of the holding force Fs in relation to the movement of the slide plate or main slide 20 during the pressing cycle, whereby the quality of the product if manufactured on the press 10 is deteriorated. The possible causes for abnormalities are stored in the ROM of the controller 90, in relation to different degrees of deviation of the detected load waveform from the reference waveform, for example.

The diagnostic routine of FIG. 10 is one embodiment of the diagnosing method of this invention, wherein step S1-2 is one form of a step of detecting a selected characteristic of a load generated at a selected portion of the press when the press is operating. Described more specifically, the selected characteristic of the load is a waveform of the load detected in step S1-2 in relation to the position of the slide plate 20 which changes during a pressing cycle on the press. It is also noted that step S1-3 is one form of a step of determining the presence or absence of an abnormality on the basis of the detected load.

The graph of FIG. 12 shows a reference waveform of the load when the slide plate 20 is reciprocated at a speed used in a normal pressing cycle, while the graph of FIG. 13 shows a reference waveform of the load when the slide plate 20 is inched (lowered at a sufficiently low speed) during a time period immediately before and after the abutting contact of the measuring member 106 against the positioning member 102 of the apparatus 100. These reference waveforms may be used in the load waveform diagnosis. In some cases, the quality of the product may not be significantly deteriorated even if the waveform detected using the load measuring apparatus 100 considerably deviates from the reference waveform of FIG. 13, as long as the waveform detected during the normal pressing cycle follows the reference waveform of FIG. 12. In this respect, it is useful to estimate the degree of abnormality by using the two reference waveforms of FIGS. 12 and 13, depending upon the expected type of the abnormality. The reference waveform of FIG. 13 is similar to that of FIG. 7. The load waveform diagnosis is also possible by using a waveform of a load as transmitted to each of the cushion pins 24, which is detected by the strain gages 118. Further, the load waveform diagnosis is possible by obtaining a waveform of a forming force Ff detected with the measuring member 106 resting on the positioning member 102 while the cushion platen 28 is held at its lower end. The load waveform may be obtained by using the output of the strain gages 61 in place of the output of the load measuring apparatus 100. In this case, the diagnosis may be done with the die set 12, 18, 30 being installed on the press 10. It is noted that the determination of the presence or absence of any abnormality relating to the load on the press 10 does not necessarily require the comparison of the detected load waveform with a reference waveform per se as described and illustrated in FIGS. 11–13. For instance, the determination may be made by checking if a certain characteristic or characteristics of the detected waveform, such as a gradient of a given portion of the detected waveform and/or load values at selected points on the detected waveform is/are held within a predetermined range or ranges of tolerance of such characteristic or characteristics of the reference waveform.

(2) LOAD DISTRIBUTION DIAGNOSIS

This diagnosis is performed according to a routine illustrated in the flow chart of FIG. 14. The routine is initiated with step S2-1 to read in local load values at the four positions corresponding to the four sensing elements 112 of the apparatus 100, when the slide plate 20 is at the lower stroke end, which is detected by the output of the position sensor 98. Those load values are obtained from the load waveform obtained in step S1-2 of the load waveform diagnosis of FIG. 10. The control flow then goes to step S2-2 to compare a distribution of the obtained local load values, with a predetermined reference distribution, for thereby determining the presence or absence of any abnormality on the press 10. If any abnormality is detected in step S2-2, the cause for the detected abnormality and the degree of the abnormality are estimated in step S2-3, and step S2-4 is implemented to energize the operator's control panel 92 (more precisely, a CRT or liquid crystal display provided thereon) to indicate the presence or absence of abnormality, together with the estimated cause for and the degree of the abnormality if detected in step S2-2. Solid line in the graph of FIG. 15 shows an example of the distribution of the local holding force values which act on the four sensing elements 112 and which are obtained from a waveform as indicated in FIGS. 11(a), 11(b) and 11(c), which in turn was obtained during reciprocation of the slide plate 20 in the inching mode. One-dot chain line in the graph of FIG. 15 shows the reference distribution of the local holding force values. The four sensing elements 112 correspond to the four corner portions of the slide plate 20. The reference distribution is determined by simulation or experiment on the basis of the pressure-receiving area Aa of the pneumatic cylinder 42 and the adjusted pneumatic pressure Pa. The reference distribution may be the distribution which was obtained in a previous cycle of the load distribution diagnosis and which was found normal. The comparison in step S2-3 of the obtained local load distribution with the reference distribution is effected by comparing the obtained local values (at the lower stroke end of the slide plate 20) with the corresponding values of the reference distribution. The presence or absence of an abnormality is determined according to a predetermined rule or reference, for example, by checking whether the differences of the obtained local load values with respect to the corresponding reference values are held within a predetermined range of tolerance. In step S2-3, the degree of the abnormality is estimated, as well as the cause for the abnormality. In step S2-4, the estimated cause for the abnormality is indicated on the panel 92, together with the estimated degree of the abnormality. As described above with respect to step S1-4, the detected abnormality may be serious requiring an immediate repair or adjustment of the press 10, or may not be so serious allowing the pressing operation to be continued with cares being exercised. The cause for the detected abnormality, which is estimated in step S2-3, may be an excessive amount of inclination of the slide plate 20 or cushion platen 28 with respect to the horizontal plane, which lead to uneven distribution of the blank holding force Fs acting on the pressure ring 30 during an actual pressing cycle, resulting in deterioration of the quality of the product.

The diagnostic routine of FIG. 14 is another embodiment of the diagnosing method of this invention, wherein step S2-1 is another form of the step of detecting a selected characteristic of a load generated at a selected portion of the press during operation of the press. Described more specifically, the selected characteristic of the load is a distribution of the local load values detected in step S2-1 by the four local sensing elements 112. Further, step S2-2 is another form of the step of determining the presence or absence of an abnormality on the basis of the detected load.

While the local load values when the slide plate 20 is located at its lower stroke end are obtained in step S2-1, the local load values corresponding to any other vertical position of the slide plate 20 may be obtained. For instance, the diagnosis of FIG. 14 may be effected using the load values immediately before the lower stroke end of the slide plate 20 or upon abutting contact of the slide plate 20 with the sensing elements 112. Although the load waveform obtained in step S1-2 of the load waveform diagnostic routine of FIG. 10 is utilized in step S2-1 of FIG. 14, the local load values may be obtained directly from the outputs of the strain gages 116, at an appropriate position of the slide plate 20. The present load distribution diagnosis may be carried out for not only the load distribution obtained during a test pressing cycle performed at the normal speed of the slide plate 20, but also for the load distribution obtained during a test pressing cycle in the inching mode in which the speed of movements of the slide plate 20 is slowed down near the lower stroke end (upon abutting contact of the measuring member 106 against the positioning member 102 of the load measuring apparatus 100). It is also possible to effect the load distribution diagnosis on the basis of the outputs of the strain gages 118 which represent the local load values acting on the cushion pins 24, or alternatively on the basis of the outputs of the strain gages 116 when the cushion platen 28 is located at its lower stroke end while the measuring member 106 is in abutting contact with the positioning member 102. The load distribution diagnosis may also be carried out using the strain gages 61 in place of the load measuring apparatus 100, with the die set 12, 18, 30 being installed on the press 10. In this instance, different reference distribution patterns may be used for different die sets installed, and different reference distribution patterns may be used for the respective local load values even for the same die set. While the load distribution diagnosis explained above by reference to FIG. 14 uses the reference load distribution for direct comparison with the obtained distribution of the local load values, the comparison or determination in step S2-2 may be made by checking whether the amount of variation or difference of the four local load values is held within a predetermined range of tolerance, or not.

(3) CORRELATION DIAGNOSIS

This diagnosis is formulated to diagnose the correlation between the load value on the press 10 and a selected physical value which varies with the load value. The present diagnosis is also performed with the load measuring apparatus 100 installed on the press 10, according to suitable diagnostic routines as illustrated in the flow charts of FIGS. 16, 19 and 22 by way of example. These routines are started by activating an appropriate diagnostic switch on the panel 92.

Referring first to the flow chart of FIG. 16, the correlation diagnosis illustrated therein relates to the correlation between the holding force Fs and the pneumatic pressure Pa of the cushioning pneumatic cylinder 42. The present Fs-Pa correlation diagnostic routine is started with step S3-1 to set the pneumatic pressure Pa to a predetermined level. When this step S3-1 is initially implemented, the pressure Pa is set to the predetermined initial level. As the step is repeatedly implemented, the pressure Pa is incremented by a predetermined amount. Step S3-1 is followed by step S3-2 to start a test pressing cycle, which is performed in the inching mode. Then, step S3-3 is implemented to detect the total holding force Fs during the test pressing operation on the basis of the outputs of the strain gages 116 (provided on the four sensing elements 112), and also detect the hydraulic pressure Ps of the balancing hydraulic cylinders 32, that is, hydraulic pressure Psa generated during the test pressing operation. In this example, the holding force Fs upon abutting contact of the slide plate 20 with the sensing elements 112 is detected, in order to eliminate an influence by a volumetric change of the pneumatic cylinder 42. Then, the control flow goes to step S3-4 to determine whether the pneumatic pressure Pa has been incremented to a predetermined upper limit Pamax. Steps S3-1 through S3-4 are repeatedly implemented until an affirmative decision (YES) is obtained in step S3-4, namely, until the pneumatic pressure Pa has been raised to the upper limit Pamax. Thus, the holding force Fs and generated hydraulic pressure Psa are detected at different levels of the pneumatic pressure Pa. When the affirmative decision (YES) is obtained with the pressure Pa reaching the upper limit Pamax, step S3-4 is followed by step S3-5 to compare the obtained Fs-Pa correlation with a reference correlation that is determined to assure an intended quality of the product, to thereby determine the presence or absence of any abnormality on the press 10.

Solid line in the graph of FIG. 17 shows an example of the Fs-Pa reference correlation, which is determined by simulation or experiment based on the pressure-receiving area Aa of the pneumatic cylinder weight Wa of the cushion platen 28, etc. The reference correlation may be a correlation which was found normal in a previous diagnostic cycle (previous cycle of execution of the routine of FIG. 16). The comparison of the detected Fs-Pa correlation with the reference correlation is effected to determine the presence or absence of any abnormality according to a predetermined rule or reference, for example, by checking if differences between the detected holding force values Fs corresponding to selected levels of the pneumatic pressure Pa and the corresponding holding force values Fs of the reference correlation are within a predetermined range of tolerance. The comparison in step S3-5 may also be effected by checking if the tendency of change of the detected holding force Fs (represented by the gradient of the detected Fs-Pa correlation line or curve indicated in one-dot chain line in FIG. 17) is similar to that of the reference correlation (indicated in solid line), or not. Step S3-5 is followed by step S3-6 to determine if the determination of the presence of any abnormality has been made in the preceding step S3-5 or not. If an affirmative decision (YES) is obtained in step S3-6, the control flow goes to step S3-7 to estimate the cause for the abnormality and the degree of the abnormality. Step S3-8 is then implemented to activate the CRT or liquid crystal display on the panel 92, to indicate the estimated cause for the abnormality, and the estimated degree of the abnormality. The degree of abnormality has been explained above with respect to steps S1-4 and S2-3. The cause for abnormality may be an excessively large value of the holding force Fs over the entire range of the pneumatic pressure Pa, as indicted by one-dot chain line in FIG. 17, which is considered to arise from an excessively large sliding resistance of the cushion platen 28. In this case, the holding force Fs which acts on the pressure ring 30 during an actual pressing operation will be larger than the optimum value Fso, possibly causing deterioration of the quality of the product manufactured by the press 10.

If a negative decision (NO) is obtained in step S3-6, that is, if no abnormality on the press 10 is found in step S3-5, the control flow goes to step S3-9 to calculate the optimum values of the weight Wa of the cushion platen 28 and the pressure-receiving area Aa of the pneumatic cylinder 42, on the basis of the Fs-Pa correlation obtained by repeated implementation of steps S3-1 through S3-4. The calculated optimum values Wa and Aa are stored as machine information in the machine data memory 130 of the condition setting portion 124 of the controller 90. Described more specifically, the weight Wa of the cushion platen 28 can be calculated from the load value Fx which is obtained from the Fs-Pa correlation as indicated in the graph of FIG. 8, and the pressure-receiving area Aa is represented by a value $\Delta Fs/\Delta Pa$ which is indicative of a rate of increase of the holding force Fs with an increase in the pressure Pa.

The control flow then goes to step S3-10 to store a Fs-Psa correlation in suitable memory means such as the RAM of the controller 90. The Fs-Psa correlation is obtained on the basis of the values of the holding force Fs and the values of the generated hydraulic pressure Psa, which are detected by repeated implementation of step S3-3. This Fs-Psa correlation is utilized to monitor the holding force Fs by checking the generated hydraulic pressure Psa, during actual pressing operations on the press 10. The graph of FIG. 18 shows an example of the Fs-Psa correlation. The range within which the generated hydraulic pressure Psa changes in proportion with the holding force Fs varies depending upon the initial hydraulic pressure Ps. Therefore, if the initial hydraulic pressure Ps is suitably adjusted prior to the actual pressing operation, the Fs-Psa correlation should be obtained for the specific initial value to which the hydraulic pressure Ps is adjusted for the particular pressing job.

The diagnostic routine of FIG. 16 is a further embodiment of the diagnosing method of this invention, wherein steps S3-1 through S3-4 constitute a further form of the step of detecting a selected characteristic of a load generated at a selected portion of the press during operation of the press. Described more specifically, the selected characteristic of the load is a correlation between the load Fs and the pneumatic pressure Pa as a physical value which changes with the load Fs. Further, step S3-5 is a further form of the step of determining the presence or absence of an abnormality on the basis of the detected load.

The Fs-Pa correlation and the Fs-Psa correlation may be detected on the basis of the outputs of the strain gages 61 in place of the output of the load measuring apparatus 100. In this case, the diagnosis may be conducted with the die set 12, 18, 30 being installed on the press 10. Further, the Fs-Pa and Fs-Psa correlations may be obtained by detecting the values Fs and Psa as the pneumatic pressure Pa is lowered in steps by opening the pressure control valve 46 while the slide plate 20 is held in abutting contact with the sensing elements 112 of the apparatus 112, with the pneumatic pressure Pa raised to the upper limit Pamax. The Fs-Psa correlation may be obtained independently of the Fs-Pa diagnosis, that is, in a routine different from that of FIG. 16. The determination in step S3-5 does not necessarily require the comparison of the detected Fs-Pa correlation directly with the reference correlation. For instance, the determination may be made by checking if a certain characteristic or characteristics of the detected Fs-Pa correlation, such as a gradient of a given portion of the detected correlation and/or load values Fs at selected points on the detected correlation is/are held within a predetermined range or ranges of tolerance of such characteristic or characteristics of the reference correlation.

In the illustrated embodiment of FIG. 16, the optimum values of the weight Wa and pressure-receiving area Aa are calculated on the basis of the obtained Fs-Pa correlation, so that the actual values Wa and As are adjusted to the calculated optimum values. However, the values Wa and Aa actually established on the press 10 may be theoretically determined according to the specification of the press, in this case, however, the optimum pneumatic pressure Pax calculated according to the above equation (1) does not necessarily assure the optimum holding force Fso, and may cause deterioration of the quality of the product since the pressure Pa is influenced by the sliding resistance of the cushion platen 28 and the air leakage from the pneumatic circuit associated with the pneumatic cylinder 42. In this respect, the Fs-Pa correlation may be utilized to check if the weight Wa and area Aa are adequate to assure the intended quality of the product. That is, the weight Wa and area Aa are diagnosed on the basis of the gradient of the Fs-Pa correlation and the load value Fx as determined by this Fs-Pa correlation.

Referring next to the flow chart of FIG. 19, there will be described a diagnosis relating to a correlation between the holding force Fs and the lower stroke end position Sd of the slide plate (main slide) 20 of the press 10. The Fs-Sd diagnostic routine of FIG. 16 is initiated with step S4-1 to to set the lower stroke end position Sd to a predetermined initial value. As this step S4-1 is repeated, the end position Sd is lowered by a predetermined distance for each implementation of the step, until the position Sd reaches a predetermined lowermost position Sdmax which will be described. Step S4-1 is followed by step S4-2 to suitably adjust the initial values of the pneumatic pressure Pa and other parameters and start a test pressing cycle in the inching or normal mode. Then, step S4-3 is implemented to detect the total holding force Fs at the lower stroke end position Sd (which has been set or updated in step S4-1), on the basis of the outputs of the strain gages 116 of the four sensing elements 112, and also detect the pneumatic pressure Pa at that time, namely, generated pneumatic pressure Paa on the basis of the output of the pneumatic pressure sensor 50. Step S4-3 is followed by step S4-4 to determine whether the lower stroke end position Sd is the predetermined lowermost position Sdmax or not. Thus, the values of the holding force Fs and generated pneumatic pressure Paa are detected as the lower stroke end position Sd of the slide plate 20 is lowered to increase the amount of volumetric change of the pneumatic cylinder 42 in the pressing cycle (during reciprocation of the slide plate 20), by repeated implementation of steps S4-1 through S4-4 until the lower stroke end position Sd reaches the lowermost position Sdmax, in other words, until an affirmative decision (YES) is obtained in step S4-4. When the predetermined lowermost position Sdmax is reached, step S4-5 is implemented to determine the presence or absence of any abnormality on the press 10, by comparing the detected Fs-Sd correlation with a reference correlation that assures the intended quality of the product.

Solid line in FIG. 20 represents an example of the reference Fs-Sd correlation, which is determined by simulation or experiment based on the pressure-receiving area Aa of the pneumatic cylinder 42, etc. The comparison in step S4-5 is effected to determine the presence or absence of any abnormality according to a predetermined rule or reference, for example, by checking if differences between the values of the holding force Fs detected at the different lower stroke end positions Sd of the slide plate 20 and the corresponding values of the reference correlation are held within a predetermined range of tolerance or not, or alternatively by checking if the gradient of the detected Fs-Sd correlation (namely, rate of change of the detected value Fs with the value Sd) is similar to that of the reference correlation or not. Then, step S4-6 is implemented to check if the determination of the presence of any abnormality has been made in step S4-5 or not. If an affirmative decision (YES) is obtained in step S4-6, the control flow goes to step S4-7 to estimate the cause for the detected abnormality, and the degree of the abnormality. Step S4-8 is then performed to indicate on the operator's control panel 92 the estimated cause for the abnormality and the estimated degree of the abnormality. The degree of the abnormality has been explained above with respect to steps S1-4 and S2-3. The cause for the abnormality may be a reduced volume of the pneumatic circuit associated with the pneumatic cylinder 42, due to accumulation of the lubricating oil in the cylinder 42 or air tank 44, which causes an excessively high rate of increase of the holding force Fs as indicated by one-dot chain line in FIG. 20. Alternatively, the cause for the abnormality may be an air leakage from the pneumatic circuit associated with the pneumatic cylinder 42, which causes an excessively low rate of increase of the holding force Fs as indicated by two-dot chain line in FIG. 20. In these cases of abnormality, the rate of change of the holding force Fs during reciprocation of the slide plate 20 in the actual pressing cycle is not desirable for assuring the intended quality of the product.

If no abnormality is found in step S4-5, a negative decision (NO) is obtained in step S4-6, and the control goes to step S4-9 to store the Fs-Paa correlation detected in step S4-3, in the appropriate memory such as the RAM of the controller 90. The stored Fs-Paa correlation is used to monitor the holding force Fs on the basis of the generated pneumatic pressure Paa during the actual pressing operations on the press 10. An example of the Fs-Paa correlation is indicated in FIG. 21. Since the range within which the generated pneumatic pressure Paa changes in proportion to the holding force Fs varies depending upon the initial pneumatic pressure Pa, the Fs-Paa correlation should be detected for the specific initial value to which the pneumatic pressure Pa is adjusted to the pressing cycle.

The diagnostic routine of FIG. 19 is a still further embodiment of the diagnosing method of this invention, wherein steps S4-1 through S4-4 constitute a still further form of the step of detecting a selected characteristic of a load generated at a selected portion of the press during operation of the press. Described in detail, the selected characteristic of the load is a correlation between the load Fs and the load stroke end position Sd of the slide plate 20 as a physical value which changes with the load Fs. It is also noted that step S4-5 is a still further form of the step of determining the presence or absence of an abnormality on the basis of the detected load.

The Fs-Sd correlation and the Fs-Paa correlation may be obtained by using the outputs of the strain gages 61 in place of the output of the load measuring apparatus 100. In this case, the diagnosis may be effected with the die set 12, 18, 30 being installed on the press 10. The Fs-Sd and Fs-Paa correlations may be obtained by detecting the values of the holding force Fs and generated pneumatic pressure Paa as the slide plate 20 is lowered in the inching mode down to the predetermined lowermost position Sdmax. The Fs-Paa correlation may be obtained independently of the Fs-Sd diagnosis, namely, in a routine different from that of FIG. 19. The Fs-Pa correlation of FIG. 17 may be used in place of the Fs-Paa correlation. The comparison in step S5-5 may be made based a predetermined range of tolerance of the gradient of a selected portion of the detected Fs-Paa correlation or selected Fs values of the detected correlation as compared with that or those of the reference correlation.

Reference is now made to the flow chart of FIG. 22, which illustrates a diagnostic routine relating to a correlation between the pressing force Fp and the relative distance h explained above. This Fp-h correlation diagnostic routine is initiated with step S5-1 to operate each of the four die-height adjusting mechanisms 52, to thereby set the corresponding relative distance h to a predetermined initial value. As this step S5-1 is repeatedly implemented, the distance h is incremented by a predetermined amount until the distance h reaches a predetermined upper limit hmax as described below. As the distance h is incremented, the lower stroke end of the slide plate 20 is lowered. Step S5-1 is followed by step S5-2 to start a test pressing cycle in the inching or normal mode. Then, the control flow goes to step S5-3 to detect the local values Fpi of the pressing force Fp corresponding to the four sensing elements 112, on the basis of the outputs of the strain gages 116 when the slide plate 20 is located at the lower stroke end set in step S5-1. Further, the local values Pmai (i=1, 2, 3, 4) of the hydraulic pressure Pm of the four hydraulic cylinders 62 generated at the lower stroke end of the slide plate 20 are detected based on the output of the hydraulic pressure sensor 69. The detection of the local pressing force values Fpi and generated hydraulic pressure values Pmai may be carried out with the pneumatic pressure Pa adjusted to an optimum value, or with the piston of the pneumatic cylinder 42 locked at its lower stroke end. Step S5-3 is followed by step S5-4 to determine whether the distance h has reached the predetermined upper limit hmax or not. Steps S5-1 through S5-4 are repeatedly implemented until the upper limit hmax is reached. Thus, the local pressing force values Fpi and local hydraulic pressure values Pmai are detected as the distance h is increased, that is, as the lower stroke end of the slide plate 20 is lowered to increase the amount of volumetric change of the hydraulic cylinders 62, until the distance h has reached the upper limit hmax. When the upper limit hmax is reached, an affirmative decision (YES) is obtained in step S5-4, the control flow goes to step S5-5 to determine the presence or absence of any abnormality on the press 10, by comparing the detected Fpi-h correlation with a reference correlation determined to assure the intended quality of the product.

Solid line in FIG. 23 shows an example of the reference Fpi-h correlation which is determined by simulation or experiment based on the rigidity values of the press 10 and sensing elements 112, modulus K of elasticity of volume of the oil in the hydraulic cylinders 62, etc. The reference Fpi-h correlation may be a correlation which was found normal in a previous cycle of execution of the routine of FIG. 22. The determination or comparison in step S5-5 is effected according to a predetermined rule or reference, for example, by checking if differences of the detected local pressing force values Fpi at respective local distance values h with respect to those of the reference correlation are held within a predetermined range of tolerance, or by checking if the tendency of change of the detected pressing force values Fpi in relation to the distance h, or if the gradient of the detected Fpi-h correlation is similar to that of the reference correlation. Then, step S5-6 is implemented to determine whether the determination of any abnormality has been made in step S5-5 or not. If an affirmative decision (YES) is obtained in step S5-6, the control flow goes to step S5-7 to estimate the cause for the abnormality and the degree of the abnormality, and step S5-8 to indicate the estimated cause for and degree of the abnormality, on the operator's control panel 92. The degree of the abnormality has been explained above with respect to the preceding embodiments. The cause for the abnormality may be an excessively high initial value of the hydraulic pressure Pm, which causes an excessively high rate of increase of the pressing force Fpi with an increase of the distance h, as indicated by one-dot chain line in FIG. 23. Alternatively, the cause for the abnormality may be an excessively low initial value of the hydraulic pressure Pm, which causes an excessively low value of the pressing force Fpi. In these cases, a change of the pressing force Fp during an actual pressing cycle is not desirable for assuring the intended quality of the product. In the case where a single servomotor is used to operate the four die-height adjusting mechanisms 52 to adjust the corresponding local relative distances h, the detected Fpi-h correlation may deviate from the reference correlation, that is, the line representative of the detected Fpi-h correlation may be shifted with respect to that of the reference correlation, as indicated by dashed line in FIG. 23, so that the pressing force Fpi is smaller or larger than the reference or desired value. Accordingly, the Fpi-h correlation diagnosis may be effected by checking the deviation or shift of the detected correlation with respect to the reference correlation.

If any abnormality has not been found in step S5-5, a negative decision (NO) is obtained in step S5-6, and the control flow goes to step S5-9 to store the detected Fpi-h correlation (Fpi=a·h) as the machine information in the machine data memory 130 of the condition setting portion 124 of the controller 90. Step S5-9 is followed by step S5-10 to store the Fpi-Pmai correlation detected in step S5-3, in a suitable memory such as the RAM of the controller 90. The stored Fpi-Pmai correlation is used to monitor the pressing force Fp or forming force Ff on the basis of the generated hydraulic pressure Pmai during an actual pressing operation. FIG. 24 shows an example of the Fpi-Pmai correlation. Since the range within which the generated hydraulic pressure Pmai changes in proportion to the pressing force Fpi varies depending upon the initial value of the hydraulic pressure Pm, the Fpi-Pmai correlation should be obtained for the specific initial value to which the hydraulic pressure Pm is adjusted prior to an actual pressing cycle.

The diagnostic routine of FIG. 22 is a yet further embodiment of the diagnosing method of this invention, wherein steps S5-1 through S5-4 constitute a yet further form of the step of detecting a selected characteristic of a load generated at a selected portion of the press during operation of the press. Explained more specifically, the selected characteristic of the load is a correlation between the load Fpi and the relative distance h as a physical value which changes with the load Fpi. Further, step S5-5 is a yet further form of the step of determining the presence or absence of an abnormality on the basis of the detected load.

The Fpi-h correlation and the Fpi-Pmai correlation may be detected using the outputs of the strain gages 61 rather than the output of the load measuring apparatus 100. In this case, the Fpi-h correlation diagnosis may be achieved with the die set 12, 18, 30 installed on the press 10. It is possible that the diagnosis is effected based on the correlation between the total holding force Fs and the distance h. The Fpi-Pmai correlation may bi obtained independently of the Fp-h correlation diagnosis, that is, in a routine different from that of FIG. 25. The Fpi-h correlation diagnosis may be effected based a predetermined range of tolerance of the gradient of a selected portion of the detected Fpi-h correlation or selected Fpi values of the detected correlation as compared with that or those of the reference correlation.

(4) LOAD VARIATION DIAGNOSIS

This load variation diagnosis is formulated to check the press 10 for operating stability during a continuous production run in a relatively large lot size, and is performed with the load measuring apparatus 100 installed on the press 10, according to a routine illustrated in the flow chart of FIG. 25, which is started by activating an appropriate switch on the operator's control panel 92. The routine is commenced with step S6-1 to start a test pressing cycle after the pneumatic and hydraulic pressures Pa, Ps and other parameters are adjusted to predetermined initial values. Step S6-2 is then implemented to detect a load value on the press 10 when the slide plate 20 is at its lower stroke end. The load value to be detected in this step may be the local pressing force values Fpi, total pressing force Fp, local holding force values Fsi or total holding force Fs, which is/are obtained on the basis of the outputs of the strain gages 116. Alternatively, the load value may be the local load values which act on the respective cushion pins 24 and which are obtained on the basis of the outputs of the strain gages 118. Then, step S6-3 is implemented to increment a counter C (which has been initialized to zero). Step S6-3 is followed by step S6-4 to determine whether the present content of the counter C has reached a predetermined value Cm. This value Cm represents the number of pressing cycles that are usually performed in a continuous production run in a relatively large lot size. For example, the value Cm is in the neighborhood of 500. Steps S6-t through S6-4 are repeatedly implemented until the counter C has counted the value Cm (e.g., 500). When an affirmative decision (YES) is obtained in step S6-4, the control flow goes to step S6-5 to determine the presence or absence of any abnormality on the press 10, by comparing the detected load variation pattern with a reference pattern determined to assure the intended quality of the product. In this step S6-5, the degree of an abnormality if it is detected is also estimated. Step S6-6 is then implemented to indicate the presence or absence of abnormality, together with the degree of an abnormality if detected, on the operator's control panel 92. Solid line in FIG. 26 shows an example of the reference load variation pattern, that is, the detected load which remains constant during a continuous operation of the press 10. The determination in step S6-5 is made according to a predetermined rule or reference, for example, by checking if differences of the detected load values with respect to the values of the reference pattern are held within a predetermined range of tolerance or not, or by checking if the tendency of variation of the detected load values (that is, a rate of change of the detected load values) is similar to that of the reference pattern. The degree of abnormality may be such that the abnormality requires an immediate repair or adjustment of the press 10 or allows the pressing operation to be continued with cares being exercised. The determination of the presence of abnormality is made in step S6-5 if the detected load tends to increase, as indicated by one-dot chain line of FIG. 26, or conversely tends to decrease, as compared with the reference pattern. The reference pattern may be a theoretically determined one wherein the load value is held constant as in the example of FIG. 26, or may be determined based on the initial load value measured upon commencement of a continuous pressing operation.

The diagnostic routine of FIG. 25 is a still further embodiment of the diagnosing method of this invention, wherein steps S6-1 through S6-4 constitute a still further form of the step of detecting a selected characteristic of a load generated at a selected portion of the press during operation of the press. Namely, the selected characteristic of the load is a pattern in which the load Fpi, Fp, Fsi, Fp varies as a function of the number of pressing cycles repeated on the press. It is also noted that step S6-4 is a still further form of the step of determining the presence or absence of an abnormality on the basis of the detected load.

The load variation pattern such as the variation pattern of the total pressing force Fp may be obtained on the basis of the outputs of the strain gages 61, in place of the output of the load measuring apparatus 100. In this case, the diagnosis may be achieved with the die set 12, 18, 30 being installed on the press 10. While the above embodiment is adapted to compare the detected load variation pattern with the reference pattern, it is possible to determine the presence or absence of an abnormality by checking if the rate or amount of change of the detected load value is held within a predetermined range of tolerance.

(5) ON-LINE DIAGNOSIS

The ON-line diagnosis is for monitoring the press 10 for optimum load values at various components of the press and for even distribution of the blank holding force Fs by the cushioning device 51, during an actual pressing operation on the press 10. Examples of monitoring routines for this purpose are illustrated in the flow charts of FIGS. 27 through 30, which are executed for each pressing cycle or at a predetermined interval (after a predetermined number of pressing cycles). The routine of FIG. 27 is formulated to monitor the local pressing force values Fpi, and is started with step S7-1 to read in the Fpi-Pmai correlation (as shown in FIG. 24) which corresponds to the specifically adjusted initial value of the hydraulic pressure Pm. Step S7-1 is followed by step S7-2 to detect the local hydraulic pressures Pmai during the pressing operation, on the basis of the output of the hydraulic pressure sensor 69. Then, step S7-3 is performed to calculate the local pressing force values Fpi corresponding to the detected generated local hydraulic pressures Pmai, on the basis of the Fpi-Pmai correlation which has been read in step S7-1. The control flow then goes to step S7-4 to read in the optimum local pressing force values Fpoi from the die data memory 132, compare the calculated local pressing load values Fpi with the optimum local pressing force values Fpoi, and determine the presence or absence of any abnormality on the press 10, depending upon whether a difference between the values Fpi and Fpoi is within a predetermined range of tolerance or not. The degree of an abnormality if it is detected is also estimated in step S7-4. Then, step S7-5 is implemented to activate the operator's control panel 92, to indicate the result of the determination in step S7-4, together with the degree of an abnormality if detected in step S7-4. Step S7-4 may be formulated to also estimate the cause for an abnormality if its presence is determined. The monitoring routine of FIG. 27 may be modified to automatically adjust the distance h (local distances h corresponding to the four plungers 22), and also the hydraulic pressure Pm, etc., if possible, so that the actual local pressing force values Fpi become closer to or coincide with the optimum values Fpoi.

The monitoring routine of FIG. 27 is yet another embodiment of the diagnostic method of the present invention, wherein step S7-2 is one form of a step of detecting a pressure of a working fluid in a cylinder disposed in a path of transmission of a load generated at a selected portion of the press. Further, step S5-10 of FIG. 22 to store the Fpi-Pmai correlation in the RAM of the controller 90 is one form of a step of storing a correlation between the load and the pressure of the working fluid. Step S7-4 is one form of a step of determining the presence or absence of an abnormality on the basis of the detected pressure and the correlation. The optimum local pressing force values Fpoi correspond to a predetermined reference used in the determining step.

While the above embodiment is adapted to monitor the local pressing force values Fpi, it is possible to monitor the total pressing force Fp which is a sum of the four local pressing force values Fpi.

The monitoring routine of FIG. 28, which is formulated to monitor the holding force Fs, is initiated with step S8-1 to read in the Fs-Psa correlation (as indicated in FIG. 18) which corresponds to the specifically adjusted initial value of the hydraulic pressure Ps, more precisely, which corresponds to the optimum initial hydraulic pressure P0 calculated by the P0, P1 calculating block 138 of the condition setting portion 124. Step S8-1 is followed by step S8-2 to detect the hydraulic pressure Psa generated during the pressing operation, on the basis of the output of the hydraulic pressure sensor 38. Then, step S8-3 is performed to calculate the holding force Fs corresponding to the detected generated hydraulic pressure Psa, on the basis of the Fs-Psa correlation which has been read in step S8-1. The control flow then goes to step S8-4 to read in the optimum holding force Fso from the die data memory 132, compare the calculated holding force Fs with the optimum value Fso, and determine the presence or absence of any abnormality on the press 10, depending upon whether a difference between the values Fs and Fso is within a predetermined range of tolerance or not. The degree of an abnormality if it is detected is also estimated in step S8-4. Then, step S8-5 is implemented to activate the operator's control panel 92, to indicate the result of the determination in step S8-4, together with the degree of an abnormality if detected in step S8-4. Step S8-4 may be formulated to also estimate the cause for an abnormality if its presence is determined. The monitoring routine of Fig. FIG. 28 may be modified to automatically adjust the pneumatic pressure Pa, etc., so that the actual holding force Fs becomes closer to or coincides with the optimum value Fso.

The monitoring routine of FIG. 28 is a still further embodiment of the diagnostic method of the present invention, wherein step S8-2 is one form of a step of detecting a pressure of a working fluid in a cylinder disposed in a path of transmission of a load generated at a selected portion of the press. Further, step S3-10 of FIG. 16 to store the Fs-Psa correlation in the RAM of the controller 90 is one form of a step of storing a correlation between the load and the pressure of the working fluid. Step S8-4 is one form of a step of determining the presence or absence of an abnormality on the basis of the detected pressure and the correlation. The optimum total holding force Fso corresponds to a predetermined reference used in the determining step.

The monitoring routine of FIG. 29, which is also formulated to monitor the holding force Fs, is initiated with step S9-1 to read in the Fs-Paa correlation (as indicated in FIG. 21) which corresponds to the specifically adjusted initial value of the pneumatic pressure Pa, more precisely, which corresponds to the optimum pneumatic pressure Pax calculated by the Pax calculating block 134 of the condition setting portion 124. Step S9-1 is followed by step S9-2 to detect the hydraulic pressure Paa generated during the pressing operation, on the basis of the output of the pneumatic pressure sensor 50. Then, step S9-3 is then performed to calculate the holding force Fs corresponding to the detected generated pneumatic pressure Paa, on the basis of the Fs-Paa correlation which has been read in step S9-1. The control flow then goes to step S9-4 to read in the optimum holding force Fso from the die data memory 132, compare the calculated holding force Fs with the optimum value Fso, and determine the presence or absence of any abnormality on the press 10. Then, step S9-5 is implemented to activate the operator's control panel 92, to indicate the result of the determination in step S8-4.

The monitoring routine of FIG. 29 is a still further embodiment of the diagnostic method of the present invention, step S9-2 is one form of a step of detecting a pressure of a working fluid in a cylinder disposed in a path of transmission of a load generated at a selected portion of the press. Further, step S4-9 of FIG. 19 to store the Fs-Paa correlation in the RAM of the controller 90 is one form of a step of storing a correlation between the load and the pressure of the working fluid. Step S9-4 is one form of a step of determining the presence or absence of an abnormality on the basis of the detected pressure and the correlation.

The monitoring routine of FIG. 30 is formulated to monitor the cushioning device 51 for even distribution of the holding force Fs on the pressure ring 30. The routine is initiated with step S10-1 to read out from the machine data memory 130 the optimum initial and target hydraulic pressures P0 and P1 calculated by the P0, P1 calculating block 138 of the condition setting portion. Step S10-1 is followed by step S10-2 to detect the hydraulic pressure Ps prior to the pressing operation and the hydraulic pressure Psa generated during the pressing operation, on the basis of the output of the hydraulic pressure sensor 38. Then, step S10-3 is then performed to compare the detected pressure values Ps and Psa with the optimum and target values P0 and P1, respectively, and determine the presence or absence of any abnormality on the press 10, depending upon whether differences between the detected and optimum or target values are within a predetermined range of tolerance or not. In step S10-3, the degree of an abnormality (if detected) as explained above is also estimated, and the estimated degree of abnormality is indicated on the panel 92, together with the presence of the abnormality. Step S10-3 may be formulated to also estimate the cause for an abnormality if its presence is determined. The monitoring routine of FIG. FIG. 30 may be modified to automatically adjust the hydraulic pressure Ps, etc., so that the holding force Fs is evenly distributed to the pressure ring 30.

The monitoring routine of FIG. 30 is also a further embodiment of the diagnostic method of the present invention, wherein step S10-2 is one form of a step of obtaining diagnostic information, more specifically, the pressure values Ps, Psa of the balancing hydraulic cylinders 32. Further, step S10-3 is one form of a step of determining the presence or absence of an abnormality.

While the above embodiment of FIG. 30 is adapted to monitor the hydraulic pressure Ps prior to a pressing cycle and the hydraulic pressure Psa generated during the pressing cycle, the routine of FIG. 30 may be modified to monitor only one of those two parameters Ps and Psa. It is noted that the cushioning device 51 may be diagnosed by monitoring the generated pneumatic pressure Paa, since the generated pneumatic pressure Paa which assures even distribution of the holding force Fs is held within a certain range, if the initial hydraulic pressure Ps prior to a pressing cycle is constant.

While the various ON-line diagnostic routines have been described above with respect to the specific parameters, by way of example, the ON-line diagnosis according to the present invention is also applicable to the monitoring of the other parameters, such as the pneumatic pressure values Pb, Pc and hydraulic pressure Pm prior to or during a pressing cycle, to diagnose the associated portions of the press 10. Further, the ON-line diagnosis is equally applicable to the monitoring of the pressing force Fp on the basis of the outputs of the strain gages 61.

As described above, the press 10 diagnostic diagnostic functions such as the load waveform diagnosis, load distribution diagnosis, correlation diagnosis and load variation diagnosis, which are effected by using the load measuring apparatus 100, to find out any abnormality or defect on the press 10, by diagnosing the press for adequacy of various operating parameters or conditions that assure the intended quality of the product. These diagnostic functions permit easy inspection of the press 10 for abnormality without disassembling thereof, and eliminate an unnecessary repair or adjustment of the die set, which is conventionally required in the presence of any abnormality associated with the press 10. Further, the press 10 is adapted to estimate the cause for a detected abnormality, and indicate the estimated cause, together with the presence of the abnormality, on the operator's control panel 92, thereby facilitating the repair or adjustment of the press 10 to remove the detected abnormality.

Moreover, the diagnostic routines are formulated to store in a suitable memory the Fs-Psa correlation and Fs-Paa correlation, Fpi-Pmai correlation, which are used in the ON-line diagnosis executed during an actual pressing operation, to monitor the blank holding force Fs and the local pressing force Fpi on the basis of the detected hydraulic pressures Psa, Pmai and pneumatic pressure Paa, and according to the stored correlations. Accordingly, deterioration or chronological change of the various portions of the press 10 which cause undesirable changes of the related load values may be detected in an early stage of production of an article manufactured by the press. In other words, abnormality due to such deterioration or chronological change of the press that leads to lowered quality of the product can be found without a large number of unacceptable products.

According to the illustrated ON-line diagnosis, the hydraulic pressure Pa prior to a pressing cycle and the hydraulic pressure Psa generated during the pressing cycle are detected and compared with the calculated optimum initial and target hydraulic values P0 and P1, respectively, to monitor the cushioning device 51 for even distribution of the blank holding force Fs on the pressure ring 30. This ON-line diagnostic function assures early finding of abnormalities such as uneven distribution of the blank holding force Fs, which arise from deterioration or chronological change of the cushioning device 51 and which cause deteriorated quality of the product.

Referring next to FIG. 31, there is shown an example of a double-action press 150 to which the present invention is also applicable. The press 150 id constructed to perform a drawing operation on a blank to manufacture an outer panel of a motor vehicle as an end product. The press 150 has: a bolster 154 on which a lower die 152 is fixed; an outer slide 160 which carries a pressure ring 156 through a blank holder plate 158 secured thereto; and an inner slide 164 to which is fixed an upper die in the form of a punch 162. The outer slide 160 and the inner slide 164 are vertically reciprocated by four outer plungers 166 and four inner plungers 16B, respectively. As shown in FIG. 32, the lower die 152 includes a pressure portion 170, which cooperates with the pressure ring 156 to hold a peripheral portion of a blank 171 therebetween while the blank 171 is drawn by the punch 162 and the lower die 152. The lower die 152, pressure ring 156 and punch 162 constitute a die set removably installed on the press 150. The outer and inner plungers 166, 168 are vertically reciprocated by slide driving means 169 which includes a drive motor, gears, crankshafts, joint pins and links.

As is apparent from FIG. 32, each of the four outer plungers 166 is connected to the outer slide 160, via a die-height adjusting mechanism 172 similar to the mechanism 52 described above with respect to the single-action press 10. The mechanism 172 is operated by a servomotor 174 to adjust a local relative distance ha corresponding to each outer plunger 166. The adjusted distance ha is detected by a rotary encoder 176 (FIG. 34) provided on the servomotor 174. The outer slide 166 is lowered with respect to the outer plunger 166 as the distance ha increases. Accordingly, the holding force Fs applied to the pressure ring 156 when the outer plunger 166 is at its lower stroke end is changed with the distance ha. The die-height adjusting mechanism 172 is provided for each of the four outer plungers 166, so that the local distances ha associated with all the plungers 166 can be adjusted. The outer plungers 166 are provided with respective sets of strain gages 178 to detect the local load values Fai (i=1, 2, 3, 4) acting thereon. The load values Fai are obtained according to a stored data map representative of the output levels of the strain gages 178 and the values Fai which were actually measured by the load measuring apparatus 100 described above.

Each die-height adjusting mechanism 172 is integrally connected to a piston 182 of a hydraulic cylinder 180, which is provided for adjusting the holding pressure. The housing of the hydraulic cylinder 180 is built in the outer slide 160. The pressure chamber of the hydraulic cylinder 180 is filled with a working fluid or oil and communicates with an oil chamber 186 of a hydro-pneumatic cylinder 184. Hydraulic pressure Py within the hydraulic cylinder 180 is manually adjusted to an optimum level, and detected by a hydraulic pressure sensor 192. The cylinder 184 also has an air chamber 188 communicating with an air tank 190, which is connected to an air source 262 through a solenoid-operated pressure control valve 200. By controlling the pressure control valve 200, pneumatic pressure Pe within the air chamber 188 is adjusted depending upon the desired blank holding force Fs. The pneumatic pressure Pe is detected by a pneumatic pressure sensor 202. The cylinder 180, cylinder 184 and air tank 190 are provided for each of the four outer plungers 166 (four die-height adjusting mechanisms 172 provided on the outer slide 160). The pneumatic pressure Pe is adjusted for each of the four air tanks 190.

The outer slide 160 is connected to four counterbalancing pneumatic cylinders 216 attached to a machine frame 196 (FIG. 31) of the press 150. The pressure chamber of each pneumatic cylinder 216 communicates with an air tank 218, which in turn is connected to an air source 262 through a solenoid-operated pressure control valve 204. By controlling the pressure control valve 204, pneumatic pressure Pd within the air tank 218 is controlled. This pneumatic pressure Pd is detected by a pneumatic pressure sensor 206 and is adjusted so that the holding force Fs is not influenced by the weights of the outer slide 160 and pressure ring 156. The four pneumatic cylinders 216 are connected to the common air tank 218.

As shown in FIG. 33, each of the four inner plunges 168 is connected to the inner slide 164 through a die-height adjusting mechanism 240 similar to the mechanism 172, so that a relative distance hb as indicated in FIG. 33 is adjustable by a servomotor 242. The distance hb is detected by a rotary encoder 244 (FIG. 34) provided on the servomotor 242. The inner slide 164 is lowered with respect to the inner plunger 168 as the distance hb increases. Accordingly, the pressing force Fs applied to the blank 171 when the inner plunger 168 is at its lower stroke end is changed with the distance hb. The die-height adjusting mechanism 240 is provided for each of the four inner plungers 168, so that the distance hb associated with all the four plungers 168 can be adjusted. The inner plungers 168 are provided with respective sets of strain gages 246 to detect the local load values Fbi (i=1, 2, 3, 4) acting thereon. The load values Fbi are obtained from a stored data map representative of a relationship between the output levels of the strain gages 246, and the load values Fbi which were actually measured by the load measuring apparatus 100.

Each die-height adjusting mechanism 240 is integrally connected to a piston 250 of an overload-protective hydraulic cylinder 248. The housing of the hydraulic cylinder 248 is built in the inner slide 164. The pressure chamber of the hydraulic cylinder is filled with the working fluid and communicates with an oil chamber 254 of a hydro-pneumatic cylinder 252. Hydraulic pressure Pz within the hydraulic cylinder 248 is manually adjusted to an optimum level, and is detected by a hydraulic pressure sensor 249. This cylinder 252 also has an air chamber 256 communicating with an air tank 258, which in turn is connected to an air source 262 through a solenoid-operated pressure control valve 260. By controlling the hydraulic control valve 260, pneumatic pressure Pg within the air chamber 256 and air tank 258 is adjusted as needed. The pneumatic pressure Pg is detected by a pneumatic pressure sensor 264. The pneumatic pressure Pg is adjusted depending upon the pressing capacity of the press 150, so that when an overload acts on the hydraulic cylinder 248, the piston of the cylinder 252 is moved toward the air chamber 256 to permit the die-height adjusting mechanism 240 and the inner slide 164 to move towards each other, for protecting the press 150 and the die set 152, 156, 162 against damage. The hydraulic cylinder 248, hydro-pneumatic cylinder 252 and air tank 258 are provided for each of the four inner plungers 168 (for each of the four die-height adjusting mechanisms 240 of the inner slide 168), and the pneumatic pressure Pg in each of the four cylinders 252 is adjusted as described above.

The inner slide 164 is connected to four counterbalancing pneumatic cylinders 266 attached to the machine frame 196 of the press 150. The pressure chamber of each pneumatic cylinder communicates with an air tank 268, which in turn is connected to the air source 262 through a solenoid-operated pressure control valve 270. Pneumatic pressure Pf within the pressure chamber of the cylinder 266 and the air tank 268 is adjusted by the pressure control valve 270, and is detected by a pneumatic pressure sensor 272. The pressure Pf is adjusted so that the forming force Ff is not influenced by the weights of the inner slide 164 and the punch 162. The pressure chambers of the four pneumatic cylinders 266 are connected to the common air tank 268.

The press 150 is operated under the control of a controller 280 shown in FIG. 34. The controller 280 are adapted to receive output signals of the pneumatic pressure sensors 202, 206, 264, 272 representative of the pneumatic pressures Pe, Pd, Pg, Pf, respectively, output signals of the rotary encoders 176, 244 representative of the relative distances ha, hb, respectively, and output signals of the strain gages 178, 246 representative of the load values Fai, Fbi, respectively. The controller 280 applies control signals to the pressure control valves 200, 204, 260, 270, and the servomotors 174, 242. The controller 280 is a microcomputer including a central processing unit (CPU), a random-access memory (RAM), a read-only memory (ROM), an input-output interface circuit, and A/D converters, as well known in the art. The CPU performs necessary signal processing operations, according to control programs stored in the ROM, while utilizing a temporary data storage function of the RAM. Although FIG. 34 shows only one piece or unit, for the servomotors 174, 242, strain gages 178, 246, hydraulic pressure sensors 192, 249, pressure control valves 200, 260 and pneumatic pressure sensors 202, 264, it is noted that four pieces are in fact provided for each of these elements, as described above, and the controller 280 controls all of the four pieces.

To the controller 280, there is connected an operator's control panel 282 which have indicator for indicating the pneumatic and hydraulic pressures Pd, Pe, Pf, Pg, Py, Pz, and other parameters of the press 150, and keys and switches which enable the operator to enter necessary data for various settings and control commands for controlling the press 150. The lower die 152 is provided with an ID card 306 as shown in FIG. 31, which stores die set information indicative of the specifications of the die set 152, 156, 162. On the other hand, a transmitter/receiver 304 is provided on the machine frame 194. The transmitter/receiver 304 is positioned to receive the die set information from the ID card 306. The transmitter/receiver 304, and a position sensors 284 (not shown in FIG. 31) for detecting the vertical positions of the outer and inner slides 160, 164 are connected to the controller 280, as indicated in FIG. 34. The load measuring apparatus 100 is connected to the controller 280, when the apparatus 100 is used. As shown in FIG. 35, the apparatus 100 is installed on the press 150, in place of the die set 152, 156, 162. Spacer blocks 128 are bolted or otherwise fixed to the upper end faces of the respective posts 110 provided on the positioning member 102, as indicated in FIG. 35. The strain gages 114 provided on the side surfaces of the posts 110 are adapted to detect the load which acts on the outer slide 160, that is, the blank holding force Fs, while the strain gages 116 provided on the sensing elements 112 are adapted to detect the load which acts on the inner slide 164, that is, the forming force Ff.

The controller 280, which performs various control functions according to the control programs stored in its ROM, has two functional portions, namely, a condition setting portion 290 and a diagnostic portion 292, as indicated in FIG. 36. The condition setting portion 290 has various functional blocks as indicated in FIG. 37. The condition setting portion 290 includes a machine data memory 310 and a die data memory 312. The machine data memory 310 stores data including machine information entered through the operator's control panel 282, while the die data memory 312 stores the die set information which is read from the ID card 306 and transmitted by the transmitter/receiver 304 when the die set 152, 156, 162 is installed on the press 150. For example, the machine information and the die set information include the following information necessary to determine the pneumatic pressure values Pd, Pe, Pf and the relative distances ha, hb which permits a drawing operation under optimum conditions.

[MACHINE INFORMATION]
Travel distance Y of the piston of the cylinder 184
Pressure-receiving area Ax of the hydraulic cylinder 180
Pressure-receiving area Ay of the oil chamber 186 of the cylinder 184
Pressure-receiving area Az of the air chamber 188 of the cylinder 184
Volume Ve of the air tank 190
Total weight Wos of the outer slide 160 and the blank holder plate 158
Weight Wis of the inner slide 164
Total pressure-receiving area Ad of the four pneumatic cylinders 216
Total pressure-receiving area Af of the four pneumatic cylinders 266
Provisional ha-Fsi characteristic relationship (Fsi=c·ha+d)
Provisional hb-Ffi characteristic relationship (Ffi=e·hb)
[DIE SET INFORMATION]
Weight Wr of the pressure ring 156
Weight Wq of the punch 162
Optimum local holding force Fsoi
Optimum local forming force Ffoi It is noted that the die set information also includes data indicative of the specific die set 152, 156, 162 used, which differs depending upon a model of a car for which a part produced by the press 150 is used, a type of the press 150 on which the die set is used, and a process in which the product is produced from the blank 171.

The travel distance Y, pressure-receiving areas Ax, Ay, Az, and volume Ve are obtained for each of the four outer plungers 166 connected to the outer slide 160. The travel Y is a travel distance of the piston of the hydro-pneumatic cylinder 184 from its lower stroke end toward the air chamber 188. The travel distance Y is determined by an experiment, for example, so as to apply a suitable holding force to the pressure ring 156 based on the pneumatic pressure Pe. The pressure-receiving areas Ax, Ay, Az are effective areas which are determined according to the operating characteristics of the cylinders 180, 184 and which reflect influences of the sliding resistance and the oil leakage. The volume Ve includes the volume of the air chamber 188 of the hydro-pneumatic cylinder 184, and can be obtained on the basis of a change in the pressure Pe in relation to the travel distance of the piston of the cylinder 184.

The total weight Wos of the outer slide 160 and blank holder plate 158 is the actual total weight minus the sliding resistance of the outer slide 160. Like the weight Ws of the slide plate 20 of the press 10, this weight value Wos can be obtained from a Fa-Pd relationship, which is obtained from the total load Fa measured upon lowering of the outer slide 160 while the pneumatic pressure Pd in the cylinder 216 is changed. The total load Fa is a sum of the four load values Fai detected by the strain gages 178. Similarly, the weight Wis of the inner slide 164 can be obtained from a Fb-Pf relationship. The total pressure-receiving area Ad of the four pneumatic cylinders 216 reflects the influence of the air leakage of the individual cylinders 216. A gradient of the line representing the Fa-Pd relationship corresponds to the total pressure-receiving area Ad. The total pressure-receiving area Af of the four pneumatic cylinders 266 reflects the influences of the air leakage of the individual cylinders 266. A gradient of the line representing the Fb-Pf relationship corresponds to the total pressure-receiving area Af.

The provisional ha-Fsi relationship (i=1, 2, 3, 4) is a relationship (Fsi=c·ha+d) between the distance ha and the holding force Fsi when the outer plungers 166 have reached the lower stroke ends. This relationship is obtained from the load values Fsi detected by the strain gages 114 (when the plungers 166 are at their lower stroke ends), with different values of the distance ha. The obtained provisional ha-Fsi relationship reflects the rigidity of the press 150. It is noted that the measurement of the provisional ha-Fsi relationship is effected after the pneumatic pressure Pd of the pneumatic cylinders 216 is adjusted so that the lifting force produced by the cylinders 216 counterbalances the total weight of the outer slide 160 and blank holder plate 158. Since the load value Fsi changes with the pneumatic pressure Pe, the ha-Fsi relationship is set in relation to the pneumatic pressure Pe, as indicated the graph of FIG. 38. To obtain the ha-Fsi relationship, the maximum value hao of the distance ha when the load value Fsi is zero is used as a reference. The provisional ha-Fsi relationship is obtained for each of the four outer plungers 166, that is, for each of the four posts 110 on which the strain gages 114 are provided. The total holding force Fs is a sum of the load values Fsi of the individual plungers 166. The four posts 110 of the apparatus 100 are substantially aligned with the respective outer plungers 166. The provisional ha-Fsi relationship may be obtained on the basis of the outputs of the strain gage 178 provided on the outer plungers 166.

The provisional hb-Ffi relationship (i=1, 2, 3, 4) is a relationship (Ffi=e·hb) between the distance hb and the forming force Ffi when the inner plungers 168 are at their lower stroke ends. This relationship is obtained in the same manner as the relationship h-Fpi (Fpi=a·h) described above with respect to the press 10. That is, the load values Ffi are detected by the strain gages 116 when the plungers 168 are at their lower stroke ends, with different values of the distance hb. The obtained provisional hb-Ffi relationship reflects the rigidity of the press 150. The measurement of this hb-Ffi relationship is effected after the pneumatic pressure Pf of the cylinders 266 is adjusted so that the lifting force produced by the cylinders 266 counterbalances the weight of the inner slide 164. The provisional hb-Ffi relationship is obtained for each of the four inner plungers 168, that is, for each of the four sensing elements 112 of the apparatus 100. The total forming force Ff is a sum of the load values Ffi of the individual inner plungers 166. The four sensing elements 112 are substantially aligned with the respective inner plungers 168. The hb-Ffi relationship may be obtained on the basis of the outputs of the strain gages 246 provided on the inner plungers 168.

There will be described the individual items of the die set information.

The weight Wr of the pressure ring 156 and the weight Wq of the punch 162 are the values actually measured of the ring 156 and punch 162 as manufactured. The optimum local holding force Fsoi (i=1, 2, 3, 4) and the optimum local forming force Ffoi (i=1, 2, 3, 4) are obtained by a try-and-error procedure, in which the optimum force values Fsoi and Ffoi suitable for performing a desired drawing operation are determined by test operations on a trial or test press on which the pressure ring 156, lower die 152 and punch 162 are installed. The optimum local holding and forming force values Fsoi, Ffoi do not include components due to the influences by the weight of the die set 156, 156, 162 and the sliding resistance values of the associated parts. In the case where the trial press used is similar in construction to the press 150 shown in FIG. 31, for example, the pneumatic pressure Pd is adjusted so that the outer slide 160 is lowered by the outer plungers 166 while the total weight of the outer slide 160, blank holder plate 158 and pressure ring 156 is counterbalanced by the lifting force produced by the cylinders 216. The load values Fai are detected by the strain gages 178 during a trial drawing operation effected with the thus adjusted pneumatic pressure Pd. The load values Fsoi are obtained on the basis of the detected load values Fai. Further, the pneumatic pressure Pf is adjusted so that the inner slide 164 is lowered while the total weight of the inner slide 164 and the punch 162 is counterbalanced by the lifting force produced by the pneumatic cylinders 266. The load values Fbi are detected by the strain gages 246 during a trial drawing operation effected with the thus adjusted pneumatic pressure Pf. The load values Fpoi are obtained on the basis of the detected load values Fbi. Thus, the optimum four local load values Fsoi associated with the four outer plungers 166, and the optimum four local load values Ffoi associated with the four inner plungers 168 are obtained. The optimum total holding force Fso is a sum of the four local lad values Fsoi, while the optimum total forming force Ffo is a sum of the four local load values Ffoi.

Referring back to the block diagram of FIG. 37, the condition setting portion 290 of the controller 280 includes a Pdx calculating block 314 for calculating an optimum pneumatic pressure Pdx for producing the lifting force which counterbalances the total weight of the outer slide 160, blank holder plate 158 and pressure ring 156. This calculation is effected according to the following equation (5), on the basis of the machine information stored in the machine data memory 310 and the die set information stored in the die data memory 312.

$$Pdx=(Wr+Wos)/Ad \quad (5)$$

The output of the Pdx calculating block 314 is fed to a Pd adjusting block 316 for controlling the solenoid-operated pressure control valve 204 so that the pneumatic pressure Pd in the air tank 218 detected by the pneumatic pressure sensor 206 coincides with the optimum pneumatic pressure Pdx calculated by the Pdx calculating block 314, with the pneumatic pressure Pd thus adjusted, the optimum local holding forces Fsoi specified by the die set information are applied to the pressure ring 156., without an influence by the weights of the outer slide 160, blank holder plate 158 and pressure ring 156. The pneumatic pressure Pdx may be calculated, with suitable compensation for a change in the volume of the pressure chamber of the four pneumatic cylinders 216 due to a downward movement of the outer slide 160. In this respect, however, since the capacity of the air tank 218 is sufficiently large, the amount of change in the pneumatic pressure Pd due to the change in the volume of the pressure chamber of the cylinders 216 is so small and negligible.

The condition setting portion 290 also includes a Pex calculating block 318 for calculating an optimum pneumatic pressure Pex for producing each optimum local holding force Fsoi, according to the following equation (6), on the basis of the machine information in the machine data memory 310 and the die set information in the die data memory 312.

$$Fsoi=(Ax\cdot Az/Ay)\{(Pex+Pt)[Ve/(Ve-Az\cdot Y)]-Pt\} \qquad (6)$$

where, Pt: atmospheric pressure

The output of the Pex calculating block 318 is fed to a Pe adjusting block 320 which is adapted to control the pressure control valve 200 so that the pneumatic pressure Pe in the air tank 190 detected by the pressure sensor 202 coincides with the optimum pneumatic pressure Pex calculated by the Pex calculating block 318. The optimum pneumatic pressure Pex is calculated to adjust the pneumatic pressure Pe, for all of the four air tanks 190 on the basis of the stored machine and die set information, so that the optimum local holding force values Fsoi as specified by the die set information are established at the portions of the pressure ring 156 corresponding to the positions of the individual four outer plungers 166, irrespective of the difference in the pressure-receiving areas of the four cylinders 180, 184.

The condition setting portion 290 further includes a Pfx calculating block 326 for calculating an optimum pneumatic pressure Pfx for producing the lifting force which counterbalances the total weight of the inner slide 164 and punch 162. This calculation is effected according to the following equation (7), on the basis of the machine information and die set information stored in the memories 310, 312.

$$Pfx=(Wq+Wis)/Af \qquad (7)$$

The output of the Pfx calculating block 326 is applied to a Pf adjusting block 328 which is adapted to control the solenoid-operated pressure control valve 270 so that the pneumatic pressure Pf in the air tank 268 detected by the pneumatic pressure sensor 272 coincides with the optimum pneumatic pressure level Pfx calculated by the Pfx calculating block 326. With the pneumatic pressure Pf thus adjusted, the optimum local forming force values Ffoi as specified by the die set information are established, without an influence of the weights of the inner slide 164 and punch 162. The pneumatic pressure Pfx may be calculated, with suitable compensation for a change in the volume of the pressure chamber of the pneumatic cylinders 266 due to a downward movement of the inner slide 164. In this respect, however, since the capacity of the air tank 268 is sufficiently large, the amount of change in the pneumatic pressure Pf due to the change in the volume of the pressure chamber of the cylinders 266 is so small and negligible.

The condition setting portion 290 also includes an ha adjusting block 330 for adjusting the individual distances ha associated with the four die-height adjusting mechanisms 172, independently of each other, on the basis of the machine and die set information, so that the optimum local holding force values Fsoi as specified by the die set information are established. Initially, a reference value ha0 which is a maximum value of each distance ha when the local holding force values Fsi are zero is determined on the basis of the load values Fai detected by the strain gages 178. Then, the provisional ha-Fsi relationship (Fsi=c·ha+d) (shown in FIG. 38 and stored in the machine data memory 310) which corresponds to the optimum pneumatic pressure Pex calculated by the Pex calculating block 318 is selected and read out from the machine data memory 310. On the basis of the selected provisional ha-Fsi relationship, a distance ha1 for obtaining the optimum local holding force values Fsoi is obtained as indicated in the graph of FIG. 39, and the distance ha is adjusted to the obtained value ha1, with respect to the reference value ha0, by operating the servomotor 174. In this condition, a test pressing operation is conducted on the press 150, with the outer slide 160 moved between their stroke ends. The local holding force values Fsi are measured on the basis of the outputs of the strain gages 178. Since the predetermined provisional ha-Fsi relationship is based on higher rigidity of a die set than the rigidity of the actually used die set 152, 156,162, the holding force value Fs1 are generally smaller than the optimum local holding force values Fsoi. Based on a difference between the values Fsi and Fsoi, a final ha-Fsi relationship (Fsi=c·ha+f) is obtained as also indicated in the graph of FIG. 39. Then, the optimum distances hax for obtaining the optimum local holding force values Fsoi is determined by the obtained final ha-Fsi relationship. The servomotor 174 is operated to adjust each distance ha to the distance hax. The determination of the distance hax and the adjustment of the distance ha to hax are effected for each of the four die-height adjusting mechanisms 172, in the same manner as described above. The adjustment of the individual distances ha according to the functional block 330 permits a drawing operation with the optimum local holding force values Fsoi as specified by the die set information, irrespective of a variation in the rigidity of the press 150 from one machine to another.

The condition setting portion 290 further includes an hb adjusting block 332 for adjusting the individual distances hb associated with the four die-height adjusting mechanisms 240, independently of each other, on the basis of the machine and die set information, in the same manner as described above with respect to the distance h as adjusted by the h adjusting block 146. With the distances hb adjusted to an optimum value hbx by the block 332, the optimum local forming force values Ffoi as specified by the die set information are established for the respective die-height adjusting mechanisms 240.

The controller 280 also functions to adjust the pneumatic pressure Pg of each hydro-pneumatic cylinder 252, in the same manner as used for the pneumatic pressure Pc on the press 10, so that the local load values Fbi detected by the strain gages 246 do not exceed the respective upper limit values Foli (i=1, 2, 3, 4). Since the pneumatic pressure Pg can be adjusted irrespective of the particular die set used, it may be manually adjusted by the operator of the press 150.

It will be understood from the above description that the double-action press 150 is capable of automatically adjusting the various pressing conditions such as the pneumatic pressures Pd, Pe, Pf and distances ha, hb, so as to establish the optimum local holding force values Fsoi and optimum local forming force values Ffoi as determined in a trial or test operation on a test machine, irrespective of variations or differences in the rigidity and sliding resistances of the press from one machine to another. The adjustments of those pressing conditions are based on the machine information stored in the machine data memory 310, and the die set information which is transmitted from the ID card 306 through the transmitter/receiver 304 and stored in the die data memory 312. Thus, the press 150 eliminates or minimizes the conventional cumbersome manual adjustment of the operating conditions of the press by the trial-and-error procedure, and considerably reduces the operator's work load upon setting up the press, while assuring high stability in the quality of the product.

As described above with respect to the single-action press 10, it is not absolutely necessary to adjust the pneumatic pressures Pd, Pe, Pf and distances ha, hb exactly to the calculated optimum values Pdx, Pex, Pfx, hax, hbx. That is, certain ranges of tolerances may be provided for those operating conditions, provided that the tolerance ranges satisfy appropriate requirements in terms of the quality of the product.

The diagnostic portion 292 of the controller 280 is designed to diagnose the press 150 to see if there exists any abnormality or defect that prevents the press 150 from normally operating to manufacture the product with an intended or satisfactory level of quality. The diagnostic portion 292 has the following five diagnostic functions: (i) load waveform diagnosis; (ii) load distribution diagnosis; (iii) correlation diagnosis; (iv) load variation diagnosis; and (v) ON-line diagnosis. The first four diagnostic functions (i) through (iv) are performed with the load measuring device 100 mounted on the press 150, upon installation or replacement of the die set, for example, prior to the setting of the pressing conditions described above. The last diagnostic function (v) is performed while the press 150 is in operation. These diagnostic functions will be explained.

(i) LOAD WAVEFORM DIAGNOSIS

Figure 40A:
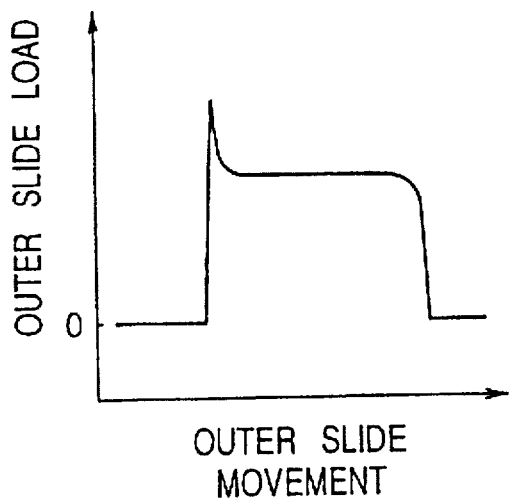
Figure 40B:
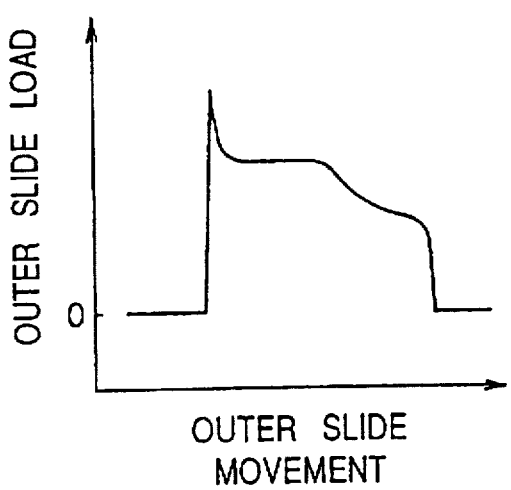
Figure 40C:
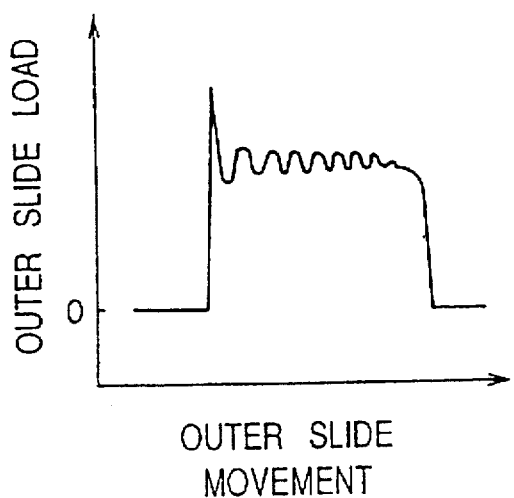
Figure 40D:
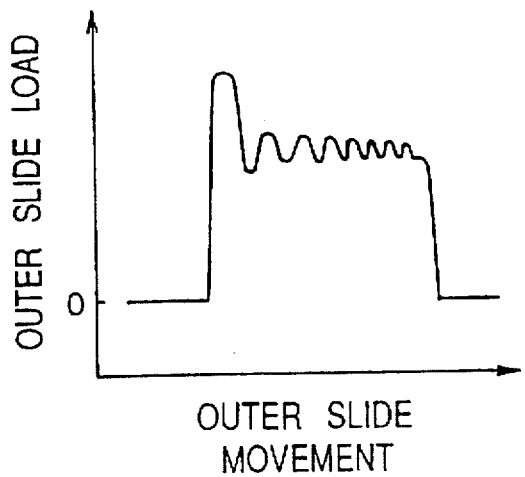

This diagnosis is performed according to a routine similar to that of FIG. 10, by operating an appropriate switch on the operator's control panel 282, after the load measuring apparatus 100 is installed on the press 150. In this diagnostic routine, the press 150 is operated in the inching or normal mode, and the local holding force values Fsi (outer slide load associated with the outer plungers 166) and the local forming force values Ffi (inner slide load associated with the inner plungers 168) are detected by the strain gages 144, 116. Diagnosis is effected based on waveforms of the thus detected load values Fsi, Ffi. FIG. 40(a) shows an example of a reference waveform of the outer slide load, while FIGS. 40(b), 40(c) and 40(d) show examples of waveforms of the actually detected outer slide load. The detected waveform of FIG. 40(b) indicates a leakage of the oil from the oil chamber 186 of the hydro-pneumatic cylinder 184 into the air chamber 188. The detected waveform of FIG. 40(c) indicates a dwell or vibration of the piston of the cylinder 184 due to a relatively large sliding resistance of the piston. The detected waveform of FIG. 40(d) indicates a larger sliding resistance of the piston of the cylinder 184 than in the case of FIG. 40(c). These abnormalities are detected and indicated on the control panel 282 in the diagnostic routine. An increase in the sliding resistance of the piston of the cylinder 184 causes an accordingly increased initial value of the corresponding local holding force Fsi, leading to a possibility of cracking of the product. The measurement of the outer and inner load values (holding and forming force values) may be made by using the outputs of the strain gages 178, 246 attached to the plungers 166, 168, in place of load measuring apparatus 100. In this case, the diagnosis may be done with the die set 152, 156, 162 being installed on the press 150. it is noted that the determination of the presence or absence of any abnormality may be made by checking if the load values at selected points on the detected waveform or an amount of change of the load values is/are held within a predetermined range or ranges of tolerance of such characteristic or characteristics of the reference waveform.

(ii) LOAD DISTRIBUTION DIAGNOSIS

This diagnosis is performed according to a routine similar to that of FIG. 14. in this routine, the four local load values corresponding to the four outer and four inner plungers 166, 168 are obtained when the outer and inner slides 160, 164 are at their lower stroke ends, which are detected by the position sensors 284. The thus obtained waveforms of the local holding and forming force values Fsi, Ffi (local outer and inner slide load values) are compared with respective reference waveforms, to diagnose the press 150 for any abnormality associated with the outer and inner slides 160, 164, such as an abnormal inclination of those slides.

(iii) CORRELATION DIAGNOSIS

This correlation diagnosis is performed with the load measuring apparatus 100 installed on the press 10, according to suitable diagnostic routines as illustrated in the flow charts of FIGS. 41, 44 and 462 by way of example. These routines are started by activating an appropriate diagnostic switch on the operator's control panel 282.

Referring first to the flow chart of FIG. 41, the correlation diagnosis illustrated therein relates to the correlation between the holding force Fs and the relative distance ha. The present Fs-ha correlation diagnostic routine is started with step R1-1 to set the distance ha to a predetermined level. When this step R1-1 is initially implemented, the distance ha is set to the predetermined initial level. As the step is repeatedly implemented, the distance ha is incremented by a predetermined amount, whereby the lower stroke end of the outer outer slide 160 is lowered in steps. Step R1-1 is followed by step R1-2 to start a test pressing cycle, which is performed in the inching mode or normal mode. Then, step R1-3 is implemented to detect the local holding force values Fsi during the test pressing operation on the basis of the outputs of the strain gages 114 provided on the four posts 110 of the apparatus 100, and also detect the hydraulic pressure Pyai (i=1, 2, 3, 4) of the balancing hydraulic cylinders 190, on the basis of the output of the hydraulic pressure sensor 192 during the test pressing operation. Then, the control flow goes to step R1-4 to determine whether the distance ha has been incremented to a predetermined upper limit hamax. Steps R1-1 through R1-4 are repeatedly implemented until an affirmative decision (YES) is obtained in step R1-4, namely, until the distance h has been increased to the upper limit hamax. Thus, the local holding force values Fsi and generated hydraulic pressure values Pyai are detected in relation to different values of the distance ha, that is, as the lower stroke end of the outer slide 160 is lowered. When the affirmative decision (YES) is obtained with the distance ha Pa reaching the upper limit hamax, step R1-4 is followed by step R1-5 to compare the obtained Fsi-ha correlation with a reference correlation that is determined to assure an intended quality of the product, to thereby determine the presence or absence of any abnormality on the press 150.

Solid line in the graph of FIGS. 42(a)–42(d) show examples of the Fsi-ha reference correlation, which are determined by simulation or experiment based on the rigidity of the press 150 and load measuring apparatus 100, volume of the air tank 190, and pressure-receiving areas of the various cylinders. The reference Fsi-ha correlation may be a correlation which was found normal in a previous diagnostic cycle (previous cycle of execution of the routine of FIG. 41). The comparison of the detected Fsi-ha correlation with the reference correlation is effected to determine the presence or absence of an abnormality according to a predetermined rule or reference, for example, by checking if differences between the detected local holding force values Fsi corresponding to selected levels of the pneumatic pressure Pa and the corresponding values Fsi of the reference correlation are within a predetermined range of tolerance. The comparison in step R1-5 may also be effected by checking if the tendency of change of the detected holding force values Fsi (represented by the gradient of the detected Fsi-Pa correlation line or curve indicated in one-dot chain line in FIG. 42 is similar to that of the reference correlation (indicated in solid line), or not. Step R1-5 is followed by step R1-6 to determine if the determination of the presence of any abnormality has been made in the preceding step R1-5 or not. if an affirmative decision (YES) is obtained in step R1-6, the control flow goes to step R1-7 to estimate the cause for the abnormality and the degree of the abnormality. Step R1-8 is then implemented to activate the CRT or liquid crystal display on the panel 282, to indicate the estimated cause for the abnormality, and the estimated degree of the abnormality. The degree of abnormality may be such that the abnormality is serious and requires an immediate repair or adjustment of the press 150, or is not so serious and allows the press 150 to continue the operation with cares being exercised. The cause for abnormality may be an excessively high initial value of the hydraulic pressure Py prior to the pressing cycle, as in the case of the waveform as indicated by one-dot chain line in FIG. 42(a), or an excessively low initial value of the pressure Py, as in the case of the waveform as indicated by two-dot chain line in FIG. 42(a). Alternatively, the cause may be the accumulation of oil in the air chamber 188 of the cylinder 184 and/or the air tank 190, as in the case of the waveform indicated by one-dot chain line in FIG. 42(b), or an air leakage associated with the cylinder 184 and/or air tank 190, as in the case of the waveform indicated by two-dot chain line in FIG. 42(b). Further, the cause may be an excessively high initial value of the pneumatic pressure Pe, as in the case of the waveform indicated by one-dot chain line in FIG. 42(c), or an excessively low initial value of the pressure Pe, as in the case of the waveform indicated by two-dot chain line in FIG. 42(c). These causes for abnormality will adversely affect the local holding force values Fsi during an actual pressing operation, more specifically, deteriorate the changing characteristics of the force values Fsi during reciprocation of the outer slide 160, leading to a possibility of deterioration of the quality of the product manufactured by the press 150. The abnormality of the waveform indicted by one-dot chain line in FIG. 42(c) may be considered to result from an excessively low level of the pneumatic pressure Pd of the balancing pneumatic cylinder 216, while the abnormality of the waveform indicated by two-dot chain line in FIG. 42(c) may be considered to result from an excessively high level of the pneumatic pressure Pd. The possible causes for abnormalities are stored in the ROM of the controller 280, in relation to different degrees of deviation of the detected Fs-ha correlation from the reference correlation, for example.

Where the single servomotor is used to adjust the local distance values ha of the four die-height adjusting mechanisms 172 to the same value, the detected waveform may deviate from the reference waveform, as indicated by one-dot and two-dot chain lines in FIG. 42(d). This deviation, which causes the actual local holding force values Fsi to be larger or smaller than the reference waveform, may arise from an inclination of the outer slide 160.

If a negative decision (NO) is obtained in step R1-6, that is, if no abnormality on the press 10 is found in step R1-5, the control flow goes to step R1-9 to store the obtained Fsi-ha correlation (Fsi=c·ha+d) as the machine information in the machine data memory 310 of the condition setting portion 290 of the controller 280. Since this Fsi-ha correlation varies with the initial level of the pneumatic pressure Pe, the Fsi-ha correlation should be obtained for the specific initial level to which the pneumatic pressure Pc is adjusted prior to an actual pressing operation. The control flow then goes to step R1-10 to store the Fsi-Pyai correlation (obtained in step R1-3) in suitable memory means such as the RAM of the controller 280. The Fsi-Pyai correlation is utilized to monitor the local holding force values Fsi by checking the hydraulic pressure Pyai generated during actual pressing operations on the press 150. The graph of FIG. 43 shows an example of the Fsi-Pyai correlation. The range within which the generated hydraulic pressure Pyai changes in proportion with the local holding force Fsi varies depending upon the initial level of the hydraulic pressure Py. Therefore, if the initial hydraulic pressure Ps is suitably adjusted prior to the actual pressing operation, the Fsi-Pyai correlation should be obtained for the specific initial level to which the pressure Ps is adjusted prior to the actual pressing cycle.

The diagnostic routine of FIG. 41 is a further embodiment of the diagnosing method of this invention, wherein steps R1-1 through R1-4 constitute a further form of the step of detecting a selected characteristic of a load generated at a selected portion of the press during operation of the press. Described more specifically, the selected characteristic of the load is a correlation between the load Fsi and the relative distance ha as a physical value which changes with the load Fs. Further, step R1-5 is a further form of the step of determining the presence or absence of an abnormality on the basis of the detected load.

The Fsi-ha correlation and the Fsi-Pyai correlation may be detected on the basis of the outputs of the strain gages 178 in place of the output of the load measuring apparatus 100. In this case, the diagnosis may be conducted with the die set 152, 156, 162 being installed on the press 150. Further, the Fsi-ha correlation diagnosis may be replaced by a Fs-ha diagnosis wherein the total holding force Fs in relation to the distance ha is diagnosed. The Fsi-Pyai correlation may be obtained independently of the Fsi-ha diagnosis, that is, in a routine different from that of FIG. 41. The determination in step R1-5 does not necessarily require the comparison of the detected Fsi-ha correlation directly with the reference correlation. For instance, the determination may be made by checking if a certain characteristic or characteristics of the detected Fsi-ha correlation, such as a gradient of a given portion of the detected correlation and/or load values Fsi at selected points on the detected correlation is/are held within a predetermined range or ranges of tolerance of such characteristic or characteristics of the reference correlation.

Referring next to the flow chart of FIG. 44, there will be described a diagnosis relating to a correlation between the holding force Fs and the pneumatic pressure Pe. The Fs-Pe diagnostic routine of FIG. 44 is initiated with step R2-1 to to set the initial level of the pneumatic pressure Pe to a predetermined initial value. As this step R2-1 is repeated, the initial level of the pressure Pe is incremented by a predetermined amount for each implementation of the step, until the pressure Pe reaches a predetermined upper limit Pemax which will be described. Step R2-1 is followed by step R2-2 to start a test pressing cycle in the inching or normal mode. Then, step R2-3 is implemented to detect the local holding force values Fsi at the lower stroke end of the outer slide 160, on the basis of the outputs of the strain gages 114 provided on the four posts 110 of the apparatus 100, and also detect the corresponding pneumatic pressure values Peai (i=1, 2, 3, 4) generated at that time, on the basis of the output of the pneumatic pressure sensor 202. Step R2-3 is followed by step R2-4 to determine whether the initial pneumatic pressure Pe has been raised to the predetermined upper limit Pemax or not. Thus, the local holding force values Fsi and generated pneumatic pressure values Peai are detected by repeated implementation of steps R2-1 through R2-4 until the pressure Pe is raised to the upper limit Pemax, in other words, until an affirmative decision (YES) is obtained in step R2-4. When the predetermined upper limit Pemax is reached, step R2-5 is implemented to determine the presence or absence of any abnormality on the press 150, by comparing the detected Fsi-Peai correlation with a reference correlation that assures the intended quality of the product.

Solid line in FIG. 45 represents an example of the reference Fsi-Peai correlation, which is determined by simulation or experiment based on the rigidity of the press 150 and load measuring apparatus 100, volume of the air tank 190 and pressure-receiving areas of the various cylinders. The reference Fsi-Peai correlation may be a correlation which was found normal in a previous cycle of execution of the routine of FIG. 44. The comparison in step R2-5 is effected to determine the presence or absence of an abnormality according to a predetermined rule or reference, for example, by checking if differences between the holding force values Fsi detected at the different levels of the pneumatic pressure Peai and the corresponding values of the reference correlation are held within a predetermined range of tolerance or not, or alternatively by checking if the gradient of the detected Fsi-Peai correlation (namely, rate of change of the detected value Fsi with the value Peai) is similar to that of the reference correlation or not. Then, step R2-6 is implemented to check if the determination of the presence of any abnormality has been made in step R2-5 or not. If an affirmative decision (YES) is obtained in step R2-6, the control flow goes to step R2-7 to estimate the cause for the detected abnormality, and the degree of the abnormality. Step R2-8 is then performed to indicate on the operator's control panel 282 the estimated cause for the abnormality and the estimated degree of the abnormality. The degree of the abnormality has been explained above with respect to the routine of FIG. 41. The cause for the abnormality may be an excessively large sliding resistance of the piston of the cylinder 184, which causes excessively high local holding force values Fsi over the entire range of the generated pneumatic pressure Peai, as indicated by one-dot chain line in FIG. 45. In this case of abnormality, the changing characteristic of the local holding force values Fsi during reciprocation of the outer slide 160 in an actual pressing cycle is not suitable or desirable for assuring the intended quality of the product.

If no abnormality is found in step R2-5, a negative decision (NO) is obtained in step R2-6, and the control goes to step R2-9 to store the pressure-receiving area Az in the machine data memory 310 of the condition setting portion 292 of the controller 280. The pressure-receiving area Az is represented by a gradient ΔFsi/ΔPeai of the Fsi-Peai correlation detected in step R2-3. Then, step R2-10 is implemented to store the Fsi-Peai correlation in suitable memory means such as the RAM of the controller 280. The stored Fsi-Peai correlation is used to monitor the local holding force values Fsi on the basis of the generated pneumatic pressure Peai during the actual pressing operation on the press 150.

The diagnostic routine of FIG. 44 is a still further embodiment of the diagnosing method of this invention, wherein steps R2-1 through R2-4 constitute a still further form of the step of detecting a selected characteristic of a load generated at a selected portion of the press during operation of the press. Explained more specifically, the selected characteristic of the load is a correlation between the load Fsi and the pneumatic pressure Peai as a physical value which changes with the load Fs. Further, step R2-5 is a still further form of the step of determining the presence or absence of an abnormality on the basis of the detected load.

The Fsi-Peai correlation may be obtained by using the outputs of the strain gages 178 in place of the output of the load measuring apparatus 100. In this case, the diagnosis may be effected with the die set 152, 156, 162 being installed on the press 150. The comparison in step R2-5 may be made based a predetermined range of tolerance of the gradient of a selected portion of the detected Fsi-Peai correlation or selected values Fsi of the detected correlation as compared with that or those of the reference correlation.

Reference is now made to the flow chart of FIG. 46, which illustrates a diagnostic routine relating to a correlation between the forming force Ff and the relative distance hb indicated explained above. This Ff-hb correlation diagnostic routine is initiated with step R3-1 to operate each of the four die-height adjusting mechanisms 240, to thereby set the corresponding relative distance hb to a predetermined initial value. As this step R3-1 is repeatedly implemented, the distance hb is incremented by a predetermined amount until the distance hb reaches a predetermined upper limit hbmax as described below. As the distance hb is incremented, the lower stroke end of the inner slide 164 is lowered. Step R3-1 is followed by step R3-2 to start a test pressing cycle in the inching or normal mode. Then, the control flow goes to step R3-3 to detect the local values Ffi of the forming force Fp corresponding to the four sensing elements 112, on the basis of the outputs of the strain gages 116 when the inner slide 164 is located at the lower stroke end set in step R3-1. Further, the local values Pzai (i=1, 2, 3, 4) of the hydraulic pressure Pm of the four hydraulic cylinders 248 generated at the lower stroke end of the inner slide 164 are detected based on the output of the hydraulic pressure sensor 249. Steps R3-3 is followed by step R3-4 to determine whether the distance hb has reached the predetermined upper limit hbmax or not. Steps R3-1 through R3-4 are repeatedly implemented until the upper limit hbmax is reached. Thus, the local forming force values Fpi and local hydraulic pressure values Pzai are detected as the distance hb is increased. When the upper limit hbmax is reached, an affirmative decision (YES) is obtained in step R3-4, the control flow goes to step R3-5 to determine the presence or absence of any abnormality on the press 150, by comparing the detected Ffi-hb correlation with a reference correlation determined to assure the intended quality of the product.

Solid line in FIG. 47 shows an example of the reference Ffi-hb correlation which is determined by simulation or experiment based on the rigidity values of the press 110 and apparatus 100, modulus K of elasticity of volume of the working fluid in the hydraulic cylinders 248, etc. The reference Ffi-hb correlation may be a correlation which was found normal in a previous diagnostic cycle of FIG. 46. The determination or comparison in step R3-5 is effected according to a predetermined rule or reference, for example, by checking if differences of the detected local forming force values Fpi at respective local distance values hb with respect to those of the reference correlation are held within a predetermined range of tolerance, or by checking if the tendency of change of the detected forming force values Ffi in relation to the distance hb, or the gradient of the detected Ffi-hb correlation is similar to that of the reference correlation. Then, step R3-6 is implemented to determine whether the determination of any abnormality has been made in step R3-5 or not. If an affirmative decision (YES) is obtained in step R3-6, the control flow goes to step R3-7 to estimate the cause for the abnormality and the degree of the abnormality, and step R3-8 to indicate the estimated cause for and degree of the abnormality, on the operator's control panel 282. The degree of the abnormality has been explained above with respect to the preceding embodiments. The cause for the abnormality may be an excessively high initial value of the hydraulic pressure Pz, which causes an excessively high rate of increase of the forming force Ffi with an increase of the distance hb, as indicated by one-dot chain line in FIG. 47. Alternatively, the cause for the abnormality may be an excessively low initial value of the hydraulic pressure Pz, which causes an excessively low value of the forming force Ffi. In these cases, a change of the forming force Ffi during an actual pressing cycle is not desirable for assuring the intended quality of the product. In the case where a single servomotor is used to operate the four die-height adjusting mechanisms 240 to adjust the corresponding local relative distances hb, the detected Ffi-hb correlation may deviate from the reference correlation, that is, the line representative of the detected Ffi-hb correlation may be shifted with respect to that of the reference correlation, as indicated by dashed line in FIG. 47, so that the forming force Ffi is smaller or larger than the reference or desired value. Accordingly, the Ffi-hb correlation diagnosis may be effected by checking the deviation or shift of the detected correlation with respect to the reference correlation.

If any abnormality has not been found in step R3-5, a negative decision (NO) is obtained in step R3-6, and the control flow goes to step R3-9 to store the detected Ffi-hb correlation (Ffi=e·hb) as the machine information in the machine data memory 310 of the condition setting portion 292 of the controller 280. Step R3-9 is followed by step R3-10 to store the Ffi-Pzai correlation detected in step R3-3, in a suitable memory such as the RAM of the controller 280. The stored Ffi-Pzai correlation is used to monitor the forming force Ffi on the basis of the generated hydraulic pressure Pzai during an actual pressing operation. FIG. 48 shows an example of the Ffi-Pzai correlation. Since the range within which the generated hydraulic pressure Pzai changes in proportion to the forming force values Ffi varies depending upon the initial value of the hydraulic pressure Pz, the Ffi-Pzai correlation should be obtained for the specific initial value of the hydraulic pressure Pz, if the initial value of the pressure Pz is adjusted prior to an actual pressing cycle.

The diagnostic routine of FIG. 46 is still another embodiment of the diagnosing method of this invention, wherein steps R3-1 through R3-4 constitute still another form of the step of detecting a selected characteristic of a load generated at a selected portion of the press during operation of the press. Described more particularly, the selected characteristic of the load is a correlation between the load Ffi and the relative distance hb as a physical value which changes with the load Ffi. Further, step R3-5 is still another form of the step of determining the presence or absence of an abnormality on the basis of the detected load.

The Ffi-hb correlation and the Ffi-Pzai correlation may be detected using the outputs of the strain gages 246 rather than the output of the load measuring apparatus 100. In this case, the Ffi-hb correlation diagnosis may be achieved with the die set 152, 156, 162 installed on the press 150, it is possible that the diagnosis is effected based on the correlation between the total holding force Ff and the distance hb. The Ffi-Pzai correlation may be obtained independently of the Ff-hb correlation diagnosis, that is, in a routine different from that of FIG. 46. The Ffi-hb correlation diagnosis may be effected based a predetermined range of tolerance of the gradient of a selected portion of the detected Ffi-hb correlation or selected Ffi values of the detected correlation as compared with that or those of the reference correlation.

(iv) LOAD VARIATION DIAGNOSIS

This load variation diagnosis is formulated to check the press 110 for operating stability during a continuous production run in a relatively large lot size, and is performed with the load measuring apparatus 100 installed on the press 150, according to a routine similar to that illustrated in the flow chart of FIG. 25. In the load variation diagnostic routine, the local holding force values, total holding force Fs, local forming force values Ffi and total forming force Ff are detected by the strain gages 114, 116. The patterns of the detected load values Fsi, Fs, Ffi, Ff are compared with predetermined respective reference patterns, to determine the presence or absence of any abnormality on the press 150. The detection of the load values may be accomplished on the basis of the outputs of the strain gages 178, 246, in place of the output of the load measuring apparatus 100. In this case, the diagnosis may be effected with the die set 152, 156, 162 being installed on the press 150.

(v) ON-LINE DIAGNOSIS

The ON-line diagnosis is for monitoring the local holding and forming force values Fsi and Ffi on the press 150 during an actual pressing operation. Examples of monitoring routines for this purpose are illustrated in the flow charts of FIGS. 49 through 51, which are executed for each pressing cycle or at a predetermined interval (after a predetermined number of pressing cycles). The routine of FIG. 49 is formulated to monitor the local holding force values Fsi, and is started with step R4-1 to read in the Fsi-Pyai correlation of FIG. 43 which corresponds to the initially adjusted value of the hydraulic pressure Py. Step R4-1 is followed by step R4-2 to detect the local hydraulic pressure values Pyai during the pressing operation, on the basis of the output of the hydraulic pressure sensor 192. Then, step R4-3 is performed to calculate the local holding force values Fsi corresponding to the detected generated local hydraulic pressure values Pyai, on the basis of the Fsi-Pyai correlation which has been read in step R4-1. The control flow then goes to step R4-4 to read in the optimum local holding force values Fsoi from the die data memory 312, compare the calculated local holding force values Fsi with the optimum values Fsoi, and determine the presence or absence of any abnormality on the press 150, depending upon whether a difference between the values Fsi and Fsoi is within a predetermined range of tolerance or not. The degree of an abnormality if it is detected is also estimated in step R4-4. Then, step R4-5 is implemented to activate the operator's control panel 282, to indicate the result of the determination in step R4-4, together with the degree of an abnormality if detected in step R4-4. Step R4-4 may be formulated to also estimate the cause for an abnormality if its presence is determined. The monitoring routine of FIG. FIG. 49 may be modified to automatically adjust the distance ha (local distances ha corresponding to the four outer plungers 166), and also the hydraulic pressure Py, etc., if possible, so that the actual local holding force values Fsi become closer to or coincide with the optimum values Fsoi.

The monitoring routine of FIG. 49 is a further embodiment of the diagnostic method of the present invention, wherein step R4-2 is a further form of the step of detecting a pressure of a working fluid in a cylinder disposed in a path of transmission of a load generated at a selected portion of the press during operation of the press. Further, step R1-10 of FIG. 41 to store the Fsi-Pyai correlation in the RAM of the controller 280 is another form of the step of storing a correlation between the load and the pressure of the working fluid. Step R4-4 is another form of the step of determining the presence or absence of an abnormality on the basis of the detected pressure of the fluid and the correlation. The optimum local holding force values Fsoi correspond to a predetermined reference used in the determining step.

The routine of FIG. 49 may be modified to monitor the total holding force Fs which is a sum of the four local holding force values Fsi.

The monitoring routine of FIG. 50, which is formulated to monitor the local holding force values Fsi, is initiated with step R5-1 to read in the Fsi-Peai correlation of FIG. 45. Step R5-1 is followed by step R5-2 to detect the local pneumatic pressure values Peai generated during the pressing operation, on the basis of the output of the hydraulic pressure sensor 202. Then, step R5-3 is performed to calculate the local holding force values Fsi corresponding to the detected generated pneumatic pressure values Peai, on the basis of the Fsi-Peai correlation which has been read in step R5-1. The control flow then goes to step R5-4 to read in the optimum local holding force values Fsoi from the die data memory 312, compare the calculated local holding force values Fsi with the optimum values Fsoi, and thereby determine the presence or absence of any abnormality on the press 150. Step R5-4 is followed by step R5-5 to indicate the presence or absence of any abnormality on the panel 282. The routine of FIG. 50 may be modified to monitor the total holding force Fs which is a sum of the local holding force values Fsi.

The monitoring routine of FIG. 50 is a yet further embodiment of the diagnostic method of the present invention, wherein step R5-2 is a further form of the step of detecting a pressure of a working fluid in a cylinder disposed in a path of transmission of a load generated at a selected portion of the press during operation of the press. Further, step R2-10 of FIG. 44 to store the Fsi-Peai correlation in the RAM of the controller 280 is another form of the step of storing a correlation between the load and the pressure of the working fluid. Step R5-4 is another form of the step of determining the presence or absence of an abnormality on the basis of the detected pressure of the fluid and the correlation.

The monitoring routine of FIG. 51, which is formulated to monitor the local forming force values Ffi, is initiated with step R6-1 to read in the Ffi-Pzai correlation of FIG. 48 which corresponds to the initially adjusted value of the hydraulic pressure Pz. Step R6-1 is followed by step R6-2 to detect the local hydraulic pressure values Pzai generated during the pressing operation, on the basis of the output of the pneumatic pressure sensor 50. Then, step R6-3 is then performed to calculate the local forming force values Ffi corresponding to the detected generated hydraulic pressure values Pzai, on the basis of the Ffi-Pzai correlation which has been read in step R6-1. The control flow then goes to step R6-4 to read in the optimum forming force values Ffoi from the die data memory 312, compare the calculated local forming force values Ffi with the optimum values Ffoi, and determine the presence or absence of any abnormality on the press 150 by checking if a difference between the calculated and optimum values Ffi and Ffoi is within a predetermined range of tolerance. The degree of abnormality if detected is estimated also in step R6-4. Then, step R6-5 is implemented to activate the operator's control panel 282, to indicate the result of the determination in step R6-4, and the estimated degree of an abnormality if detected in step R6-4. The routine of FIG. 51 may be modified to estimate and indicate the cause for an abnormality, or to automatically adjust, for example, the distance hb, and the hydraulic pressure Pz if possible, so that the optimum local forming force values Ffoi are established.

The monitoring routine of FIG. 51 is another embodiment of the diagnostic method of the present invention, wherein step R6-2 is a further form of the step of detecting a pressure of a working fluid in a cylinder disposed in a path of transmission of a load generated at a selected portion of the press during operation of the press. Further, step R3-10 of FIG. 46 to store the Ffi-Pzai correlation in the RAM of the controller 280 is another form of the step of storing a correlation between the load and the pressure of the working fluid. Step R6-4 is another form of the step of determining the presence or absence of an abnormality on the basis of the detected pressure of the fluid and the correlation. The optimum local forming force values Ffoi correspond to the predetermined reference used in the determining step.

The routine of FIG. 51 may be modified to monitor the total forming force Ff which is a sum of the four local forming force values Ffi.

While the ON-line diagnostic routines for the double-action press 150 have been described above with respect to the specific parameters, by way of example, the ON-line diagnosis on the press 150 is also applicable to the monitoring of the other parameters, such as the pneumatic pressure values Pd, Pe, Pf, Pg and hydraulic pressure values Py, Pz prior to or during a pressing cycle, to diagnose the associated portions of the press. Further, the ON-line diagnosis is equally applicable to the monitoring of the local holding and forming force values Fsi, Ffi on the basis of the outputs of the strain gages 178, 246.

As described above, the press 150 has various diagnostic functions such as the load waveform diagnosis, load distribution diagnosis, correlation diagnosis and load variation diagnosis, which are effected by using the load measuring apparatus 100, to find out any abnormality or defect on the press 150, by diagnosing the press for adequacy of various operating parameters or conditions that assure the intended quality of the product. These diagnostic functions permit easy inspection of the press 150 for abnormality without disassembling thereof, and eliminate an unnecessary repair or adjustment of the die set, which is conventionally required in the presence of any abnormality associated with the press 150. Further, the press 150 is adapted to estimate the cause for a detected abnormality, and indicate the estimated cause, together with the presence of the abnormality, on the operator's control panel 282, thereby facilitating the repair or adjustment procedure of the press 150 to remove the detected abnormality.

Further, the diagnostic routines are formulated to store in a suitable memory the Fsi-Pyai correlation, Fsi-Peai correlation and Ffi-Pzai correlation, which are used in the ON-line diagnosis executed during an actual pressing operation, to monitor the local blank holding force values Fsi and the local forming force values Ffi on the basis of the detected hydraulic pressures Pyai, Pzai and pneumatic pressure Peai, and according to the stored correlations. Accordingly, deterioration or chronological change of the various portions of the press 150 which cause undesirable changes of the related load values may be detected in an early stage of production of an article manufactured by the press. In other words, abnormality due to such deterioration or chronological change of the press that leads to lowered quality of the product can be found without a large number of unacceptable products.

Referring to FIG. 52, there is shown the press 10 of FIG. 1 as equipped with the load measuring apparatus 100 having distance sensors 342 which cooperate with respective sensing pins 340 to detect travel or displacement distances Xsi of the pistons of the balancing hydraulic cylinders 32, so that the press 10 is diagnosed on the basis of the detected travel distances Xsi of the pistons of the cylinders 32 during an actual pressing operation. The distance sensors 342 are attached to the lower surface of the measuring member 106, such that the distance sensors 342 are aligned with the corresponding sensing pins 340, which are supported by monitoring hydraulic cylinders 32a that are identical in construction with the hydraulic cylinders 32 used for the pressing operation. The monitoring hydraulic cylinders 32a are disposed adjacent to selected ones of the multiple hydraulic cylinders 32. For example, four monitoring hydraulic cylinders 32a are provided corresponding to the selected four hydraulic cylinders 32, and the corresponding four sensing pins 340 are installed on the press 150 upon installation of the load measuring apparatus 100. The distance sensors 342 are non-contact type optical sensors opposed to the upper end faces of the respective sensing pins 340, and are adapted to measure local distances Dsi to the upper end faces of the corresponding sensing pins 340, for thereby detecting the displacement or travel distances Xsi of the pistons of the corresponding hydraulic cylinders 32 during the pressing operation. The length of the monitoring pins 340 is determined so that the distance Dsi between the pins 340 and the sensors 342 when the press 10 is at rest or when the pistons of the monitoring cylinders 32a (cylinders 32) are at their upper stroke ends is considerably greater than the expected displacement distance Xsi of the pistons of the cylinders 32 during the pressing operation. The cushion pins 24 which are not opposed to the sensing pins 104 of the apparatus 100 may be used as the monitoring pins 340.

The distances Dsi for detecting the displacement distances Xsi may be replaced by distances between the sensors 342 and the hydraulic cylinders 32 or the corresponding portions of the cushion platen 28. In this case, the monitoring cylinders 32a and the sensing pins 340 may be eliminated.

FIG. 53 shows an example of a diagnostic routine for diagnosing the press 10 on the basis of the displacement distances Xsi of the pistons of the balancing hydraulic cylinders 32. The routine is commenced with step Qi-1 to start a test pressing cycle. step Q1-1 is followed by step Q1-2 to measure the local distance values Dsi by the distance sensors 342, and the load values of the corresponding cushion pins 24 by the strain gages 118 on the sensing pins 104 of the apparatus 100. Then, step Q1-3 is implemented to obtain the displacement distance values Xsi of the pistons of the cylinders 32. The distance Dsi changes during a pressing cycle (in which the slide plate 20 is reciprocated between the upper and lower stroke ends), as shown in the graph of FIG. 54 by way of example. The amount of change of the distance Dsi is substantially equal to the displacement distance Xsi of the piston of the corresponding hydraulic cylinder 32. However, if there is a clearance between the lower end of the cushion pin 24 and the corresponding sensing pin 114 of the measuring member 106 of the apparatus 100, the measured distance Dsi is larger than the displacement distance Xsi by an amount corresponding to the clearance. In view of this fact, the amount of change of the distance Dsi after point of time Spo is determined as the displacement distance Xsi. The point of time Spo is a point at which the load value detected by each strain gage 118 begins to increase, with the sensing sensing pins 104 in abutting contact with the corresponding cushion pin 24. The local displacement distance Xsi is obtained for each of the monitoring cylinders 32a (sensing pins 340 or distance sensors 342). Then, the control flow goes to step Q1-4 to obtain a normal distribution of the piston displacement distance values of all the hydraulic cylinders 32, on the basis of the obtained displacement distance values Xsi of the monitoring cylinders 32a. Described more specifically, the obtained displacement distance values Xsi of the monitoring cylinders 32a are processed according to a probability theory used for a sampling test, to obtain the normal distribution in the form of a relationship between the piston displacement distance values of the cylinders 32 and the number of the cylinders 32, which relationship is illustrated in the graph of FIG. 55. Step Q1-5 is then implemented to determine the presence or absence of any abnormality on the press 150, by checking whether a variation width W of the obtained normal distribution is larger or smaller than a threshold value Wo.

If the variation width W of the displacement distance Xsi is larger than the threshold value Wo, this means that it is difficult or impossible to establish even distribution of the load (blank holding force Fs) on the cushion pins 24, and the press 150 is less likely to assure the intended quality of the product. The threshold value Wo is determined in view of the maximum travel or displacement distance of the hydraulic cylinders 32, so that even distribution of the load on the cushion pins 24 can be relatively easily established. The variation in the piston displacement distances of the cylinders 32 may arise from a relatively large variation in the length of the cushion pins 24, and a relatively large angle of inclination of the cushion platen 28 or slide plate 20 relative to the reference plane. The angle of inclination of the cushion platen 28 or slide plate 20 and the direction of the inclination may be measured or detected by a level gage placed on the measuring member 106 or cushion platen 28. In the example of FIG. 52, a level gage 344 is placed on the measuring member 106 to detect the straightness of the slide plate 20 or its parallelism with the reference horizontal plane. Further, the variation in the length of the cushion pins 24 may be exactly obtained from the piston displacement distance values Xsi of the monitoring cylinders 32a.

The displacement distance Xsi reflects the overall condition of the press 10, such as length variation of the cushion pins 24, parallelism error of the cushion platen 28 and slide plate 20, height variation of the projections on the underside of the pressure ring 30 for abutting contact with the cushion pins 24, and height variation of the balancing hydraulic cylinders 32 as installed on the cushion platen 28. Accordingly, the product has the intended quality if the variation width W of-the displacement distance Xsi is smaller than the threshold value Wo, even if the parallelism error of the cushion platen 28 or slide pate 20 is larger than a predetermined upper limit. In other words, even if the parallelism of the cushion platen 28 or slide plate 20 satisfies the required standard, the holding force Fs may not be evenly distributed to the cushion pins 24, if the variation width W of the displacement distance Xsi is larger than the threshold value Wo due to the length of the cushion pins 24, for instance.

The diagnostic routine of FIG. 53 is still another embodiment of this invention, wherein steps Q1-2 and Q1-3 constitute one form of a step of detecting an amount of displacement of a selected portion of the press when the press is operated. Further, step Q1-5 is one form of a step of determining the presence or absence of an abnormality on the basis of the detected amount of displacement of the selected portion of the press, and according to a predetermined reference. The reference value Wo corresponds to the predetermined reference used in the determining step.

The diagnosis illustrated in FIG. 53 may be modified as needed. For example, the determination of the presence or absence of an abnormality may be effected according to a different rule or reference, for example, by checking if the piston displacement distance value at a selected point on the normal distribution curve, for instance, the displacement distance value corresponding to the maximum number of the cylinders 32 (i.e., the peak value of the curve) is held within a predetermined range of tolerance provided as a reference. The diagnosis may be effected without obtaining the normal distribution as illustrated in FIG. 54, for instance, on the basis of a difference between the maximum and minimum piston displacement distance values Xsi of the monitoring cylinders 32a, or an average of the values Xsi. For improved accuracy of diagnosis of the press 10 for even distribution of the load or blank holding force Fs on the cushion pins 24, it is desirable to use a sufficiently large number of monitoring cylinders 32a or sensing pins 340, so that the diagnosis may depend on a large number of the values Xsi.

Reference is now made to the flow chart of FIG. 56, there is illustrated another example of a diagnosis based on the piston displacement distance values Xsi. This routine is initiated with step Q2-1 to set the pneumatic pressure Pa to a predetermined initial value. As this step Q2-1 is repeated, the pneumatic pressure Pa is incremented by a predetermined amount. Step Q2-1 is followed by step Q2-2 to start a test pressing cycle on the press 10 in the inching mode. Then, steps Q2-3 and Q2-4 similar to the steps Q1-2 and Q1-3 of FIG. 53 are performed to obtain the piston displacement distance values Xsi of the monitoring cylinders 32a, and then step Q2-5 is implemented to calculate an average Xsav of the obtained values Xsi. The control flow then goes to step Q2-6 to determine whether the pneumatic pressure Pa has been raised to a predetermined upper limit Pamax or not. Steps Q2-1 through Q2-6 are repeatedly implemented until the pressure Pa has been raised to the upper limit Pamax, whereby several average values Xav are obtained until the upper limit Pamax has been reached. When an affirmative decision (YES) is obtained in step Q2-6, step Q2-7 is implemented to determine the presence or absence of any abnormality on the press 10, by comparing the detected Xsav-Pa correlation with a reference correlation.

Solid line in FIG. 57 represents an example of the reference Xsav-Pa correlation, which is predetermined by simulation or experiment based on the pressure-receiving areas Aa and As of the pneumatic and hydraulic cylinders 42, 32, weight Wa of the cushion platen 28, number n of the cushion pins 24, modulus K of elasticity of volume of the hydraulic working fluid for the cylinders 32, etc. The reference Xsav-Pa correlation may be a correlation which was found normal in a previous cycle of the routine of FIG. 56. The determination in step Q2-7 is effected according to a predetermined rule or reference, for example, by checking if differences between the detected average values Xsav at different levels of the pneumatic pressure Pa and the corresponding values of the reference correlation are held within a predetermined range of tolerance or not. Alternatively, the determination in step Q2-7 may be done by checking if a tendency of change of the detected average value Xsav with the pneumatic pressure Pa is similar to that of the reference Xsav-Pa correlation. If any abnormality is found in step Q2-7, possible cause for the abnormality is estimated in the same step. The cause may be an excessively large amount of air in the oil in the hydraulic cylinders 32, which causes an excessively high rate of increase of the average value Xsav, as indicated by one-dot chain line in FIG. 57. In this case, the blank holding force Fs in an initial blank holding period may be insufficient, or may increase non-linearly along a bent line due to the spring action of the air trapped in the oil, with a result of deterioration of the quality of the product.

The diagnostic routine of FIG. 56 is still another embodiment of the diagnostic method of the present invention, wherein steps Q2-1 through Q2-6 constitute another form of the step of detecting an amount of displacement of a selected portion of the press during operation of the press. Described more specifically, the Xsav-Pa correlation is used as a selected characteristic of the displacement of the selected portion of the press. Further, step Q2-7 is another form of a step of determining the presence or absence of an abnormality on the basis of the detected amount of displacement of the selected portion of the press, and according to a predetermined reference. The reference value Wo corresponds to the predetermined reference used in the determining step.

While the reference Xsav-Pa correlation is used in the routine of FIG. 56 to determine the presence or absence of any abnormality based on the piston displacement distance values of the balancing hydraulic cylinders 32, the rate of increase of the detected average value Xsav with an increase in the pneumatic pressure Pa may be checked against a predetermined range of tolerance provided as a reference. It is also possible to obtain the Xsav-Pa correlation by measuring the distance Dsi as the pneumatic pressure Pa is raised to the upper limit Pamax, and the Xav-Pa correlation as the pressure Pa is lowered from the upper limit Pamax, while the slide plate 20 is held at its lower stroke end. If the characteristics of these two correlations are substantially identical with each other, it is considered that no abnormality is present. If the two correlations do not have substantially identical characteristics, it indicates a possibility of any abnormality, such as an oil leakage associated with the hydraulic circuit including the hydraulic cylinders 32. This hydraulic circuit may also be diagnosed for the oil leakage, by detecting a variation in the average value Xsav of the piston displacement distance values Xsi of the cylinders 32 while the slide plate 20 is held at its lower stroke end for a given length of time with the pneumatic pressure Pa adjusted to a predetermined level. One-dot chain line in FIG. 58 indicates an example of the variation in the average value Xsav with time, which is compared with a reference indicated by solid line in FIG. 58, to determine whether the average value Xsav is excessively lowered with respect to the reference. The diagnosis may be made by checking whether the amount of change of the average value Xsav during the sampling period is held within a predetermined range of tolerance provided as a reference. The diagnosis of the hydraulic circuit leakage may also be achieved by using an average of the distance values Dsi of the sensing pins 340 (detected by the distance sensors 342) in place of the average Xsav of the piston displacement distance values Xsi of the monitoring cylinders 32a.

A diagnosis on the basis of the displacement distance values of some hydraulic cylinders is equally applicable to the double-action press 150 of FIGS. 31–33. For instance, the press 150 is provided with suitable optical or magnetic sensors for detecting piston displacement distance values Xei of the hydro-pneumatic cylinders 184 of FIG. 32, so that a diagnosis is performed on the basis of the detected values Xei, according to a routine as illustrated in the flow chart of FIG. 59, by way of example. The routine is initiated with step Q3-1 to start a test pressing cycle on the press 150. In the next step Q3-2, the displacement distance values Xei are detected by the sensors. FIG. 60 shows an example of a pattern of the detected piston displacement distance values Xei of the four cylinders 184. Step Q3-2 is followed by step Q3-3 to determine the presence or absence of any abnormality, based on the piston displacement distance values Xei of the four cylinders 184 at a selected point of time. For example, the determination is effected by checking if an amount of difference or variation of the maximum piston displacement distance values Xei of the four cylinders 184 is held within a predetermined range of tolerance provided as a reference. The difference of the values Xei indicates an excessive amount of error of the parallelism between the outer slide 160 and the bolster 154, which causes uneven distribution of the local holding force values Fsi, leading to deterioration of the quality of the product. The diagnosis according to the routine of FIG. 59 may be effected on line, namely, during a production run of the press 150.

The diagnostic routine of FIG. 59 is a still further embodiment of the diagnostic method of the present invention, wherein step Q3-2 is a further form of the step of detecting an amount of displacement of a selected portion of the press, while step Q3-3 is a further form of the step of determining the presence or absence of an abnormality on the basis of the detected amount of displacement of the selected portion of the press.

The diagnosis may be based on a selected changing characteristic of the displacement distance value Xei of FIG. 60, such as a rate of change of the value Xei. If the value Xei is held zero irrespective of the movement of the outer slide 160, this means an abnormality that the blank holding force Fs is not produced by the pneumatic pressure Pe against which the piston of the hydro-pneumatic cylinder 184 is retracted toward the air chamber 188.

Referring next to FIG. 61, there is illustrated a press 362 wherein a lower die 354 is placed on a die plate 352 secured to a press bed 350, while an upper die 360 is fixed to a die plate 358 carried by a slide plate 356. A pressing operation is performed by the lower and upper dies 354, 360 as the slide plate 356 is vertically reciprocated by slide driving means not shown. A distance sensor 364 such as an optical sensor is disposed on the die plate 352, to detect a distance Dd to the die plate 358. The press 362 is diagnosed based on the detected distance Dd, according to a routine illustrated in FIG. 62 by way of example. The routine is initiated with step Q4-1 to start a test pressing cycle on the press 362. Step Q4-1 is followed by step Q4-2 to detect a minimum distance Ddmin between the distance sensor 364 and the die plate 358 when the slide plate 356 is located at its lower stroke end. Since the die assembly consisting of the lower and upper dies 354, 360 is subject to elastic deformation due to a pressing load when the slide plate 356 is at its lower stroke end, the minimum distance Ddmin corresponds to the amount of deformation of the die assembly 354, 360, that is, the pressing load acting on the dies. The control flow then goes to step Q4-3 to determine the presence or absence of any abnormality, by checking if the detected minimum distance Ddmin is held within a predetermined optimum range or not. The optimum range provided as a reference is predetermined by experiment, so that the product has an intended level of quality if the value Ddmin is within the optimum range. The present diagnosis may be made on line, that is, during a production run of the press 362.

The diagnostic routine of FIG. 62 is a yet further embodiment of the diagnostic method of this invention, wherein step Q4-2 is a further form of the step of detecting an amount of displacement of a selected portion of the press, while step Q4-3 is a further form of the step of determining the presence or absence of an abnormality on the basis of the detected amount of displacement of the selected portion of the press.

A diagnosis similar to that of FIG. 62 is also applicable to the press 10 or 150.

Referring to FIG. 63, there is shown the press 10 of FIG. 1 which is adapted to effect a diagnosis in the basis of dimensions d1, d2, d3, d4 and d5 of respective portions of the press as indicated in the figure. More specifically described, the diagnostic routine includes a step of measuring the following dimensions, for each of the cushion pins 24 used in an actual pressing operation: initial distance d1 between the bolster 14 and the slide plate 20; height d2 of the projections formed on the lower surface of the pressure ring 30, for abutting contact with the cushion pins 24; length d3 of the cushion pins 24; initial height d4 of the pistons of the hydraulic cylinders 32 as measured from the upper surface of the cushion platen 28; and distance d5 between the upper surfaces of the bed 16 and cushion platen 38. It will be understood that the piston displacement or travel distance of each hydraulic cylinder 32 in the downward direction increases with an increase in the dimensions d2, d3 and d4 as compared with their nominal values, and decreases with an increase in the dimensions d1 and d5 as compared with their nominal values. Therefore, the displacement distance of the cylinder 32 increases with an increase in a dimension dto=d2+d3+d4−d1−d5. The diagnostic routine further includes a step of calculating this dimension dto from the measured dimensions d1 through d5, a step of obtaining the amount of variation of the local dimensions dto associated with all the cushion pins 24, and a step of determining the presence or absence of an abnormality by checking if the amount of variation of the local dimensions dto is smaller or larger than a predetermined threshold. The distance d1 is measured with the bolster 14 placed in position on the press bed 16, and the height d2 and the length d3 can be measured by a suitable instrument such as a height gage, with the pressure ring 30 and cushion pins 24 placed on a reference plane such as a surface plate. The height d4 can be measured by a height gage or other suitable instrument, with the pistons of the cylinders 32 placed in the initial operating position on the cushion platen 28. The distance d5 can be measured by a height gage or other suitable instrument, with the cushion platen 28 held in its upper stroke end. A variation of the local distances d1 represents a parallelism error of the slide plate 20, while a variation in the local dimensions d2 represents a height variation of the projections of the pressure ring 30 corresponding to the cushion pins 24. A variation of the local dimensions d3 represents a length variation of the cushion pins 24, while a variation of the local dimensions d4 represents a height variation of the pistons of the cylinders 32. A variation of the local dimensions d5 represents a parallelism error of the cushion platen 28. The present diagnostic routine is substantially similar to the routine of FIG. 52, and the threshold value for the dimension dto=d2+d3+d4−d1−d5 has substantially the same meaning as the threshold value Wo.

Referring next to FIG. 64, there is shown the press 10 of FIG. 1 as equipped with a three-dimensional accelerometer 370 on the slide plate 20. The press 10 is diagnosed for any abnormality, during a production line, for instance, on the basis of the distance, velocity or acceleration of the slide plate 20, according to a routine as illustrated in FIG. 65 by way of example. The routine is initiated with step Q5-1 to start a test pressing cycle in the normal pressing mode. Step Q5-2 is then implemented to measure values Gx, Gy and Gz of acceleration of the slide plate 20 in the vertical (x-axis), lateral (y-axis) and transverse (z-axis) directions of the press 10, respectively, on the basis of the output of the accelerometer 370. Step Q5-2 is followed by step Q5-3 to calculate a velocity Vx of the slide plate 20 in the vertical direction, by integrating the acceleration value Gx. Step Q5-4 is then implemented to calculate lateral and transverse displacement distances Xy and Xz of the slide plate 20, by integrating twice the acceleration values Gy and Gz, respectively. Step Q5-4 is followed by step Q5-5 to determine the presence or absence of any abnormality on the press 10, on the basis of the obtained parameters Gx, Gy, Gz, Vx, Xy and Xz indicated above.

The determination in step Q5-5 is based on a fact that an excessively large or small values of the vertical acceleration Gx or velocity Vx upon collision of the upper die 18 with the punch 12 results in deterioration of the quality of the product. That is, the presence or absence of an abnormality is determined by checking if the acceleration value Gx or velocity Vx is held within a predetermined range of tolerance defined by upper and lower limits. If any abnormality is found in step Q5-5, the operating speed of the motor of the slide driving means 372 is automatically adjusted so that the value Vx or Gx falls within the predetermined range. If this adjustment is not possible, a suitable alarm is provided to inform the operator of this fact. If the press 10 is a hydraulically operated press with its slide driving means 372 using a hydraulic pump, the discharge rate of the pump is adjusted to adjust the acceleration value Gx or velocity value Vx. It is noted that a variation in the acceleration value Gx or velocity Vx causes a variation in the pressing force Fp, and possibly deteriorates the quality of the product. Accordingly, the determination of the presence or absence of an abnormality may be effected by checking if the amount of variation of the value Gx or Vx is held within a predetermined range of tolerance. Where the slide driving means 372 includes a drive motor, gears, crankshaft, joint pins and links, the variation of the value Gx or Vx is caused by vibration of the slide driving means 372, due to a damage or excessive amount of backlash of the gears and/or an excessive amount of play at the connections of the joint pins. Since the frequency of such vibration of the slide driving means 372 differs depending upon the source of the vibration (gears, joint pins, etc.), the source of vibration can be located by analyzing the vibration waveform of the acceleration value Gx, by using a suitable frequency analyzer. The diagnosis of the slide driving means 372 can be achieved with improved accuracy by using accelerometers on the plungers 22. It is also noted that an optimum pressing operation with adequate matching or run-in fit between the upper die 18 and punch 12 requires a suitable amount of clearance between the slide plate 20 and a guide 374 (FIG. 64), but an excessively large amount of the clearance causes a mismatch or shift of the upper die 18 with respect to the punch 12, leading to deterioration of the quality of the product. Therefore, the abnormality determination may be made by checking if the lateral and transverse displacement distances Xy, Xz are held within predetermined ranges of tolerance.

The diagnostic routine of FIG. 65 is a further embodiment of the diagnostic method of this invention, wherein step Q5-2 is one form of a step of detecting an acceleration value of a selected component of the press when the selected component is displaced during operation of the press, while step Q5-3 is one form of a step of detecting a velocity at which the selected component is displaced during operation of the press. Further, step Q5-4 is a still further form of the step of detecting an amount of displacement of a selected portion of the press during operation of the press. Step Q5-5 is one form of a step of determining the presence or absence of an abnormality on the basis of at least one of the displacement amount, velocity and acceleration value of the selected portion or component of the press.

It is possible that only one of the acceleration Gx, velocity Vx and displacement distance Xy, Xz described above may be used to determine the presence or absence of abnormality on the press 10 of FIG. 64. The three-dimensional accelerometer 370 may be replaced by a one-dimensional accelerometer for measuring acceleration of the slide plate 20 in one direction. The velocity Vx may be obtained by differentiating the output of a displacement sensor adapted to detect an amount of displacement of the slide plate 20.

The press 10 of FIG. 64 has a hydraulic cylinder 378 disposed below the cushioning pneumatic cylinder 42. The piston of this hydraulic cylinder 378 is connected to the cushion platen 28 through the piston of the pneumatic cylinder 42. The hydraulic cylinder 378 is used to hold the cushion platen 28 in its lower stroke end and adjust the lowering speed of the cushion platen 28. The cylinder 378 has two oil chambers 380, 382 which communicate with each other through a check valve and a variable flow restrictor. If air is trapped in the oil chambers 380, 382, the cushion platen 28 may be pushed down due to the spring effect of the air upon collision of the upper die 18 with the punch 12, resulting in a sudden variation in the holding force Fs and consequent deterioration of the quality of the product. In view of this phenomenon, an accelerometer 384 may be disposed on the cushion platen 28 to measure or obtain the acceleration, velocity and displacement distances of the cushion platen 28, according to a routine similar to that of FIG. 65. Based on these obtained parameters as compared with predetermined upper and lower limits, the hydraulic cylinder 378 may be easily diagnosed for insufficient amount of oil or trapping of air in the oil chambers 380, 382. If the accelerometer 384 used is of a three-dimensional type, the diagnosis may include determination as to whether the amount of clearance between the cushion platen 28 and the guide 40 is adequate or not.

Further, another accelerometer 386 may be attached to the pressure ring 30, as shown in FIG. 65, to diagnose the pressure ring 30 on the basis of the vibration characteristics determined from its acceleration, velocity and displacement distances obtained by the accelerometer 386, according to a routine similar to that of FIG. 64. The diagnosis of the pressure ring 30 may also be effected by comparing the obtained acceleration, velocity and displacement distances with those of the slide plate 20 or cushion platen 28, or by checking the relative displacement between the pressure ring 30 and the die 18. It is also noted that the diagnosis based on such acceleration, velocity and displacement distances is equally applicable to the double-action press 150 of FIGS. 31-33. For instance, the diagnosis of the outer slide 160, inner slide 164, outer plungers 166 and inner plungers 168 is possible by attaching suitable accelerometer or displacement sensor to these components.

Referring next to FIG. 66, there is shown the double-action press 160 adapted to effect a diagnosis based on a temperature of a selected portion of the machine. The quality of the product manufactured by the press 150 may be deteriorated due to an increase in the blank holding force or forming force or an increased amount of evaporation of the lubricant supplied to the blank, which may occur due to an excessive rise of the temperatures at various portions of the machine. The evaporation of the lubricant causes an increased sliding resistance of the blank with respect to the die set 152, 156, 162 (i.e., die 152, pressure ring 156 and punch 162). The excessive rise of the machine temperature may arise from various factors such as conversion of kinetic energy into thermal energy by the slide driving means 169, heat generated by friction between the sliding surfaces of the machine frame 196 and the outer and inner slides 160, 164, and heat generated by friction between the blank and the die set 152, 156,162 particularly during an initial stage of pressing action on the blank. In view of the temperature rise, it is desirable to attach a temperature sensor 390 to the machine frame 196, for example, and diagnose the press 150 for any abnormality resulting from the temperature rise as detected by the sensor 390, according to a routine illustrated in the flow chart of FIG. 67 by way of example. The temperature diagnostic routine of FIG. 67 is initiated with step Q6-1 to measure a temperature Temp A of the machine free 196. Then, step Q6-2 is implemented to determine whether the measured temperature Temp A is equal to or higher than a predetermined lower limit Temp A1. If the measured temperature Temp A is lower than the lower limit Temp A1, step Q6-3 is implemented to increase the operating speed of the motor of the slide driving means 169 to thereby increase the pressing speed of the press 150. If the measured temperature Temp A is equal to or higher than the lower limit Temp A1, the control flow goes to step Q6-4 to determine whether the measured temperature Temp A is equal to or lower than a predetermined upper limit Temp A2. If the measured temperature Temp A is higher than the upper limit Temp A2, step Q6-5 is implemented to lower the operating speed of the motor of the slide driving means 169 to thereby decrease the pressing speed of the press 150. If the measured temperature Temp A is between the lower and upper limits Temp A1 and Temp A2, this means that the temperature Temp A of the frame 196 is optimum, and the control flow returns to step Q6-1 to repeat the above steps. An increase in the pressing speed results in an increase in the amount of heat generated, and a consequent rise of the temperature Temp A, while a decrease in the pressing speed causes the amount of the generated heat, whereby the routine of FIG. 67 is effective to maintain the temperature Temp A between the lower and upper limits Temp A1 and Temp A2, thereby avoiding the rejects of the product due to deterioration of the quality arising from an excessive rise of the temperature as measured by the temperature sensor 390.

The diagnostic routine of FIG. 67 is a still further embodiment of the diagnostic method of this invention, wherein step Q6-1 is one form of a step of detecting a temperature of a selected portion of the press during operation of the press, while step Q6-4 is one form of a step of determining the presence or absence of an abnormality on the basis of the detected temperature of the selected portion of the press, and according to a predetermined reference. The lower and Upper limit values Temp A1 and Temp A2 correspond to the predetermined reference used in the determining step.

While the routine of FIG. 67 is formulated to control the pressing speed depending upon the output of the temperature sensor 290, it is possible to regulate the temperature Temp A by controlling a suitable cooler 392 disposed near the slide driving means 169 or the die set 152, 156, 162, so that the temperature Temp A is held within an optimum defined by the lower and upper limits Temp A1 and Temp A2. The temperature sensor 390 may be replaced by a temperature sensor 394 such as a radiation thermometer disposed to detect the temperature of the die set 152, 156, 162, or a temperature sensor 396 disposed to detect the ambient or room temperature, so that the temperature diagnosis is effected by checking if the temperature detected by the sensor 394 or 396 falls within a predetermined optimum range. In this case, too, the pressing speed or cooler 392 may be controlled to maintain the temperature within the optimum range. Although the diagnostic routine of FIG. 67 and the modified routines indicated above are designed to maintain the temperature Temp A within the optimum range, it is possible to increase the hydraulic pressure Py or pneumatic pressure Pe indicated in FIG. 32 or hydraulic pressure Pz or pneumatic pressure Pg with a decrease in the detected temperature or vice versa, or increase the relative distance ha, hb with a decrease in the temperature or vice versa, so that the thermal expansion and contraction of the plungers 166, 168 and other components of the press due to a change in the temperature are compensated for by a change in the pressure Py, Pe, Pz, Pg or the relative distance ha, hb, to avoid the rejects of the product due to such expansion and contraction of the machine components.

A diagnosis on the basis of a temperature is also applicable to the single-action press 10 of FIGS. 1 and 2. In this case, the quality of the product may be held substantially consistent at an acceptable level if a tension force T acting on the blank during a pressing operation is substantially constant, where the tension force T is represented by the blank holding force Fs multiplied by a sliding resistance $\mu$ of the blank with respect to the die set 12, 18, 30, which resistance $\mu$ varies with a change in the amount of evaporation of the lubricant due to a change in the machine temperature. In view of the above fact, the press 10 is provided with a radiation thermometer or other temperature sensor to measure a temperature Temp B of the pressure ring 30, for example, and effect a temperature diagnosis according to a routine illustrated in FIG. 68 by way of example. The diagnostic routine is initiated with step Q7-1 to detect the temperature Temp B. Step Q7-1 is followed by step Q7-2 to determine whether the detected temperature Temp B is within an optimum range defined by lower and upper limits Temp B1 and Temp B2. The range includes these limit values. If a negative decision (NO) is obtained in step Q7-2, step Q7-3 is implemented to calculate the sliding resistance $\mu$ according to a predetermined equation or a stored data map, and step Q7-4 is then implemented to calculate an optimum value of the holding force Fs which satisfies T=$\mu$×Fs, where T represents a predetermined optimum tension force acting on the blank. The control flow then goes to step Q7-5 to adjust the pneumatic pressure Pa so as to obtain the calculated optimum value of the holding force Fs. This diagnostic routine is capable of avoiding the rejects of the product due to a temperature change of the press 10.

The diagnostic routine of FIG. 68 is another embodiment of the diagnostic method of the present invention, wherein step Q7-1 is another form of the step of detecting a temperature of a selected portion of the press during operation of the press, while step Q7-2 is another form of the step of determining the presence or absence of an abnormality on the basis of the detected temperature of the selected portion of the press, and according to a predetermined reference. The lower and upper limit values Temp B1 and Temp B2 correspond to the predetermined reference used in the determining step.

The determination in step Q7-2 may be eliminated, so that the pneumatic pressure Pa is adjusted in each cycle of execution of the routine of FIG. 68, depending upon the detected Temp B, so as to maintain the tension force T at the optimum value. Further, the double-action press 150 may be adapted to similarly control the pneumatic pressure Pe, hydraulic pressure Py or relative distance ha (indicated in FIG. 32) which affects the holding force Fs or the tension force T as described above with respect to the single-action press 10.

The quality of the product is also deteriorated when the load values during a pressing operation are inadequate, due to a variation of the effective or actual volumes of the tanks for the hydraulic or pneumatic cylinders associated with generation or transmission of the loads, namely, due to an error of the capacities of the compressed fluids in such tanks and cylinders, with respect to the nominal values, or a variation of such fluid capacities caused by accumulation of the oil in the air tanks. It is extremely cumbersome and time-consuming to disassemble the press for inspecting the tanks for the effective or actual volumes, and such inspection is difficult or impossible upon ordinary replacement or changeover of the die set. The following embodiments of the invention are adapted to easily detect the volumes of the fluid tanks, more specifically, the capacity values of the compressed fluids, and diagnose the press on the basis of the detected fluid capacity values.

A diagnostic routine illustrated in FIG. 69 is designed for the single-action press 10 of FIG. 1, and performed to determine the presence or absence of any abnormality on the press, on the basis of the detected total air capacity of the pneumatic circuit including the air chamber of the pneumatic cylinder 42 (for generating the holding force Fs), air tank 44 and pressure control valve 46. The diagnostic routine of FIG. 69 is started with step Q8-1 to detect an initial value Pa0 of the pneumatic pressure by the pneumatic pressure sensor 50, when the cushion platen 28 is placed in its upper stroke end. Then, step Q8-2 is implemented to effect one test pressing cycle. Step Q8-3 is then implemented to detect a value Pa1 of the pneumatic pressure Pa by the sensor 50 when the slide plate 20 is located at its lower stroke end, for example. Step Q8-3 is followed by step Q8-4 to calculate an initial air capacity Va0 of the pneumatic circuit including the cylinder 42, according to a predetermined equation. Step Q8-5 is then implemented to determine the presence or absence of any abnormality, according to a predetermined rule or reference, for example, by checking if the calculated initial air capacity Va0 is held with a predetermined optimum range, which is determined by the nominal capacity of the pneumatic circuit in question.

When the slide plate 20 is located at its lower stroke end, the following equations (8-1) and (8-2) are satisfied:

$$Pa0 \cdot Va0 = Pa1 \cdot Va1 \tag{8-1}$$

$$Va1 = Va0 - Aa \cdot La \tag{8-2}$$

where,

Va1: Air capacity of the pneumatic circuit when the slide plate 20 is at its lower stroke end, Aa: Effective cross sectional area (pressure-receiving area) of the cylinder 42, La: Piston travel distance of the cylinder 42 at the lower stroke end of the slide plate 20.

The following equation (8-3) is obtained from the above equations (8-1) and (8-2):

$$Va0 = Pa1 \cdot Aa \cdot La/(Pa1 - Pa0) \tag{8-3}$$

In step Q8-4, the initial air capacity Va0 is calculated according to the equation (8-3). The values Pa0 and Pa1 in the equation (8-3) are measured in steps Q8-1 and Q8-3, respectively. The pressure-receiving area Aa stored in the machine data memory 130 may be used as the effective cross sectional area Aa. However, the effective cross sectional area Aa may be obtained by calculating the value ΔFs/ΔPa of the Fs-Pa correlation between the holding force Fs and the pneumatic pressure Pa as shown in FIG. 8, which has been obtained by using the load measuring apparatus 100. The piston travel distance La also included in the equation (8-3) may be stored as machine data in the machine data memory 130, so that the value La is retrieved from the memory 130 when the initial air capacity Va0 is calculated according to the equation (8-3). The piston travel distance La may be obtained by measuring the displacement distance of the cushion platen 28 by an optical distance sensor. If the initial air capacity Va0 thus calculated deviates from the nominal value, the actual holding force Fs produced when the slide plate 20 is at its lower stroke end (when the air in the pneumatic circuit including the cylinder 42 is compressed with the cushion platen 28 lowered to its lower stroke end) would not be adequate even if the initial pneumatic pressure Pa0 is properly adjusted to the nominal value. Accordingly, the determination of the presence or absence of an abnormality associated with the air capacity can be effected by checking if the calculated initial air capacity Va0 is held within a predetermined optimum range determined by the nominal value of the initial air capacity Va0. If the oil is accumulated in the air tank 44, for example, the initial air capacity Va0 may be insufficient, whereby the air compression ratio when the main slide 20 is at its lower stroke end may be excessively high. Namely, the insufficient initial air capacity va0 may cause the pneumatic pressure Pa1 (when the slide plate 20 is at its lower stroke end) to be excessively high, resulting in the blank holding force Fs too large to assure the intended quality of the product, even if the initial pneumatic pressure Pa0 is optimum. On the other hand, an air leakage may cause the pneumatic pressure Pa1 to be excessively low, resulting in an insufficient value of the blank holding force Fs, and may cause a variation in the initial air capacity Va0 as calculated according to the above equation (8-3). Thus, an abnormality can be easily detected by checking the calculated initial air capacity Va0 against the predetermined upper and lower limits.

The diagnostic routine of FIG. 69 is a further embodiment of the diagnostic method of this invention, wherein steps Q8-1 through Q8-4 constitute one form of a step of detecting a capacity of a working fluid which is compressed during operation of the press, on the basis of a change of pressure of the working fluid due to its compression, while step Q8-5 is one form of a step of determining the presence or absence of an abnormality on the basis of the detected capacity of the working fluid, and according to a predetermined reference.

An initial air capacity Vf0 of the pneumatic circuit including the counterbalancing pneumatic cylinders 266 and the common air tank 268 shown in FIG. 33 can be calculated according to the following equation (9):

$$Vf0 = Pf1 \cdot Af \cdot Lf/(Pf1 - Pf0) \tag{9}$$

where,

Pf0: initial value of the pneumatic pressure Pf

Pf1: Value of the pneumatic pressure Pf when the inner slide 164 is at its lower stroke end, Af: Effective total cross sectional area of the four cylinders 266, Lf: Piston travel distance of the cylinders 266.

The pneumatic pressure values Pf0, Pf1 included in the equation (9) are measured by the pneumatic pressure sensor 272. The Pressure-receiving area Af stored in the machine data memory 130 may be used as the effective total cross sectional area Af also included in the equation (9). However, the value Af may be obtained by calculating the absolute value IΔFf/ΔPfI of the Ff-Pf correlation between the forming force Ff and the pneumatic pressure Pf as shown in FIG. 70 which has been obtained by using the load measuring apparatus 100. The value Af may also be obtained from a correlation between the pneumatic pressure Pf and the load value detected by the strain gage 246 on the inner plunger 168. The piston travel distance Lf also included in the equation (9) may be stored as machine data in the machine data memory 130, so that the value Lf is retrieved from the memory 130 when the initial air capacity Vf0 is calculated according to the equation (9). The piston travel distance Lf may be obtained by measuring the displacement distance of the inner slide 164 by an optical distance sensor. If the initial air capacity Vf0 thus calculated deviates from the nominal value, the actual forming force Ff produced would not be adequate even if the initial pneumatic pressure Pf0 is properly adjusted to the nominal value. Accordingly, the determination of the presence or absence of an abnormality can be effected by checking if the calculated initial air capacity Vf0 is held within a predetermined optimum range determined by the nominal value of the initial air capacity Vf0. If the oil is accumulated in the air tank 268, for example, the initial air capacity Vf0 may be insufficient, whereby the air compression ratio when the inner slide 164 is at its lower stroke end may be excessively high. Namely, the insufficient initial air capacity Vf0 may cause the pneumatic pressure Pf1 (when the inner slide 164 is at its lower stroke end) to be excessively high, resulting in the forming force Ff too small to assure the intended quality of the product, even if the initial pneumatic pressure Pf0 is optimum. On the other hand, an air leakage may cause the pneumatic pressure Pf1 to be excessively low, resulting in an excessive value of the forming force Fs, and may cause a variation in the initial air capacity Vf0 as calculated according to the above equation (9). Thus, an abnormality can be easily detected by checking the calculated initial air capacity Vf0 against the predetermined upper and lower limits.

An initial air capacity Vd0 of the pneumatic circuit including the counterbalancing pneumatic cylinders 216 and the common air tank 218 shown in FIG. 32 can be calculated according to the following equation (10):

$$Vd0 = Pd1 \cdot Ad \cdot Ld/(Pd1-Pd0) \quad (10)$$

where,

Pd0: Initial value of the pneumatic pressure Pd

Pd1: Value of the pneumatic pressure Pd when the outer slide 160 is at its lower stroke end, Ad: Effective total cross sectional area of the four cylinders 216, Ld: Piston travel distance of the cylinders 216.

Similarly, an initial air capacity of the pneumatic circuit including the counterbalancing pneumatic cylinders 80 and the air tank 82 shown in FIG. 2 can be obtained.

An initial fluid capacity V of the hydraulic circuit including the balancing hydraulic cylinders 32 shown in FIG. 1, a manifold interconnecting these cylinders 32, and a piping from the manifold to the pump 34 can be calculated according to the following equation (11-2), which is obtained from the following equation (11-1):

$$K = (Ps1-Ps0)/(\Delta V/V) \quad (11-1)$$

$$V = K \cdot \Delta V/(Ps1-Ps0) \quad (11-2)$$

where,

K: Modulus K of elasticity of volume of the fluid,

Ps0: Initial value of the hydraulic pressure Ps,

Ps1: Value of the pneumatic pressure Ps when the slide plate 20 is at its lower stroke end, ΔV: Amount of change of the fluid capacity during a pressing cycle.

The hydraulic pressure values Ps0, Ps1 included in the equation (11-2) are measured by the hydraulic pressure sensor 38. The modulus K of elasticity is retrieved from the machine data memory 130. The amount of change of the fluid capacity ΔV can be calculated according to the following equation:

$$\Delta V = n \cdot As \cdot Xsav \quad (11-3)$$

where, n: Number of the cushion pins 24,

As: Effective cross sectional area (average pressure-receiving area) of the hydraulic cylinders 32, Xsav: Average of the local piston displacement distance values Xsi of the hydraulic cylinders.

The values n and As may be retrieved from the machine data memory 130. However, the value n·As may be obtained by calculating the value ΔFs/ΔPs of the Fs-Ps correlation between the holding pressure Fs and the hydraulic pressure Ps, which correlation can be obtained by detecting the values Fs and Ps corresponding to different values of the pneumatic pressure Pa, by using the load measuring apparatus 100. The average piston travel or displacement distance Xsav can be obtained using the load measuring apparatus 100 equipped with the distance sensor 342 as shown in FIG. 52. If the thus obtained fluid capacity V deviates from the nominal value, the holding force Fs cannot be evenly distributed to the cushion pins 24, even if the initial hydraulic pressure Ps is adjusted to the nominal value. Therefore, the determination of the presence or absence of any abnormality associated with the hydraulic circuit can be easily effected by checking if the obtained fluid capacity V is held within a predetermined optimum range, which is determined by the nominal value of the fluid capacity V.

The quality of the product is also deteriorated by inadequate load values during a pressing operation due to a variation of the effective or actual cross sectional areas of the hydraulic or pneumatic cylinders associated with generation or transmission of the loads, namely, due to an error of the cross sectional areas with respect to the nominal values, or a variation of the cross sectional areas due to wear of the cylinders. It is extremely cumbersome and time-consuming to disassemble the press for inspecting the cylinders for the effective or actual cross sectional areas, and such inspection is difficult or impossible upon ordinary replacement or changeover of the die set. The following embodiments of the invention are adapted to easily detect the effective cross sectional areas of the cylinders, and diagnose the press on the basis of the detected effective cross sectional areas.

A diagnostic routine illustrated in FIG. 71 is designed for the single-action press 10 of FIG. 1, and performed to determine the presence or absence of any abnormality on the press, on the basis of the detected effective cross sectional area of the cushioning pneumatic cylinder 42 for generating the holding force Fs. The diagnostic routine of FIG. 71 is started with step Q9-1 to start a test pressing cycle with the load measuring apparatus 100 being installed as shown in FIG. 4. The press 10 is stopped a short time after the cushion platen 28 begins to be lowered from its upper stroke end, but before the measuring member 106 of the apparatus abuts on the positioning member 102. In this condition, certain loads act on the various portions of the press. Then, step Q9-2 is implemented to detect the holding force Fs1 by the strain gages 116. Step Q9-2 is followed by step Q9-3 to increase the pneumatic pressure Pa by a predetermined amount ΔPa. The control flow then goes to step Q9-4 to detect the holding force Fs2, and then to step Q9-5 to calculate the effective cross sectional area (pressure-receiving area) Aa of the pneumatic cylinder 42, according to a predetermined equation. Then, step Q9-6 is then implemented to determine the presence or absence of any abnormality, according to a predetermined rule or reference, for example, by checking if the calculated effective cross sectional area Aa is held with a predetermined optimum range.

On the press 10, the following equations (12-1) and (12-2) are satisfied:

$$Fs1 + \alpha = Aa \cdot Pa1 \qquad (12-1)$$

$$Fs2 + \alpha = Aa \cdot Pa2 \qquad (12-2)$$

where, $\alpha$: Total load acting on the measuring member 106, cushion pins 24 and cushion platen 28, which include loads caused by friction forces, Pa1: Value of the pneumatic pressure Pa before it is increased by $\Delta$Pa, Pa2: Value of the pneumatic pressure Pa after it is increased by $\Delta$Pa.

The following equation (12-3) is obtained from the above equations (12-1) and (12-2):

$$Aa = (Fs2 - Fs1)/(Pa2 - Pa1) = (Fs2 - Fs1)/\Delta Pa \qquad (12-3)$$

In step Q9-5, the effective cross sectional area Aa is calculated according to the above equation (12-3). The calculated value Aa corresponds to a rate of change of the holding force Fs generated by the cylinder 42 as the pneumatic pressure Pa is changed. If the thus obtained effective cross sectional area Aa deviates from the nominal value, the holding force Fs may be inadequate even if the pneumatic pressure Pa is adjusted to the nominal value. Accordingly, the determination of the presence or absence of an abnormality can be effected by checking if the obtained value Aa is held within a predetermined optimum range, which is determined by the nominal value of the effective cross sectional area Aa. If the effective cross sectional area Aa deviates from the nominal value due to wear of the cylinder 42, for example, the holding force Fs may not be adequate. Therefore, an abnormality due to the excessive wear of the cylinder 42 may be easily detected on the basis of the obtained value Aa as compared with the optimum range.

The diagnostic routine of FIG. 71 is a yet further embodiment of the diagnostic method of the present invention, wherein steps Q9-1 through Q9-5 constitute one form of a step of detecting an effective cross sectional area of a cylinder displaced at a selected portion of the press, on the basis of a correlation between a pressure of a working fluid in the cylinder and a load produced by the cylinder. Further, step Q9-6 is one form of a step of determining the presence or absence of an abnormality, on the basis of the detected effective cross sectional area of the cylinder, and according to a predetermined reference. The present embodiment can be considered to be equivalent to the preceding embodiments of FIGS. 16, 19 and 21 wherein the diagnosis is effected on the basis of the detected correlation between a load generated at a selected portion of the press during operation of the press, and a physical value which changes with the load.

Regarding the hydro-pneumatic cylinder 252 shown in FIG. 33 of the double-action press 150 of FIG. 31, the following equations (13-1) and (13-2) are satisfied:

$$Az \cdot Pz = Ag \cdot Pg \qquad (13-1)$$

$$Az(Pz + \Delta Pz) = Ag(Pg + \Delta Pg) \qquad (13-2)$$

where,

Ag: Effective cross sectional area of the air chamber 256 of the hydro-pneumatic cylinder 252, Az: Effective cross sectional area of the oil chamber 254 of the hydro-pneumatic cylinder 252, $\Delta$Pz: Amount of change of the hydraulic pressure Pz when the pneumatic pressure Pg is changed by $\Delta$Pg.

The ratio Ag/Az is calculated according to the following equation (13-3), which is obtained from the above equations (13-1) and (13-2):

$$Ag/Az = \Delta Pz/\Delta Pg \qquad (13-3)$$

Described in detail, a Pz-Pg correlation as indicated in FIG. 72 is obtained by measuring the hydraulic pressure Pz as the pneumatic pressure Pg is changed, while the inner slide 164 is located at its lower stroke end, that is, after the piston of the hydro-pneumatic cylinder 252 has been moved to its stroke end on the side of the air chamber 256 by the hydraulic pressure Pz. The ratio Ag/Az can be obtained from the gradient of the Pz-Pg correlation, namely, from the rate $\Delta$Pz/$\Delta$Pg of change of the hydraulic pressure Pz with the pneumatic pressure Pg. The hydraulic pressure Pz included in the above equations (13-1) and (13-2) is detected by the hydraulic pressure sensor 249. However, the pressure Pz can be calculated according to the following equation (13-4):

$$Pz = (F1 - F2)/A \qquad (13-4)$$

where,

F1: Driving force acting on the inner plunger 168,

F2: Lifting force produced by the pneumatic cylinder 266,

A: Effective cross sectional area (pressure-receiving area) of the hydraulic cylinder 248.

The driving force F1 is detected by the strain gage 246, and the lifting force F2 is calculated from the effective cross sectional area of the pneumatic cylinder 266 and the pneumatic pressure Pf. if the thus obtained ratio Ag/Az of the effective cross sectional areas Ag and Az deviates from the nominal value, the forming force Ff may not be adequate even if the pneumatic pressure Pg is adjusted to the nominal value, where the optimum forming force Ffo is set by adjusting the pneumatic pressure Pg. Accordingly, the determination of the presence or absence of an abnormality associated with the effective cross sectional areas Ag, Az can be effected by checking if the obtained ratio Ag/Az is held within a predetermined optimum range, which is determined by the nominal value of the ratio Ag/Az. If the ratio Ag/Az deviates from the nominal value due to excessive wear of the cylinder 252, the optimum forming force Ff cannot be obtained. Therefore, an abnormality due to the excessive wear of the cylinder 252 can be easily detected on the basis of the obtained ratio Ag/Az as compared with the optimum range. The right member and the left member of the above equation (13-1) correspond to the values of the loads produced, and the ratio Ag/Az is obtained from the relationship between these load values and the pressure values Pg, Pz.

The diagnosis on the basis of the obtained ratio Ag/Az is a yet further embodiment of the diagnostic method of the present invention, which is equivalent to the preceding embodiment of FIG. 71.

Similarly, the ratio of the effective cross sectional areas of the hydro-pneumatic cylinder 66 of FIG. 2 or hydro-pneumatic cylinder 184 of FIG. 32 can be obtained to effect a similar diagnosis.

Regarding each counterbalancing pneumatic cylinder 266 of FIG. 33, the following equations (14-1) and (14-2) are satisfied:

$$F2 = Afi \cdot Pf \qquad (14\text{-}1)$$

$$F2 + \Delta F2 = Afi \cdot (Pf + \Delta Pf) \qquad (14\text{-}2)$$

where,

Afi: Effective cross sectional area of the counterbalancing pneumatic cylinder 266, F2: Lifting force produced by the cylinder 266, ΔF2: Amount of change of the lifting force F2 when he pneumatic pressure Pf is changed by APf.

The effective cross sectional area Afi of the pneumatic cylinder 266 is calculated according to the following equation (14-3), which is obtained from the above equations (14-1) and (14-2):

$$Afi = \Delta F2 / \Delta Pf \qquad (14\text{-}3)$$

Described in detail, a F2-Pf correlation as indicated in FIG. 73 is obtained by measuring the lifting force F2 as the pneumatic pressure Pf is changed. The effective cross sectional area Afi can be obtained from the gradient of the F2-Pf correlation, namely, from the rate ΔF2/APf of change of the lifting force F2 with the pneumatic pressure Pf. The lifting force F2 included in the above equation (14-1) and (14-2) can be calculated according to the following equation (14-4), on the basis of the hydraulic pressure Pz when the inner slide 164 is at its lower stroke end:

$$F2 = F1 - A \cdot Pz \qquad (14\text{-}4)$$

where,

F1: Driving force acting on the inner plunger 168,

A: Effective cross sectional area (pressure-receiving area) of the hydraulic cylinder 248.

The driving force F1 is detected by the strain gage 246, and the hydraulic pressure Pz is detected by the hydraulic pressure sensor 249. If the thus obtained effective cross sectional area Afi deviates from the nominal value, the forming force Ff may not be adequate even if the pneumatic pressure Pf is adjusted to the nominal value. Accordingly, the determination of the presence or absence of an abnormality associated with the pneumatic cylinder 266 can be effected by checking if the obtained effective cross sectional area Afi is held within a predetermined optimum range, which is determined by the nominal value of the effective cross sectional area Afi. If the obtained value Afi deviates from the nominal value due to excessive wear of the cylinder 266, the optimum forming force Ff cannot be obtained. Therefore, an abnormality due to the excessive wear of the cylinder 266 can be easily detected on the basis of the obtained value Afi as compared with the optimum range.

The diagnosis on the basis of the effective cross sectional area Afi is still another embodiment of the diagnostic method of the invention, which is equivalent to the preceding embodiment of FIG. 71. The lifting force F1 corresponds to a load produced by the cylinder whose effective cross sectional area is detected.

In the above example, the diagnosis is effected for each of the four counterbalancing pneumatic cylinders 266. Therefore, the determination of the presence or absence of an abnormality may be effected on the basis of a variation in the obtained values of the effective cross sectional area Afi of the four cylinders 266. However, the diagnosis may be effected by obtaining the total effective cross sectional area Af of the four cylinders 266. It is also possible to obtain the total effective cross sectional area Af by calculating the absolute value |ΔFf/ΔPf| which is a gradient of the Ff-Pf correlation as shown in FIG. 70, which is obtained using the load measuring apparatus 100. The value ΔFf/ΔPf represents the rate of change of the forming force with the pneumatic pressure Pf.

Similarly, the effective cross sectional areas of the counterbalancing pneumatic cylinder 80 of FIG. 2 or counterbalancing pneumatic cylinder 216 of FIG. 32 can be obtained to effect a similar diagnosis.

While the present invention has been described above in its presently preferred embodiments, it is to be understood that the present invention is not limited to the details of the illustrated embodiments, but may be otherwise embodied.

Although the illustrated embodiments described above are applied to the presses 10, 150 adapted to perform a drawing operation, the principle of the invention is equally applicable to other types of press, for example, presses adapted to perform a bending operation.

Further, the various diagnostic routines are illustrated by way of example, only, only selected ones of the illustrated routines may be performed on the press, or other or modified diagnostic routines may be performed. The possible causes for abnormalities which are stored in the controller (e.g., controller 90 or 280) and used in the diagnostic routines are suitably determined depending upon the specific type of the press, and may include those which relate to defects of the various sensors and adjusting mechanisms or devices provided on the press.

While the load measuring apparatus 100 is used in the illustrated embodiments by way of example, any other type of load measuring apparatus may be used. For instance, the apparatus may use load cells, or strain gages attached to the machine frame 196 or other support members of the press. The locations at which loads are measured and the number of such locations may be determined as needed. Where there exists a high degree of correlation between a measured load value and a pneumatic or hydraulic pressure, a diagnosis on the basis of a correlation between the load value and the relative distance h, ha, hb can be effected, for example, by estimating the load value from the detected pneumatic or hydraulic pressure, while the press is in operation.

Although the illustrated embodiments do not have means for automatically adjusting the hydraulic pressures Pm, Py and Pz, these pressures may be automatically adjusted by suitable pressure control valves such as a shut-off valve as used for automatic adjustment of the hydraulic pressure Ps.

In the illustrated embodiments, the local distance values h, ha, hb associated with the four die-height adjusting mechanisms 52, 172, 240 are adjusted independently of each other. However, the principle of the present invention is also applicable to a press wherein the four local distance values h, ha, hb are uniformly adjusted by a single servomotor commonly used for the four die-height adjusting mechanisms. The hydraulic pressures Pm, Py, Pz and pneumatic pressures Pc, Pe, Pg of the four die-height adjusting mechanisms 52, 172, 240 may also be uniformly adjusted by a single pneumatic or pneumatic circuit.

While the four counterbalancing pneumatic cylinders 80, 216, 266 are connected to the common air tank 82, 218, 268, those cylinders may be connected to respective air tanks, and adjusted independently of each other.

Although the illustrated presses 10, 150 are adapted to automatically establish the initial pressing conditions such as the initial pneumatic pressure Pa, according to the machine information and die set information, the present invention is applicable to a press in which the initial pressing conditions are manually established established by the operator, by a try-and-error procedure. Further, part or all of the parameters such as the load values, pneumatic and hydraulic pressure values and displacement distance values used in the diagnostic method according to the invention may be manually obtained by the operator.

In the illustrated embodiments, the controller 90, 280 of the press 10, 150 incorporates the diagnostic portion 126, 292, and the sensors necessary for the diagnostic operations are provided on the press. However, a diagnostic device may be provided as a unit separate from the controller (90, 280) of the press, and the appropriate sensors are disposed on the press when a diagnostic operation is performed.

The press 10 is equipped with the cushioning device 51 including the balancing hydraulic cylinders 32 for absorbing a length variation of the cushion pins 24, the press may use a cushioning device which employs suitable means other than the cylinders 32, for absorbing the length variation of the cushion pins 24. Further, the concept of the present invention is applicable to a single-action press which is not equipped with such cushioning device. The cushioning pneumatic cylinder 42 may be replaced by a hydraulic cylinder adapted to release its working fluid for providing a relief pressure to thereby produce a resistance to the lowering movement of the cushion platen 24, to generate a blank holding force.

The press 150 is adapted to produce a blank holding force while the piston of the hydro-pneumatic cylinder 184 is retracted toward the air chamber 188. However, the principle of the invention is applicable to a press adapted to produce the blank holding force before the piston of the hydro-pneumatic cylinder begins to be retracted toward the air chamber.

It is to be understood that the present invention may be embodied with various other changes, modifications and improvements, which may occur to those skilled in the art, without departing from the spirit and scope of the invention defined in the following claims.

What is claimed is:

1. A diagnostic method of diagnosing a press for determining the presence of any abnormality that deteriorates quality of a product manufactured by a pressing operation performed on a blank while a main slide of the press is reciprocated, the method comprising the steps of:

detecting a selected one of a plurality of characteristics of a load generated at a selected portion of the press prior to a production run of the press, while the main slide is moved without the blank;

determining the selected characteristic of the load detected prior to the production run of the press; and comparing the determined characteristic of the load with a predetermined reference that permits the product to have an intended quality, and thereby determining the presence or absence of an abnormality, based on a result of comparing the determined characteristic of the load with said predetermined reference.

2. A diagnostic method according to claim 1, wherein said selected characteristic of said load comprises a waveform of said load detected in relation to a physical value which changes during a pressing cycle performed on the press.

3. A diagnostic method according to claim 1, wherein said selected characteristic of said load comprises a distribution of local values of said load detected at selected local portions of said press.

4. A diagnostic method according to claim 1, wherein said selected characteristic of said load comprises a correlation between said load and a physical value which changes with said load.

5. A diagnostic method according to claim 1, wherein said selected characteristic of said load comprises a pattern in which said load varies as a function of the number of pressing cycles repeated on the press.

6. A diagnostic method of diagnosing a press, prior to a production run of the press, for determining the presence of any abnormality that deteriorates quality of a product manufactured by a pressing operation performed on a blank while a main slide of the press is reciprocated during the production run, the method comprising the steps of:

adjusting operating parameters of the press to predetermined optimum values;

after adjustment of said operating parameters, detecting a load generated at a selected portion of the press prior to a production run of the press, while the main slide is moved without the blank;

determining a selected one of a plurality of characteristics of the load detected prior to the production run of the press; and comparing the determined characteristic of the load with a predetermined reference that permits the product to have an intended quality, and thereby determining the presence or absence of an abnormality, based on a result of comparing the determined characteristic of the load with said predetermined reference.

7. A diagnostic method of diagnosing a press, prior to a production run of the press, for determining the presence of any abnormality that deteriorates quality of a product manufactured by a pressing operation performed on a blank while a main slide of the press is reciprocated during the production run, the method comprising the steps of:

adjusting operating parameters of the press to predetermined optimum values;

after adjustment of said operating parameters, detecting a load generated at a selected portion of the press prior to a production run of the press, while the main slide is moved without the blank;

determining a selected one of a plurality of characteristic of the load detected prior to the production run of the press; and storing in a memory a predetermined reference of said selected characteristic of the load, which reference permits the product to have an intended quality;

comparing the determined characteristic of the load with said predetermined reference that permits the product to have an intended quality, and thereby determining the presence or absence of an abnormality, based on a result of comparing the determined characteristic of the load with said predetermined reference.

* * * * *

UNITED STATES PATENT AND TRADEMARK OFFICE
CERTIFICATE OF CORRECTION

PATENT NO. : 5,724,843
DATED : March 10, 1998
INVENTOR(S) : KIRII et al.

It is certified that error appears in the above-indentified patent and that said Letters Patent is hereby corrected as shown below:

Claim 7, col. 74, line 49, "characteristic" should read --characteristics--.

Signed and Sealed this

Nineteenth Day of May, 1998

Attest:

BRUCE LEHMAN

Attesting Officer  Commissioner of Patents and Trademarks